United States Patent
Eilmus et al.

(10) Patent No.: US 12,442,166 B2
(45) Date of Patent: Oct. 14, 2025

(54) SINK SYSTEM AND COMPONENTS

(71) Applicant: Kohler Co., Kohler, WI (US)

(72) Inventors: Niels Eilmus, Sheboygan, WI (US);
Evan Grybush, Belgium, WI (US);
Margaret Mazz, Atlanta, GA (US);
Ken Kapal, Sheboygan, WI (US);
Ryan Detlaff, Sheboygan, WI (US);
Josh Hippert, Newton, WI (US);
Shawn Booth, Sheboygan, WI (US);
Erika Kovesdi, Kohler, WI (US);
Jason Miller, Plymouth, WI (US);
Luncheak Tan, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 476 days.

(21) Appl. No.: 17/738,587

(22) Filed: May 6, 2022

(65) Prior Publication Data

US 2022/0364343 A1  Nov. 17, 2022

Related U.S. Application Data

(60) Provisional application No. 63/188,888, filed on May 14, 2021.

(51) Int. Cl.
*E03C 1/266*  (2006.01)
*A47J 43/24*  (2006.01)
(Continued)

(52) U.S. Cl.
CPC ............ *E03C 1/2665* (2013.01); *A47J 43/24* (2013.01); *A47L 15/0086* (2013.01); *A47L 15/4236* (2013.01); *A61L 2/18* (2013.01); *A61L 2/24* (2013.01); *B08B 3/08* (2013.01); *B08B 13/00* (2013.01); *E03C 1/126* (2013.01);
(Continued)

(58) Field of Classification Search
CPC ..................................................... E03C 1/2665
See application file for complete search history.

(56) References Cited

U.S. PATENT DOCUMENTS 2,044,564 A    6/1936  Carter
2,536,372 A    1/1951  Jordan
(Continued)

FOREIGN PATENT DOCUMENTS

CN    102458210 A    5/2012
CN    108071144 A    5/2018
(Continued)

OTHER PUBLICATIONS

Chinese Office Action dated Nov. 15, 2024 for Chinese Application No. 202210523197.1.
(Continued)

*Primary Examiner* — Christine J Skubinna
(74) *Attorney, Agent, or Firm* — Husch Blackwell LLP

(57) ABSTRACT

A sink system includes a sink basin and a disposal system. The disposal system includes a first inlet coupled to the sink basin, a second inlet fluidly coupled to a second fluid source, and a garbage disposal configured to receive a first flow of fluid from the sink basin via the first inlet and receive a second flow of fluid from a second fluid source via the second inlet. The sink basin delivers a flow of used water to the disposal system and the second fluid source delivers a flow of clean water to the disposal system.

7 Claims, 36 Drawing Sheets

(51) Int. Cl.
  *A47L 15/00*   (2006.01)
  *A47L 15/42*   (2006.01)
  *A61L 2/18*    (2006.01)
  *A61L 2/24*    (2006.01)
  *B08B 3/08*    (2006.01)
  *B08B 13/00*   (2006.01)
  *E03C 1/126*   (2006.01)
  *E03C 1/182*   (2006.01)

(52) U.S. Cl.
  CPC ......... *E03C 1/182* (2013.01); *A61L 2202/121* (2013.01); *A61L 2202/122* (2013.01); *A61L 2202/14* (2013.01); *A61L 2202/17* (2013.01)

(56) References Cited

U.S. PATENT DOCUMENTS

| | | |
|---|---|---|
| 2,603,328 A | 7/1952 | Jordan |
| 2,604,633 A | 7/1952 | Weir |
| 2,637,855 A | 5/1953 | Reaume |
| 2,785,863 A | 3/1957 | Jordan |
| 2,876,953 A | 3/1959 | Shepherd |
| 2,876,954 A | 3/1959 | Shepherd |
| 2,918,222 A | 12/1959 | Shepherd |
| 2,991,481 A | 7/1961 | Hinkel et al. |
| 3,028,209 A | 4/1962 | Guth |
| 3,034,734 A | 5/1962 | Meyers |
| 3,344,996 A | 10/1967 | Hannum |
| 3,510,069 A | 5/1970 | Dibbern |
| 3,545,864 A | 12/1970 | Desaga |
| 3,774,631 A | 11/1973 | Wilkins |
| 4,870,986 A | 10/1989 | Barrett |
| 4,982,455 A | 1/1991 | Carter |
| 5,173,178 A | 12/1992 | Kawashima et al. |
| 5,225,172 A | 7/1993 | Meyler et al. |
| 5,308,000 A | 5/1994 | Riley |
| 5,322,084 A | 6/1994 | Ghiassian |
| 5,511,763 A | 4/1996 | Green |
| 5,555,907 A | 9/1996 | Philipp |
| 5,577,673 A | 11/1996 | Mcmurphy et al. |
| 5,620,622 A | 4/1997 | Lang |
| 5,676,319 A | 10/1997 | Stiggins et al. |
| 5,694,653 A | 12/1997 | Harald |
| 5,714,066 A | 2/1998 | Jang |
| 5,868,311 A | 2/1999 | Cretu-Petra |
| 5,971,304 A * | 10/1999 | Sullivan ............... E03C 1/2665 241/257.1 |
| 5,983,923 A | 11/1999 | Hobbs et al. |
| 6,047,417 A | 4/2000 | Derakhshan |
| 6,219,859 B1 | 4/2001 | Derakhshan |
| 6,390,125 B2 | 5/2002 | Pawelzik et al. |
| 6,519,130 B1 | 2/2003 | Breslow |
| 6,967,587 B2 | 11/2005 | Snell et al. |
| 7,014,166 B1 | 3/2006 | Wang |
| 7,084,388 B2 | 8/2006 | Rejc |
| 7,204,267 B1 | 4/2007 | Persico |
| 7,584,898 B2 | 9/2009 | Schmitt et al. |
| 7,584,914 B2 | 9/2009 | Nishikawa et al. |
| 7,627,909 B2 | 12/2009 | Esche |
| 8,006,712 B2 | 8/2011 | Boey |
| 8,028,355 B2 | 10/2011 | Reeder et al. |
| 8,091,280 B2 | 1/2012 | Hanzel et al. |
| 8,132,778 B2 | 3/2012 | Connors |
| 8,162,236 B2 | 4/2012 | Rodenbeck et al. |
| 8,438,672 B2 | 5/2013 | Reeder et al. |
| 8,544,775 B2 | 10/2013 | Mancuso |
| 8,579,217 B2 | 11/2013 | Chesack |
| 8,591,736 B2 | 11/2013 | Kruckenberg et al. |
| 8,819,872 B2 | 9/2014 | Bradley et al. |
| 8,847,174 B2 | 9/2014 | Domenig et al. |
| 8,984,679 B2 | 3/2015 | Bayley et al. |
| 9,010,377 B1 | 4/2015 | O'Brien et al. |
| 9,024,277 B2 | 5/2015 | Domenig et al. |
| 9,032,564 B2 | 5/2015 | Reeder et al. |
| 9,062,790 B2 | 6/2015 | Esche et al. |
| 9,157,219 B2 | 10/2015 | Gibson |
| 9,157,548 B2 | 10/2015 | Walker et al. |
| 9,194,110 B2 | 11/2015 | Frick et al. |
| 9,285,807 B2 | 3/2016 | Rodenbeck et al. |
| 9,474,432 B2 | 10/2016 | Alexander |
| 9,528,249 B2 | 12/2016 | Gompper |
| 9,551,137 B2 | 1/2017 | Chen |
| 9,637,895 B2 | 5/2017 | Song et al. |
| 9,644,354 B2 | 5/2017 | Warsowe et al. |
| 9,695,579 B2 | 7/2017 | Herbert et al. |
| 9,696,728 B2 | 7/2017 | Gormley et al. |
| 9,708,802 B2 | 7/2017 | Gibson |
| 9,714,503 B2 | 7/2017 | Song et al. |
| 9,715,238 B2 | 7/2017 | Rodenbeck et al. |
| 9,723,967 B2 | 8/2017 | Alexander |
| 9,752,307 B2 | 9/2017 | Bewley et al. |
| 9,758,951 B2 | 9/2017 | Evans et al. |
| 9,816,257 B2 | 11/2017 | Blake et al. |
| 9,828,751 B2 | 11/2017 | Parikh et al. |
| 9,919,939 B2 | 3/2018 | Rosko et al. |
| 9,976,290 B2 | 5/2018 | Evans et al. |
| 9,988,797 B2 | 6/2018 | Reeder et al. |
| 10,010,236 B2 | 7/2018 | Alexander |
| 10,035,150 B2 | 7/2018 | Gormley et al. |
| 10,184,231 B2 | 1/2019 | Pitsch et al. |
| 10,184,232 B2 | 1/2019 | Veros et al. |
| 10,227,758 B2 | 3/2019 | Tang |
| 10,267,022 B2 | 4/2019 | Veros et al. |
| 10,337,232 B2 | 7/2019 | Fagersand et al. |
| 10,365,753 B2 | 7/2019 | Azarko |
| 10,443,290 B2 | 10/2019 | Tokudome |
| 10,450,203 B2 | 10/2019 | Schuster |
| 10,471,438 B2 | 11/2019 | Chavez |
| 10,472,170 B2 | 11/2019 | Yang et al. |
| 10,472,252 B2 | 11/2019 | Schuster |
| 10,480,165 B2 | 11/2019 | Reeder et al. |
| 10,501,356 B2 | 12/2019 | Macey |
| 10,508,423 B2 | 12/2019 | Herbert et al. |
| 10,590,690 B2 | 3/2020 | Shin et al. |
| 10,612,221 B2 | 4/2020 | Yan |
| 10,640,393 B2 | 5/2020 | Cobb et al. |
| 10,648,163 B2 | 5/2020 | Blake et al. |
| 10,669,768 B2 | 6/2020 | Amacker et al. |
| 10,675,573 B2 | 6/2020 | Miller et al. |
| 10,677,510 B2 | 6/2020 | Kim et al. |
| 10,677,511 B2 | 6/2020 | Kim et al. |
| 10,684,064 B2 | 6/2020 | Kim et al. |
| 10,690,393 B2 | 6/2020 | Kim et al. |
| 10,698,429 B2 | 6/2020 | Rodenbeck et al. |
| 10,746,457 B2 | 8/2020 | Kim et al. |
| 10,767,354 B2 | 9/2020 | Tracy |
| 10,881,751 B2 | 1/2021 | Dobrinsky |
| 10,889,265 B2 | 1/2021 | Sobecki et al. |
| D909,534 S | 2/2021 | Glaser |
| 10,937,421 B2 | 3/2021 | Beck et al. |
| 10,947,138 B2 | 3/2021 | Rosko et al. |
| 10,981,178 B2 | 4/2021 | Britto |
| 10,982,419 B2 | 4/2021 | Baker et al. |
| 2003/0056826 A1 | 3/2003 | Thomas |
| 2004/0193326 A1 | 9/2004 | Phillips et al. |
| 2005/0230639 A1 | 10/2005 | Ancona et al. |
| 2007/0119478 A1 | 5/2007 | King et al. |
| 2007/0170289 A1 | 7/2007 | Okada et al. |
| 2007/0256362 A1 | 11/2007 | Hansen |
| 2007/0267521 A1 | 11/2007 | Zhou |
| 2008/0172953 A1 | 7/2008 | Piorkowski |
| 2009/0179097 A1 | 7/2009 | Nishikawa et al. |
| 2009/0293192 A1 | 12/2009 | Pons |
| 2013/0048090 A1 | 2/2013 | Yang |
| 2013/0075483 A1 | 3/2013 | Marty et al. |
| 2013/0174926 A1 | 7/2013 | Derakhshan |
| 2013/0175374 A1 | 7/2013 | Ham |
| 2013/0206187 A1 | 8/2013 | Dombrowski |
| 2013/0248033 A1 | 9/2013 | Parikh et al. |
| 2014/0306042 A1 | 10/2014 | Chesack et al. |
| 2014/0345726 A1 | 11/2014 | Seggio et al. |
| 2015/0190538 A1 | 7/2015 | Olvera et al. |
| 2015/0202633 A1 | 7/2015 | Perkins |
| 2015/0321923 A1 | 11/2015 | Ma |

(56) References Cited

U.S. PATENT DOCUMENTS

| | | |
|---|---|---|
| 2016/0017582 A1 | 1/2016 | Lee et al. |
| 2016/0040405 A1 | 2/2016 | Talsma et al. |
| 2016/0076233 A1 | 3/2016 | Parikh et al. |
| 2016/0122985 A1 | 5/2016 | Gormley et al. |
| 2016/0122986 A1* | 5/2016 | Gormley ............... A61L 11/00 241/41 |
| 2016/0230374 A1 | 8/2016 | Just et al. |
| 2016/0237661 A1 | 8/2016 | Teagarden |
| 2018/0216324 A1 | 8/2018 | Beck et al. |
| 2019/0003166 A1* | 1/2019 | Britto ............... E03C 1/2665 |
| 2019/0085541 A1 | 3/2019 | Anderson et al. |
| 2019/0144204 A1 | 5/2019 | Brenckle et al. |
| 2019/0271141 A1 | 9/2019 | Green |
| 2020/0032495 A1 | 1/2020 | Ye et al. |
| 2020/0048109 A1 | 2/2020 | Schuster |
| 2020/0048112 A1 | 2/2020 | Vagasky |
| 2020/0061633 A1 | 2/2020 | Chavez |
| 2020/0087905 A1 | 3/2020 | Reeder et al. |
| 2020/0199858 A1 | 6/2020 | Elimus et al. |
| 2020/0263400 A1 | 8/2020 | Song et al. |
| 2020/0291627 A9 | 9/2020 | Horwitz et al. |
| 2020/0326734 A1 | 10/2020 | Rodenbeck et al. |
| 2020/0355423 A1 | 11/2020 | Kim et al. |
| 2021/0017010 A1 | 1/2021 | Funke et al. |
| 2021/0041956 A1 | 2/2021 | Hasburgh |
| 2021/0123221 A1 | 4/2021 | Shakkour et al. |

FOREIGN PATENT DOCUMENTS

| | | | | |
|---|---|---|---|---|
| CN | 108755862 | | 11/2018 | |
| CN | 112543611 A | | 3/2021 | |
| CN | 115341621 A | * | 11/2022 | ............... A47J 43/24 |
| EP | 1 961 496 | | 8/2008 | |
| EP | 2 510 164 | | 10/2012 | |
| KR | 20090115442 | | 11/2009 | |
| KR | 101298733 | | 8/2013 | |
| KR | 101626875 | | 6/2016 | |
| WO | WO-2012/033350 A2 | | 3/2012 | |

OTHER PUBLICATIONS

Chinese Office Action issued on Jun. 30, 2025 in Chinese Application No. 202210523197.1.

* cited by examiner

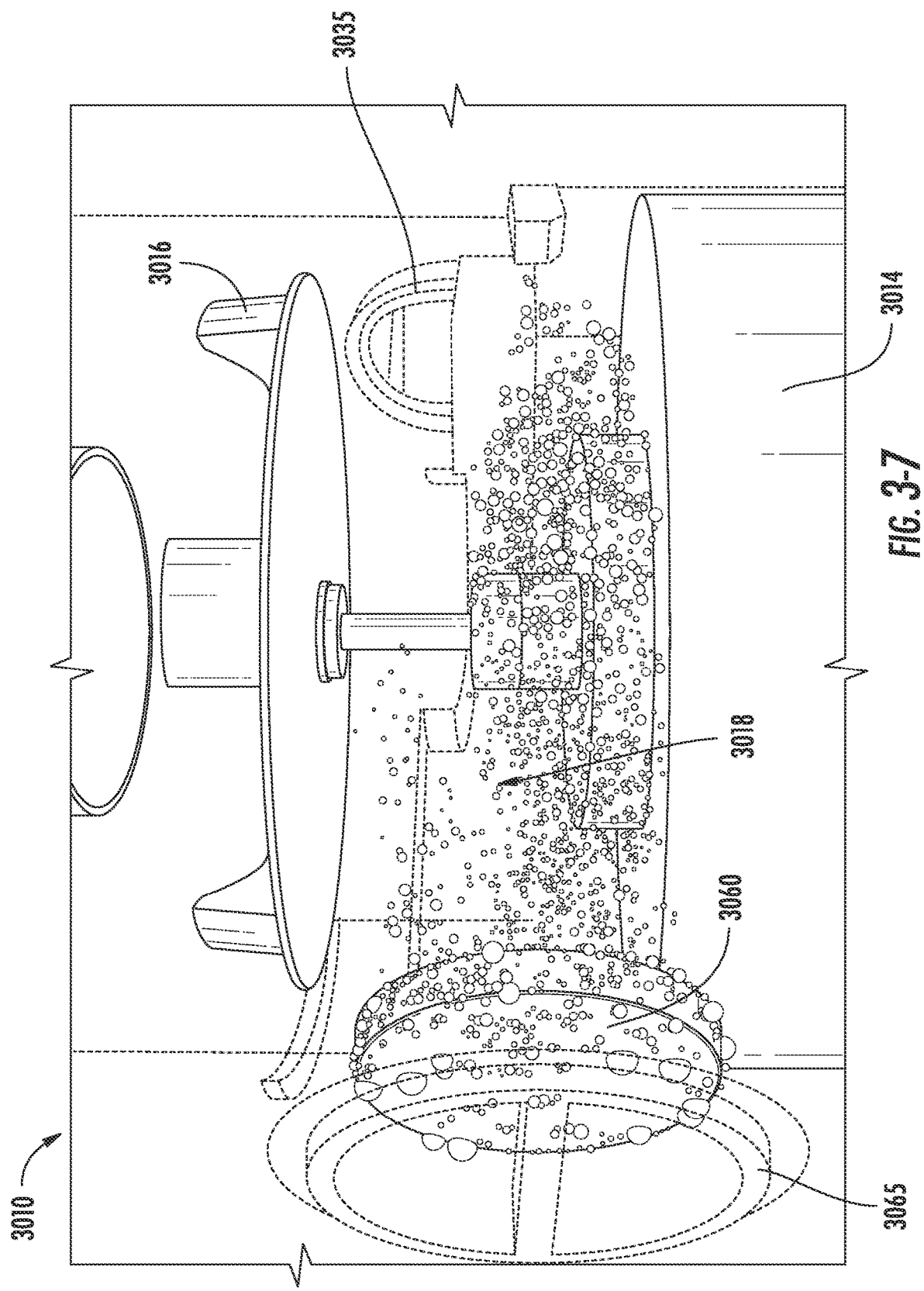

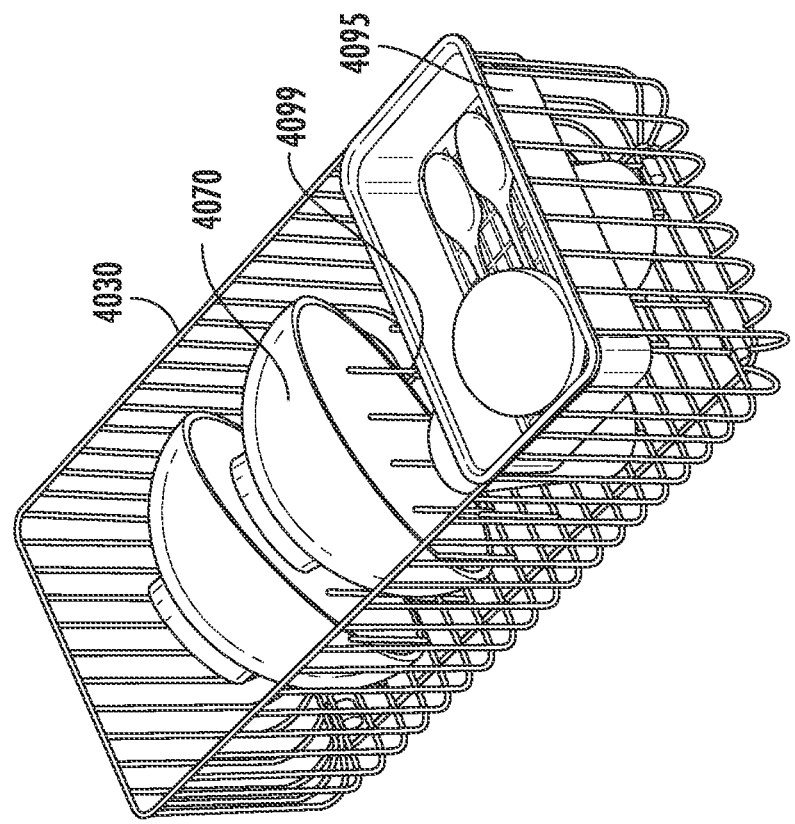
FIG. 4.5B
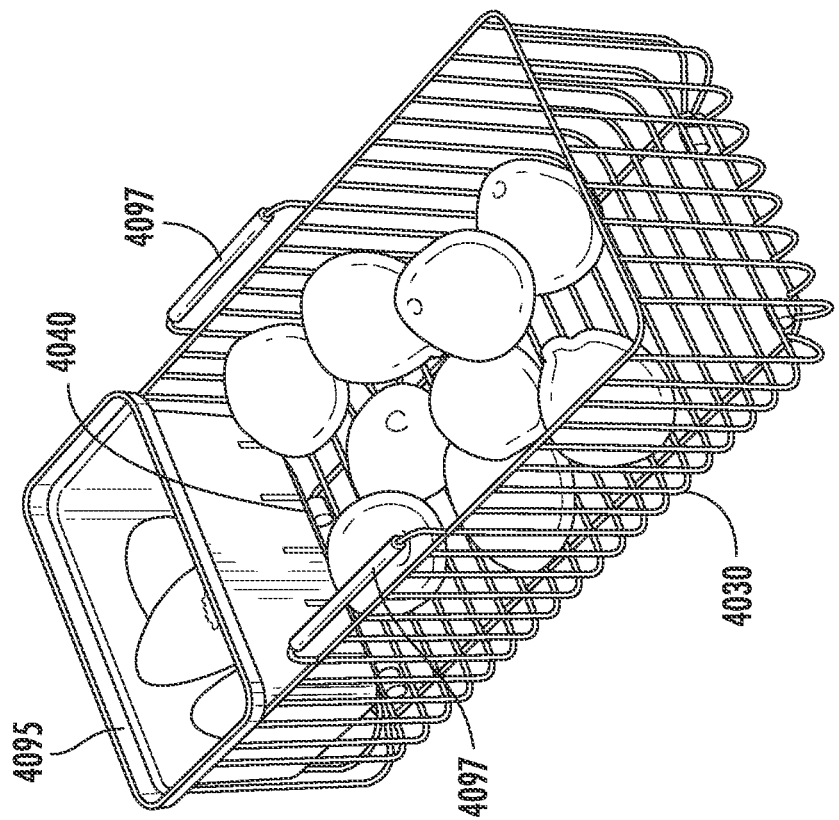
FIG. 4.5A

SINK SYSTEM AND COMPONENTS

CROSS-REFERENCE TO RELATED PATENT APPLICATION

This application claims the benefit of and priority to U.S. Provisional Patent Application No. 63/188,888, filed May 14, 2021, the entire disclosure of which is incorporated by reference herein.

BACKGROUND

The present disclosure relates generally to sinks and more particularly to sinks for use in kitchen environments, bathroom environments, and the like.

Generally speaking, sinks are vessels that are configured for receiving water in a kitchen, bathroom, or other environment. Usually, a faucet or other water delivery device is located proximate to the sink, and a drain pipe is coupled to the sink to remove unwanted water.

The present disclosure is directed to various features that may provide improved functionality for sinks and associated sink systems. These features will be discussed in turn in the disclosure below. It should be understood by those reviewing the present disclosure that any of such features may be utilized alone or in conjunction with other features described herein, and all combinations of such features should be understood as being within the scope of the present disclosure.

SUMMARY

One implementation of the present disclosure is a sink system. The sink system includes a sink basin and a disposal system. The disposal system includes a first inlet coupled to the sink basin, a second inlet fluidly coupled to a second fluid source, and a garbage disposal configured to receive a first flow of fluid from the sink basin via the first inlet and receive a second flow of fluid from a second fluid source via the second inlet. The sink basin delivers a flow of used water to the disposal system and the second fluid source delivers a flow of clean water to the disposal system.

Another implementation of the present disclosure is a sink system. The sink system includes a sink basin, an apron, a storage compartment, and a control system. The apron extends laterally from the sink basin. The storage compartment is at least partially disposed within the apron and pivotable between a closed position and an open position. The storage compartment includes a sanitation system operable to sanitize one or more components positioned within the storage compartment. The control system is operably coupled to the storage compartment and is configured to send a command to the sanitation system. The sanitation system is configured to sanitize the one or more components positioned within the storage compartment in response to receiving an input signal from control system.

Another implementation of the present disclosure is a sink system. The sink system includes a first basin, a second basin, a lid, and a controller. The second basin is positioned adjacent the first basin. The second basin includes a cleaning module and a basket. The cleaning module is at least partially positioned within the second basin. The basket is positioned within the cleaning module. The lid is at least partially positioned over the second basin and pivotably repositionable between an open position and a closed position. The second basin is a cleansing basin configured to clean components positioned therein.

BRIEF DESCRIPTION OF THE FIGURES

The disclosure will become more fully understood from the following detailed description, taken in conjunction with the accompanying figures, wherein like reference numerals refer to like elements, in which:

FIG. 1-2 is a top view of the sink system of FIG. 1-1, according to an exemplary embodiment;

FIG. 2-1 is a perspective, front view of a sink system, according to an exemplary embodiment;

FIG. 2-2 is a perspective view of a cabinet module of FIG. 2-1, according to an exemplary embodiment;

FIG. 2-3 is a perspective view of a faucet of FIG. 2-1, according to an exemplary embodiment;

FIG. 2-4 is a perspective view of a solenoid assembly of the sink system of FIG. 2-1, according to an exemplary embodiment;

FIG. 2-5 is a block diagram of a controller which can be used in the sink system of FIG. 2-1, according to an exemplary embodiment;

FIG. 3-1 is a schematic view of a disposal system, according to an exemplary embodiment;

FIG. 3-2 is a perspective view of a sink system, according to an exemplary embodiment;

FIG. 3-3 is a perspective view of a portion of the disposal system of FIG. 3-1, according to an exemplary embodiment;

FIG. 3-4 is a schematic view of a disposal system, according to an exemplary embodiment;

FIG. 3-5 is a perspective view of a portion of the disposal system of FIG. 3-4, according to an exemplary embodiment;

FIG. 3-6 is a perspective view of a portion of the disposal system of FIG. 3-4, according to an exemplary embodiment;

FIG. 3-7 is a perspective view of a portion of the disposal system of FIG. 3-4, according to an exemplary embodiment;

FIG. 3-8 is an illustration of a process of controlling a disposal system, according to an exemplary embodiment;

FIG. 4-1 is a perspective view of a washing system, according to an exemplary embodiment;

FIG. 4-2 is a top view of a washing system including tableware of FIG. 4-1, according to an exemplary embodiment;

FIG. 4-3 is a top view of a washing system including glasses of FIG. 4-1, with glasses according to an exemplary embodiment;

FIG. 4-4 is a perspective view of the washing system from FIG. 4-1 with a closed lid, according to an exemplary embodiment;

FIG. 4-5A is a perspective view of a washing system accessory configuration of FIG. 4-1, according to exemplary embodiment;

FIG. 4-5B is a perspective view of a washing system accessory configuration of FIG. 4-1, according to an exemplary embodiment;

FIG. 4-6 is a close-up view of a touch-activated controller in FIG. 4-1 according to an exemplary embodiment;

FIG. 4-7 is a block diagram of a method of using the washing system of FIG. 4-1, according to an exemplary embodiment;

FIG. 5-1 is a perspective, top view of a sink system, according to an exemplary embodiment;

FIG. 5-2 is a perspective, top view of the sink system of FIG. 5-1, according to an exemplary embodiment;

FIG. 5-3 is a perspective view of a dishwasher basket of FIG. 5-1, according to an exemplary embodiment;

FIG. 5-4 is a block diagram of a method of controlling a dishwasher module, according to an exemplary embodiment;

FIG. 5-5 is a block diagram of a controller which can be used in a dishwasher module of FIG. 5-1, according to an exemplary embodiment;

FIG. 6-1A is an illustration of an apron-front sink with integrated drying and sanitizing features, shown with a storage compartment in a closed position, according to an exemplary embodiment;

FIG. 6-1B is an illustration of an apron-front sink with integrated drying and sanitizing features, shown with a storage compartment in an open position, according to an exemplary embodiment;

FIG. 6-2 is a block diagram of a storage system, according to an exemplary embodiment;

FIG. 6-3A is a schematic of a storage compartment illustrating the operation of drying and sanitizing features of FIG. 6-1A, according to an exemplary embodiment;

FIG. 6-3B is a schematic of a storage compartment illustrating an internal structure, according to an exemplary embodiment;

FIG. 6-4 is a flow diagram illustrating an process for controlling drying and sanitizing features of FIG. 6-1A, according to an exemplary embodiment;

FIG. 7-1 is a front view of a mounting system, according to an exemplary embodiment;

FIG. 7-2 is a front view of the mounting system from FIG. 7-1 with front cover attached, according to an exemplary embodiment;

FIG. 7-3A is front view of an under-sink space, according to an exemplary embodiment;

FIG. 7-3B is front view of an under-sink space utilizing the mounting system from FIG. 7-1, according to an exemplary embodiment; and FIG. 7-4 is a block diagram of a method of installing the mounting system of FIG. 7-1, according to an exemplary embodiment.

DETAILED DESCRIPTION

General Overview

Figure 1:
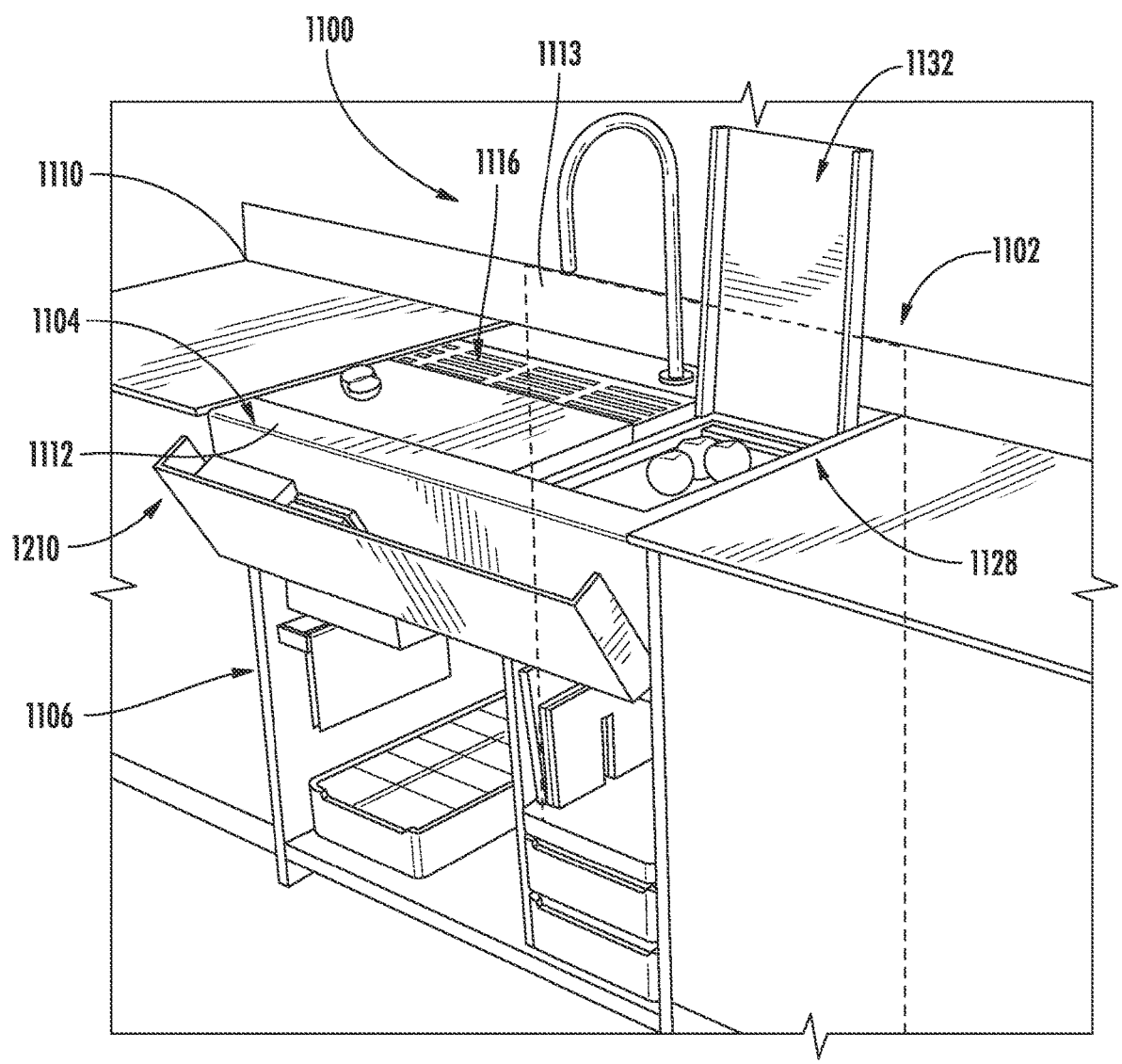
FIG. 1-1 is a perspective view of a sink system according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Generally speaking, a household kitchen may include a sink and a faucet. The sink often includes one or more basins and one or more faucets, where the faucet is manually controlled using a handle. Positioned below the sink are the utility lines for the water connections and drain plumbing. In some embodiments, an electrical outlet is positioned below the sink, allowing for the installation of a garbage disposal. Because the cabinet space below a sink can be damp, difficult to reach, and crowded with utility connections, a user may avoid storing cookware and food below the sink. Instead, the user may decide to store cleaning supplies, tools, and other equipment that would not be safe to store with food.

Referring generally to the FIGURES, a sink system 1100 is shown according to various exemplary embodiments. The sink system 1100 may be configured to replace traditional modular systems (e.g., cabinets, dishwashers, etc.). The sink system 1100 may further comprise a recessed cabinet 1102. In some embodiments, the recessed cabinet space 1102 may be a standard cabinet opening having a width of approximately 36 inches, a depth of approximately 24 inches, and a height of approximately 40 inches, although it should be understood that according to various other exemplary embodiments, other cabinet configurations may be used having differing dimensions. In some embodiments, the recessed cabinet space 1102 may be surrounded on one side by a cabinet and on two sides by walls (e.g., in the corner of a wall). As will be appreciated, the sink system 1100 may be sized to fit most any recessed cabinet space 1102. The recessed cabinet space 1102 may be formed in the cabinets and sized to receive the sink system 1100.

In certain configurations, the sink system 1100 includes electronic features as components thereof. In such configurations, the sink system 1100 may be configured to be installed by plugging the sink system 1100 in to an electrical outlet of the building using one or more power cords. According to an exemplary embodiment, the electronic the accessories provided with the sink system 1100 are already installed and configured to be controlled by a wireless controller. For example, the sink system 1100 may include a first faucet, a second faucet, a spray wand, a side-sprayer, and an integrated dishwasher, each receiving a flow of water from connected utility lines. A user may use the wireless controller to turn on the first faucet and the side-sprayer. The user may also use the wireless controller to turn off the first faucet and the side-sprayer and turn on the integrated dishwasher. With all of the accessories already installed within the sink system 1100, the user only has to connect the utility lines and the power cord to provide water and electricity to the sink system 1100.

The sink system 1100 includes sanitizing features, such as ultraviolet light and sanitizing mists. The ultraviolet lights may be in visual communication with each of the drawers, operatively coupled to the power supply, and controllable by the wireless controller. Similarly, the sanitizing mist may spray into the cabinet below the sink to sanitize sponges, towels, clothes, and anything else stored in the cabinet.

Referring now to FIG. 1-1, the sink system 1100 includes a sink module 1104 and a cabinet module 1106. The sink module 1104 may be coupled to an upper end of the cabinet module 1106 and may be configured to be positioned within the recessed cabinet space 1102 proximate to a countertop 1110. The sink module 1104 includes a top surface 1112 extending about a perimeter of the sink module 1104 and includes a backsplash 1113 extending upward proximate a rear of the sink module 1104, the backsplash 1113 being contiguous with the top surface 1112. When the sink module 1104 may be installed within the recessed cabinet space 1102, the top surface 1112 may be in the same plane as the countertop 1110, so as to provide a cohesive, seamless appearance. In some embodiments, the top surface 1112 may be positioned slightly lower than the countertop 1110. In some embodiments, the top surface 1112 may be adjustable via the cabinet module 1106 to be positioned either above or below the countertop 1110. Similarly, the backsplash 1113 may be contiguous with an existing backsplash of the countertop 1110. The sink module 1104 may be formed of a corrosion-resistant material, such as stainless steel, aluminum, cast iron or plastic. In some embodiments, the sink module 1104 may be formed from sheet metal that may be stamped and bent into the shape of the top surface 1112 and the backsplash 1113. The sink system 1000 may be configured such to be installed within or on top of a standard cabinet module 1106. To be more precise, the standard cabinet module 1106 may be configured such to include a height of at least 36 inches. In some embodiments, the standard cabinet 1106 may include a height less than 36 inches.

Figures 1, 2:
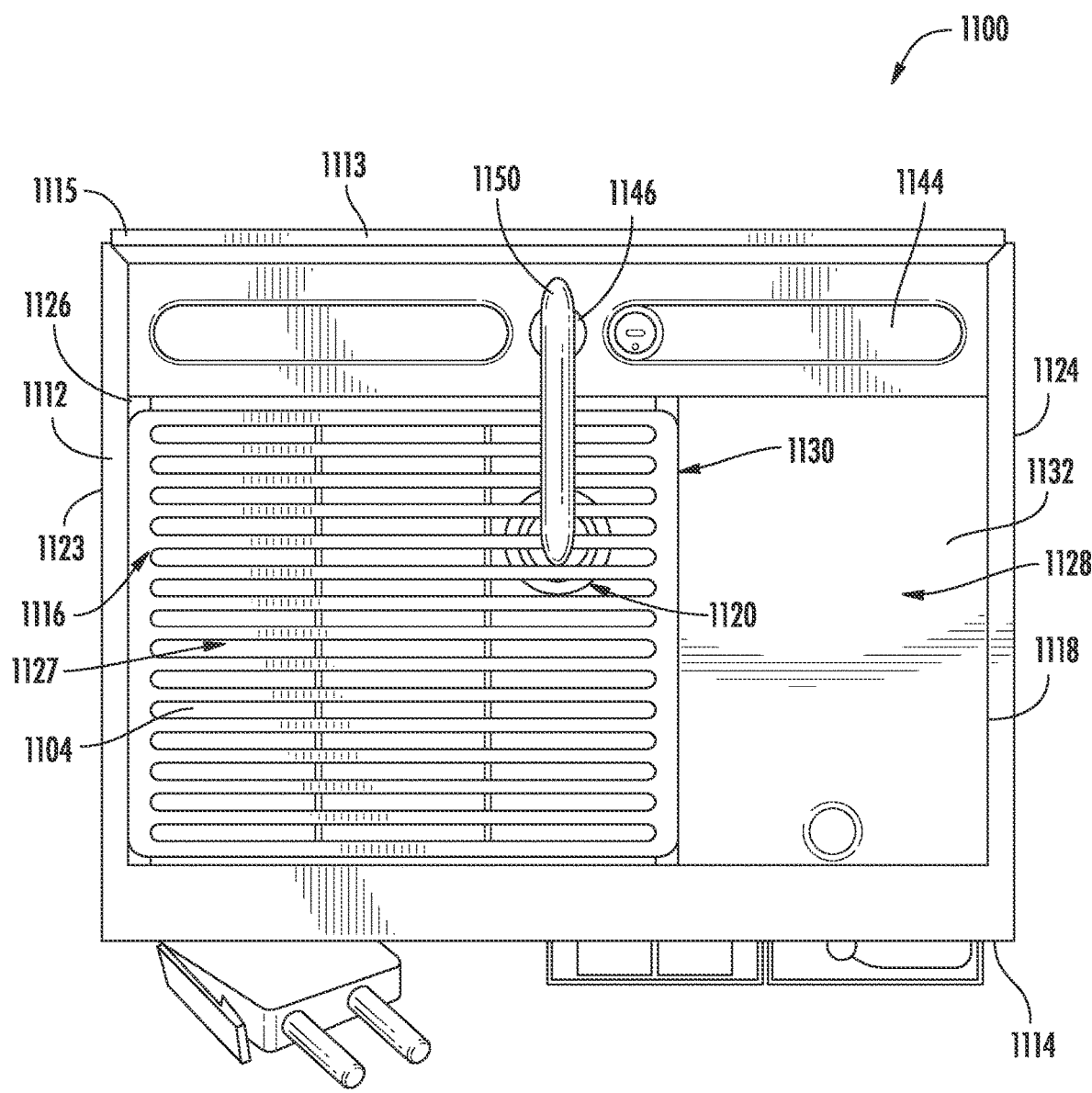

Referring to FIG. 1-2, a top view of the sink system 1100 is shown. The sink module 1104 includes a leading edge 1114 (e.g., front edge, first edge) and a trailing edge 1115 (e.g., rear edge, second edge, etc.) positioned opposite to the leading edge 1114. Extending between the leading edge 1114 and the trailing edge 1115 may be the top surface 1112. Extending orthogonally away from the sink module 1104 proximate to the trailing edge 1115 may be the backsplash 1113. A first basin 1116 extends into the sink module 104 between the leading edge 1114 and the trailing edge 1115 such that a portion of the top surface 1112 may be positioned between the first basin 1116 and the leading edge 1114. The first basin 1116 includes sidewalls 1118, a catch 1120, and a drain opening 1122. The sidewalls 1118 are contiguous with the top surface 1112 and may be formed from the same sheet material as the top surface 1112, such as through stamping and bending. The catch 1120 may be contiguous with the sidewalls 1118 and defines the drain opening 1122. The first basin 1116 may be configured for receiving a flow of liquid and/or waste and delivering the flow to the drain opening 1122. In some embodiments, the drain opening 1122 may be positioned proximate to a corner of the catch 1120. In some embodiments, the drain opening 1122 may be centered in the catch 1120.

As can be appreciated, the first basin 1116 may take a variety of forms, including circular, elliptical, racetrack, obround, rectangular, rounded-corner rectangular, and similar shapes. In some embodiments, the first basin 1116 extends between a first peripheral edge 1123 and a second peripheral edge 1124 of the sink module 1104 such that a narrow portion of the top surface 1112 may be positioned between the first peripheral edge 1123 and the first basin 1116 and a narrow portion of the top surface 1112 may be positioned between the second peripheral edge 1124 and the first basin 1116. In other words, the sink module 1104 may include one basin (e.g., the first basin 1116), commonly referred to as a "single basin" sink. The first basin 1116 may further include a pair of ledges 1126 extending orthogonally into the first basin 1116 and configured to support an accessory within or above the first basin 1116, such as a drying rack and/or a cutting board. The pair of ledges 1126 may extend perpendicularly to the leading edge 1114. In some embodiments, the pair of ledges 1126 extend substantially parallel to the leading edge 1114. A sink rack 1127 may be sized to be positioned across the first basin 1116 and engage with both of the pair of ledges 1126. In some embodiments, the sink rack 1127 may be sized such that both the sink rack 1127 may be positioned on the pair of ledges 1126 at the same time without overlapping one another. The pair of ledges may be offset from the top surface 1112, positioned lower into the first basin 1116. The sink rack 1127 may be sized such that a top-facing surface of the sink rack 1127 may be in the same plane as the top surface 1112.

The sink module 1104 includes self-trimming features that extend over the edges of the countertop 1110 and provide a clean edge. In some embodiments, the countertop 1110 may have rough edges proximate to the recessed cabinet space 1102. As can be appreciated, a perfectly sized recessed cabinet space 1102 may be difficult to build or cut. Accordingly, the top surface 1112 proximate the first peripheral edge 1123 and the second peripheral edge 1124 may extend over the countertop 1110 when the sink system 1100 may be installed in the recessed cabinet space 1102 to cover the rough or imperfect edges of the countertop 1110. A bead of caulk or similar sealant may then be interposed between the top surface 1112 and the countertop 1110.

In some embodiments, the sink module 1104 includes a second basin 1128 extending into the sink module 1104. The second basin 1128 may be positioned in confronting relation to the first basin 1116 and may be similar to the first basin 1116. A difference between the first basin 1116 and the second basin 1128 may be that the second basin 1128 has a greater depth (e.g., distance between the top surface 1112 and the catch). In some embodiments, a partition 1130 extends between the first basin 1116 and the second basin 1128 such that the first basin 1116 and the second basin 1128 are fluidly isolated from one another. The partition 1130 may include one of the pair of ledges 1126. The second basin 1128 may be similar to the first basin 1116 in that the second basin 1128 includes sidewalls and a drain opening. For example, the second basin 1128 may be fluidly coupled to a garbage disposal, making the second basin 1128 a dedicated food waste basin. In some embodiments, the second basin 1128 includes a basin lid 1132 for covering the second basin 1128 and preventing foreign objects from falling into the second basin 1128. The basin lid 1132 may be pivotally coupled to the sink module 1104. The basin lid 1132 may pivot about a pivot axis that extends substantially parallel to the trailing edge 1115. In some embodiments, the basin lid 1132 may be laterally slid in and out of engagement. In still some embodiments, the basin lid 1132 pivots about a pivot axis that extends substantially perpendicular to the trailing edge 1115. In some embodiments, the basin lid 1132 forms a watertight seal about the second basin 1128. In some embodiments, the first basin 1116 includes a basin lid similar to the basin lid 1132.

In some embodiments, the second basin 1128 includes a specialty accessory, such as a convenience dishwasher and/or an ultrasonic/ultraviolet cleaning system. The convenience dishwasher includes a propeller 1137 positioned proximate the catch of the second basin 1128 and configured to spray a fluid, such as water or soapy water, upward toward the basin lid 1132 when the basin lid 1132 may be closed. A rack 1138 may be positioned within the convenience dishwasher and may be configured to position dishes and other utensils away from the propeller 1137 such that the dishes do not interfere with the propeller 1137 as the propeller 1137 rotates. The rack 1138 may be formed of stainless steel, aluminum, plastic, or a similar non-corrosive material. In some embodiments, the rack 1138 includes endcaps or rubber stoppers that prevent the rack 1138 from scratching the sidewalls and the catch of the second basin 1128. To operate the convenience dishwasher, the user may press down on the basin lid 1132 when the basin lid 1132 may be closed. A force on the basin lid 1132 actuates a switch that sends a signal to the sink module 1104 to deliver a flow of water to the propellers 1137. So long as the basin lid 1132 may be being pressed down, the propellers 1137 may rotate and deliver a flow of water. To end the cycle, the user releases the pressure on the basin lid 1132. In some embodiments, the basin lid 1132 latches closed to avoid accidental opening while the propellers are delivering water. By way of example, the basin lid 1132 may be magnetically sealed. In some embodiments, the convenience dishwasher may be controlled by a wireless remote, such as a control puck, touch remote, or mobile device. The convenience dishwasher further includes a waste drain 1135 configured to drain the contents of the second basin 1128. In some embodiments, the convenience dishwasher includes multiple cycle modes and may be operable to run any one of the multiple cycle modes. The multiple cycle modes may include a "rinse" cycle, a "heavy duty" cycle, a "heat-to-dry" cycle, a "sanitize" cycle, and any combination of the "rinse," "heavy duty," "heat-to-dry," and "sanitize" cycles.

The ultrasonic/ultraviolet cleaning system uses sounds and/or light to disinfect kitchen items, such as fruits, vegetables, and dishes. Similar to the convenience dishwasher, the ultrasonic/ultraviolet cleaning system includes the rack 1138 removably positioned within the second basin 1128. Positioned within the basin lid 1132 may be an ultraviolet light 1140. The ultraviolet light 1140 may be positioned in fluid communication with the second basin 1128 whether the second basin 1128 may be a wash basin similar to the first basin 1116, the convenience dishwasher, or the ultrasonic/ultraviolet cleaning system.

Positioned between the backsplash 1113 and the first basin 1116 may be a recessed surface 1144, recessed relative to the top surface 1112. The recessed surface 1144 provides a space for a user of the sink module 1104 to place soap bottles, sponges, and the like. The recessed surface 1144 may be rectangular and may be contiguous with the sidewalls 1118 of the first basin 1116 such that waste and fluids from the recessed surface 1144 can easily be wiped into the first basin 1116. Extending through a central portion of the recessed surface 1144 may be an opening 1146 for receiving the shank of a faucet 1150. The faucet 1150 extends through the opening 1146 and may be operable to provide a spray to both the first basin 1116 and the second basin 1128. The faucet 1150 may be a goose-neck faucet, as shown, or any type of faucet configured for discharging a fluid in both the first basin 1116 and the second basin 1128.

The following paragraphs will discuss various features that may be used in conjunction with a sink system such as that described with respect to sink system 1100. As mentioned above, it should be understood that a sink system may include any one or more of the following features, which may be used alone or in any combination with the other features described herein.

Cabinet Door Sensor System

Referring now to FIG. 2-1, a perspective, front view of a sink system 2000 is shown, according to an exemplary embodiment. The sink system 2000 may include a sink module 2010 and a cabinet module 2020. The sink module 2010 may be configured to be positioned on top of the cabinet module 2020. In some embodiments, the sink module 2010 may contain a continuous base that acts as a ground support. The sink module 2010 may be configured to receive a material (e.g., water, liquid, waste, food, etc.) from a faucet, shown as faucet 2030. The faucet 2030 may be positioned proximate and on top of the sink module 2010. By way of example, the faucet 2030 may be actuated between an on and off position such that the faucet 2030 may selectively output material. The faucet 2030 may be actuated between the on and off position by a handle, shown as faucet handle 2040. According to an exemplary embodiment, the faucet 2030 may be actuated between the on and off position by interfacing with a touchless sensor, where the touchless sensor may be located along any location of the sink system 2000. In some embodiments, the faucet 2030 may be actuated between the on and off position using voice control. In still some embodiments, the faucet may be actuated between the on and off position by interfacing with an app, where the app can further include temperature control. The faucet handle 2040 may be positioned proximate to the base of the faucet 2030, where the faucet handle 2040 may be selectively rotational about the faucet 2030. The user may provide a force on the faucet handle 2040, in a direction distal to the faucet 2030, to actuate the faucet 2030 between the on and off position. Furthermore, the user may provide a rotational force onto the faucet handle 2040, in a direction substantially parallel to the faucet 2030, to change the temperature of the material being disposed by the faucet 2030. By way of example, the user may rotate the faucet handle 2040 proximal to a backsplash 2050 such to increase the temperature of the material disposed of by the faucet 2030.

The sink system 2000 includes a sensor system, shown as sensor system 2100. The sensor system 2100 may be configured to include a plurality of sensors (e.g., sensors 2110, 2120, and 2130, although greater or fewer sensors may be utilized according to other exemplary embodiments) that are positioned within various components of the sink system 2000.

The sensor system 2100 may be configured to provide a signal (or signals) to a communication interface to operate or actuate various components of the sink system 2000. By way of example, the sensor system 2100 may include a touchless sensor system 2100 having a sensor range 2140. In such an embodiment, the user may place or wave a portion of their body (e.g., a foot) near the sensor within the sensor range 2140 to actuate various components of the sink system 2000. according to an exemplary embodiment, first sensor 2110 may be configured to include a first sensor range 2142, the second sensor 2120 may be configured to include a second sensor range 2144, and the third sensor 2130 may be configured to include a third sensor range 2146.

The sensor system 2100 may include at least one of a first sensor 2110, a second sensor 2120, and a third sensor 2130. The first sensor 2110 may be configured to be disposed within a first sensor housing 2150, the second sensor 2120 may be configured to be disposed within a second sensor housing 2160, and the third sensor 2130 may be configured to be disposed within a third sensor housing 2170. The first sensor housing 2150 may be configured to be positioned within the cabinet module 2020, proximate to a base. The second sensor housing 2160 may be configured to be positioned within the cabinet module 2020, proximate to the base and at a distance from the first sensor housing 2150. By way of example, the first sensor housing 2150 and the second sensor housing 2160 may be positioned on opposite ends of the cabinet module 2020. In some embodiments, the first sensor housing 2150 and the second sensor housing 2160 may be positioned adjacent each other at any location along the cabinet module 2020. In still some embodiments, the first sensor housing 2150 and the second sensor housing 2160 are positioned along the sink module 2010. The third sensor housing 2170 may be configured to be positioned within the faucet 2030, proximate a top of the faucet 2030.

Referring to FIG. 2-2, a perspective view of the cabinet module 2020 of FIG. 2-1 is shown. As shown, the first sensor 2110 and the second sensor 2120 are configured to be positioned along the base of the cabinet module 2020, such that when the user places a foot within the first sensor range 2142 or the second sensor range 2144, a component of the sink system 2000 may be actuated. By way of example, the user may adjust the temperature of water discharged from a faucet 2030 using their feet, such as by introducing or moving a foot within the first sensor range 2142 or the second sensor range 2144. For example, when the user places a foot within the first sensor range 2142, the temperature of the water may be increased, and when the user places the foot within the second sensor range 2144, the temperature of the material may be decreased. In some embodiments, the first sensor 2110 may control decreasing the temperature of the water and the second sensor 2120 may control increasing the temperature of the water. In still other embodiments, at least one of the first sensor 2110 and the second sensor 2120 may control actuation of the faucet 2030 between an on and off position.

According to another exemplary embodiment, at least one of the first sensor 2110 and the second sensor 2120 may be configured to allow a user to open a cabinet door in a hands-free manner. For example, the user may interact with the first sensor 2110 to open a cabinet door proximate the left side of the sink system 2000 and/or may interact with the second sensor 2120 to open a cabinet door proximate the right side of the sink system 2000. A signal may be sent from the relevant sensor to a system which in turn uses a motor or other device to move the door from the closed to the open position. According to one embodiment, the relevant cabinet door may be fully opened by such action, while in other embodiments, the cabinet door may be opened only a small amount to allow the user to more the door the rest of the desired distance manually.

Figures 1, 2:
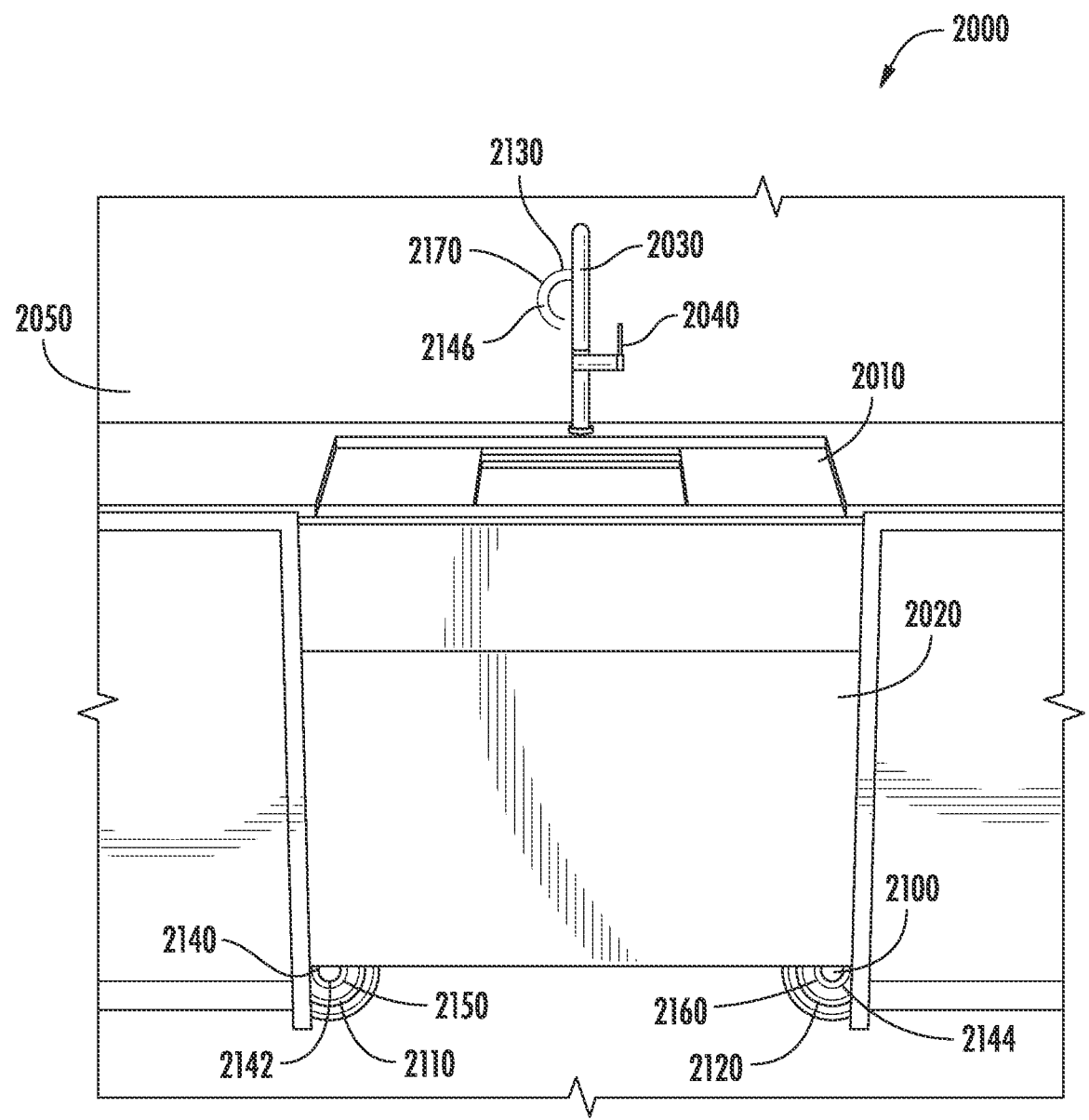
Figure 2:
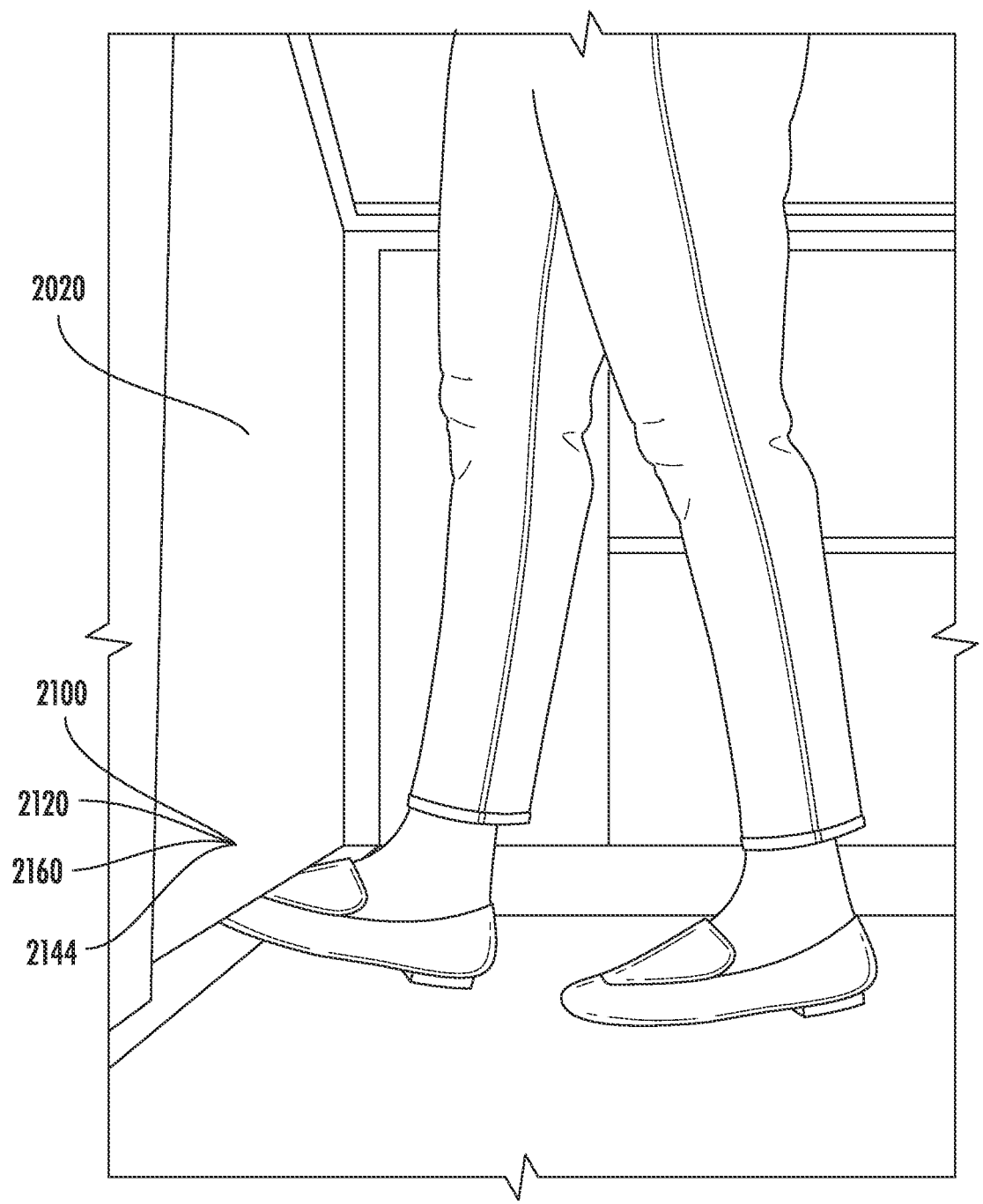
Figures 2, 3:
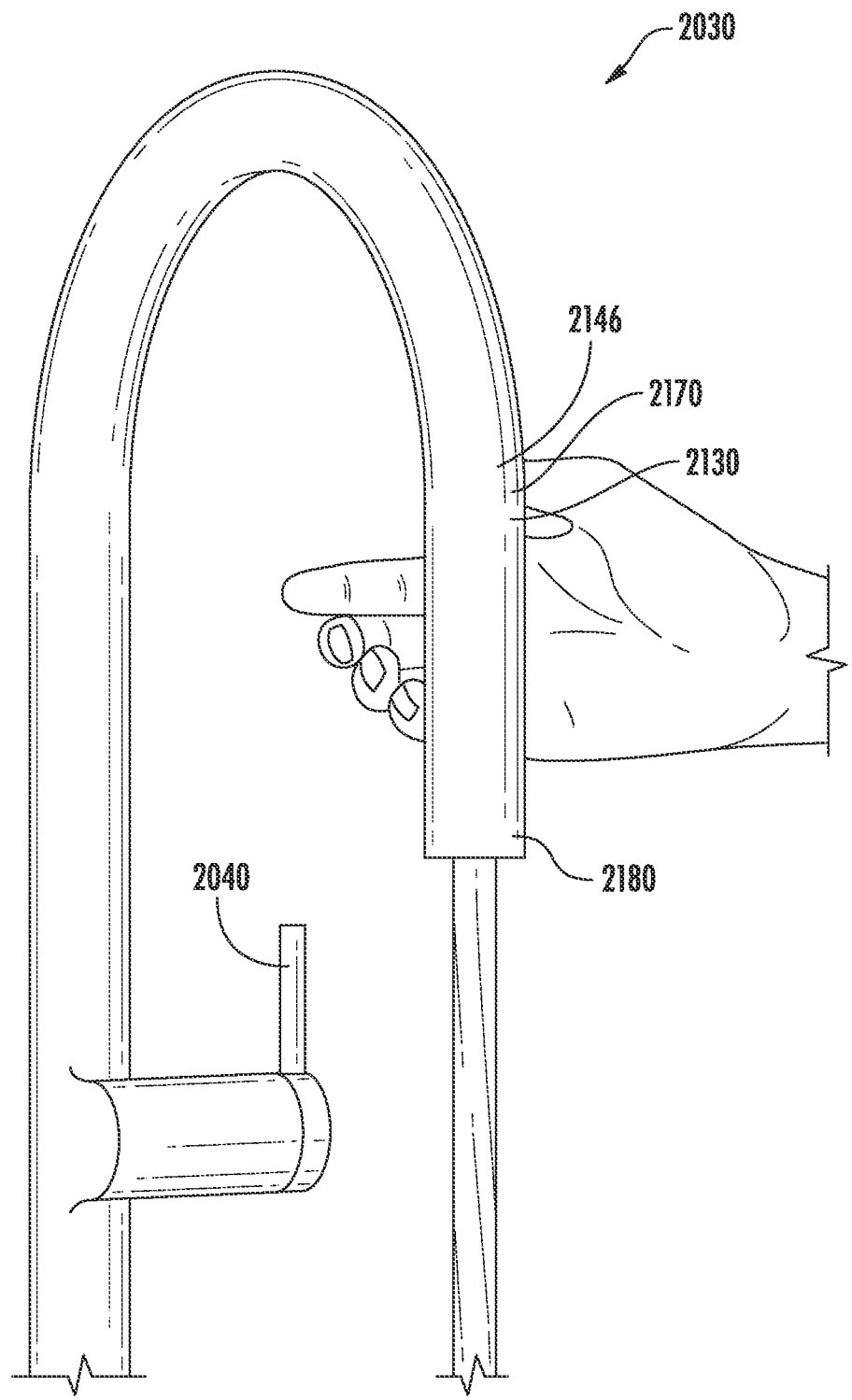

Referring now to FIG. 2-3, a perspective view of the faucet 2030 of FIG. 2-1 is shown. The faucet 2030 may include one or more sensors in addition to those included in the cabinet so as to provide additional controls for the faucet (e.g., the faucet may be turned on and off using the sensors near the floor, while the sensors on the faucet can be used to also control the on/off state of the faucet and/or to control temperature of the water flowing out of the faucet, etc.). The faucet 2130 includes an outlet, shown as faucet outlet 2180. The faucet outlet 2180 may be configured to facilitate the flow of fluid (e.g., water) out of the faucet 2030. The third sensor 2130 may be configured to be positioned within the faucet 2030, proximate to the faucet outlet 2180. By way of example, positioning the third sensor 2130 proximate to the faucet outlet 2180 allows interfacing between the user and the third sensor 2130 to be more advantageous than if the third sensor 2130 was positioned distal to the faucet outlet 2180. In some embodiments, the third sensor 2130 may be positioned distal to the faucet outlet 2180.

The third sensor 2130 may be configured to sense, within the third sensor range 2146, a hand of the user. When the user holds or waves the hand through the third sensor range 2146, the third sensor 2130 may actuate the faucet 2030 between the on and off position. In some embodiments, the third sensor 2130 may be actuated such to change the temperature of the material flowing out of the faucet outlet 2180.

Figures 2, 3, 4:
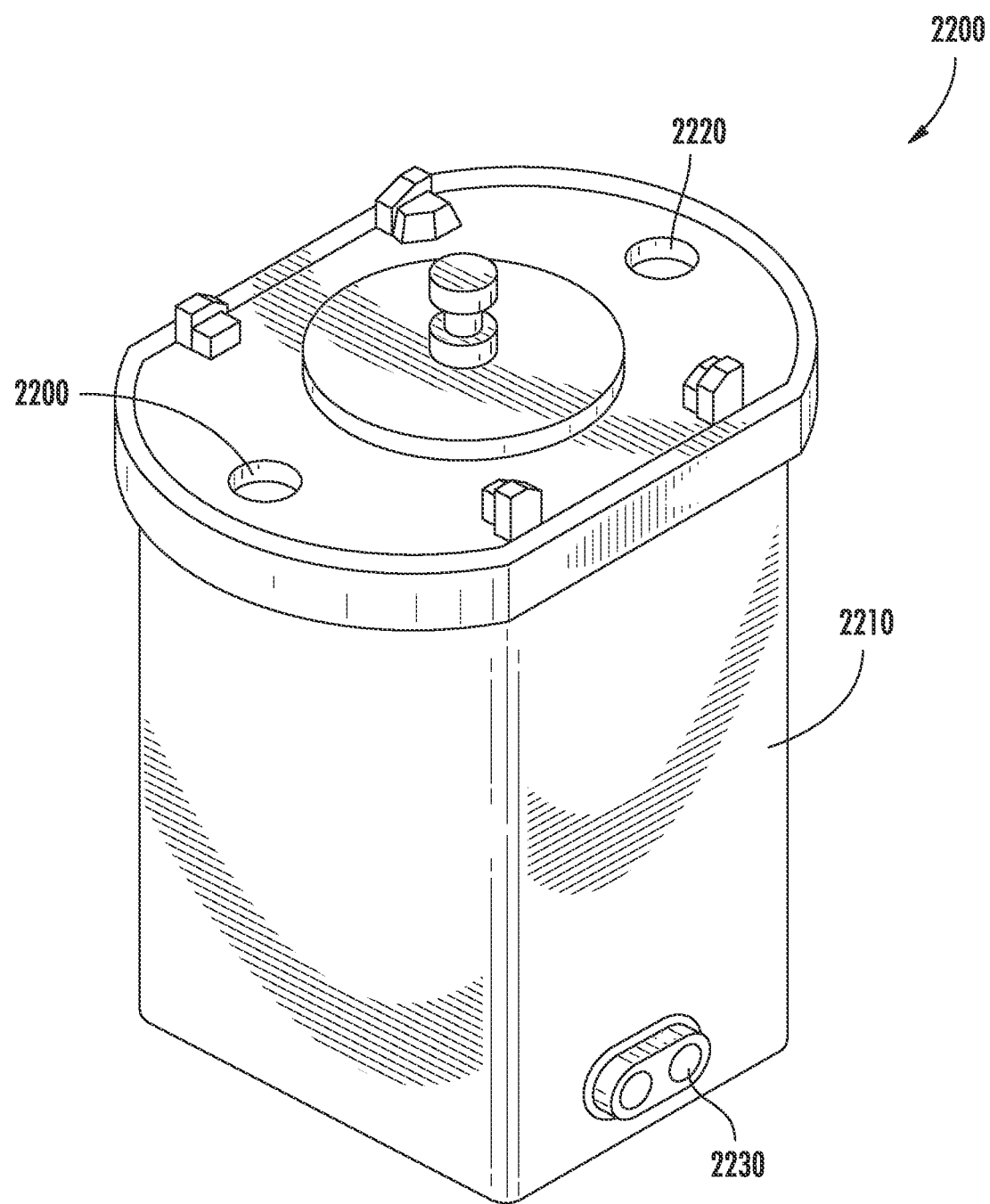

The sink system 2000 includes a controller such as a solenoid assembly 2200. Referring to FIG. 2-4, a perspective view of the solenoid assembly 2200 that may be included within the sink system 2000 is shown. The solenoid assembly 2200 may be configured to be coupled to diaphragm assembly 2210 via features 2220. Solenoid assembly 2200 also includes feature 2230, which facilitates receipt of signals from at least one of the plurality of sensors 2110-2130. During operation, at least one of the plurality of sensors 2110-2130 within at least one of the sensor housings 2150-2170 sends a signal to solenoid assembly 2200 in response to a detection (e.g., presence of a user, proximity of the hand, proximity of the foot, etc.). Solenoid assembly 2200 consequently causes diaphragm assembly 2210 to open material passageways therein, allowing hot water, cold water, or a combination thereof to flow in direction of the faucet 2030.

By way of example, the sink system 2000 may include a plurality of solenoid assemblies 2200, such that each solenoid assembly 2200 may be controlled from each of the plurality of sensors 2110-2130. For example, the first sensor 2110 may be operably coupled to a first solenoid assembly. The first solenoid assembly may be configured to actuate a hot water passageway when the first sensor 2110 interfaces with the portion of the user's body. In yet another example, the second sensor 2120 may be operably coupled to a second solenoid assembly. The second solenoid assembly may be configured to actuate a cold water passageway when the second sensor 2120 interfaces with the portion of the user's body. In yet another example, the third sensor 2130 may be operably coupled to a third solenoid assembly. The third solenoid assembly may be configured to actuate the faucet 2030 between the on and the off position when the third sensor 2130 interfaces with the portion of the user's body. The solenoid assembly 2200 may be configured to actuate any component of the sink system 2000.

Referring now to FIG. 2-5, a control module (e.g., remote control, control interface, etc.) is shown as a controller 2300. The controller 2300 may be configured to effect contactless control of the solenoid assembly 2200. The controller 2300 includes a wireless communication device (e.g., control communication 2310), a power supply 2320, a processing logic 2330, and a memory 2340. Speaking generally, the controller 2300 may be able to communicate with the solenoid assembly 2200. The controller 2300 may transmit, via the control communication 2310, an instruction to the solenoid assembly 2200 to open or close a material passageway. The solenoid assembly 2200 may receive the signal and relay the signal to then actuate the material passageway into an open or closed position.

The power supply 2320 may be configured to power the controller 2300. The power supply 2320 may include disposable batteries (e.g., alkaline, lithium, zinc-air, etc.) or rechargeable batteries (lithium ion, nickel-cadmium, etc.). The controller 2300 may plug into an outlet and receive either AC or DC current. In some embodiments, the controller 2300 may be powered wirelessly by inductive charging. For example, the controller 2300 may be mounted to a wall, behind which a wireless charger (e.g., copper coil, magnetic loop antenna, etc.) may be positioned. The wireless charger may then interface with the power supply 2320, the power supply 2320 structured to wirelessly charge by the wireless charger positioned behind the wall.

The processing logic 2330 may be configured to send signals to, and receive signals from, via the control communication 2310. The processing logic 2330 may be operably coupled to the memory 2340, where instructions for how to respond to various signals may be stored. The memory 2340 may be a non-transitory memory that includes instructions. In some embodiments, the instructions are added to the memory 2340 during manufacturing and inaccessible to a user. For example, the memory 2340 may store instructions for how the solenoid assembly 2200 may be to be controlled to open or close at least one of the hot and cold material passageways. The memory 2340 may be structured such that a user may be unable to change how the solenoid assembly 2200 responds to receiving the instruction from controller 2300.

A button may be operably coupled to the controller 2300 such that actuation of the button sends a signal to the processing logic 2330. The button may be a push button, a capacitive button, a touch sensor, a proximity sensor, a heat sensor, a beam-break sensor, or rendered on a screen to be operated by either touch or a mouse cursor. For example, the controller 2300 may include a push button corresponding to the hot material passageway. When the hot water passageway button may be actuated, the button may send a signal to the processing logic 2330, prompting the processing logic 2330 to compare the signal received with a set of instructions stored in the memory 2340. Once the instructions are received by the processing logic 2330, the processing logic 2330 prompts the control communication 2310 to send a signal to the solenoid assembly to actuate the hot material passageway. In some embodiments, the controller 2300 will send the signal regardless of the power state of the solenoid assembly 2200 (e.g., whether or not the solenoid assembly 2200 is on). In some embodiments, the controller 2300 may send the signal to two different material passageways (e.g., the hot material passageway and the cold material passageway).

According to an exemplary embodiment, at least one of the plurality of sensors 2110-2130 may control actuation of a garbage disposal. By way of example, placing a portion of the users body within at least one of the plurality of sensors 2110-2130 actuates the garbage disposal between an on and off position. In such an embodiment, the portion of the user's body that actuates the garbage disposal may remain within at least one of a plurality of sensor ranges 2142-2146 to maintain actuation of the garage disposal. It may be seen as advantageous for safety to keep the portion of the user's body within at least one of the plurality of sensor ranges 2142-2146 when the garbage disposal may be in the on position.

According to yet another exemplary embodiment, an additional sensor may be positioned anywhere within the sink system 2000 to control various components of the sink system 2000. In some embodiments, the additional sensor may be positioned proximal to the sink module 2010 where the user may interface with the additional sensor.

Garbage Disposal with Direct Water Injection

Conventional garbage disposals are mounted below a sink and coupled to the outlet (drain) of the sink. As such, conventional garbage disposals rely on a flow of water from the sink (e.g., water from the faucet which flows into the sink and then into the garbage disposal via the sink's drain) to provide lubrication and cleaning during operation. Typically, a user would actuate a faucet to begin a flow of water and then manually turn on the garbage disposal once the water was running. When the use of the garbage disposal may be complete, the disposal would be turned off, followed by the faucet.

Referring now generally to FIGS. 3-1 through 3-8, a disposal system 3000 is shown according to various exemplary embodiments. The disposal system 3000 may be configured such that rather than having water provided to the disposal from the faucet, water may be instead directly injected into a garbage disposal 3010 such that the garbage disposal 3010 can operate independently (e.g., without fluid from a source outside the system such as a faucet). The disposal system 3000 may include at least one component for cleaning the garbage disposal 3010. The disposal system 3000 may include at least one controller component for controlling the disposal system 3000.

Referring to FIG. 3-1, a schematic view of the disposal system 3000 is shown, according to an exemplary embodiment. As best shown in FIG. 3-2, the disposal system 3000 may be coupled with a sink system 3100 where the disposal system 3000 may be configured to dispose of food or other kitchen waste, according to an exemplary embodiment. The disposal system 3000 may be shown to include at least one first fluid source 3019 and at least one second fluid source 3020 fluidly coupled with the garbage disposal 3010. The first fluid source 3019 may direct fluid (e.g., water) to at least one inlet 3030 of the garbage disposal 3010. For example, the inlet 3030 may be a conduit, pipe, opening, or the like configured to receiving a material into the garbage disposal 3010. The second fluid source 3020 may direct fluid (e.g., water) to at least one inlet 3030 of the garbage disposal 3010. For example, the inlet 3030 may be a conduit, pipe, opening, or the like configured to receive a material (e.g., fluid, waste, food, etc.) into the garbage disposal 3010. In some embodiments, the inlet 3030 may be positioned on a side portion of the garbage disposal. In other embodiments, the inlet 3030 may be positioned on a top or bottom portion of the garbage disposal. According to some embodiments, the garbage disposal 3010 may include one inlet 3030. In other embodiments, the garbage disposal 3010 may include a plurality of inlets 3030 (e.g., two, three, four, etc.).

The sink system 3100 may include at least one of a sink module 3110 and a cabinet module 3120. The sink module 3110 may be configured to be positioned on top of the cabinet module 3120. The sink module 3110 may be further configured to receive a material (e.g., fluid, waste, food, etc.) from a faucet, shown as faucet 3130, via the sink basin 3115. The faucet 3130 may be positioned proximate and on top of the sink module 3110. By way of example, the faucet 3130 may be actuated between an "on" and "off" position such that the faucet 3130 may selectively output material. The sink module 3110 may include at least one basin 3115. The basin 3115 may be configured for receiving a flow of liquid and/or waste and delivering the flow to a drain opening (not pictured). In some embodiments, the drain opening may be fluidly coupled with the disposal system 3000. For example, the drain opening may be fluidly coupled with at least one of the inlets 3030 of the garbage disposal.

The fluid sources 3019, 3020 may be coupled directly with the garbage disposal 3010 such that the disposal system 3000 may operate without the use of an additional outside fluid source. For example, the fluid sources 3019, 3020 may be directly connected to the garbage disposal 3010 such that the garbage disposal 3010 may operate without receiving water, or other fluid, from another component of the sink system 3100, such as the faucet 3130. The first fluid source 3019 may direct fluid into the garbage disposal 3010 such that the garbage disposal 3010 may operate even while no fluid may be present within a basin 3115 of the sink system 3100, as another example. By way of example, waste may be expelled from the basin 3115 through the drain opening to the garbage disposal 3010. The garbage disposal 3010 may then be configured to break down and dispose of the waste, even without a user actuating the faucet 3130 into an "on" position.

The disposal system 3000 may include a valve 3018 fluidly coupled to the inlet 3030. The valve 3018 may be positioned at an intersection from the fluid sources 3019, 3020 and further selectively repositionable multiple positions. That is, the valve 3018 may be repositionable between a first position, a second position, and a third position. The first position may be a position where the garbage disposal 3010 receives a flow of water from the first fluid source 3019. The second position may be a position where the garbage disposal 3010 receives a flow of water from the second fluid source 3020. The third position may be a position where the garbage disposal 3010 receives a flow of water from both the fluid sources 3019, 3020.

Referring now to FIG. 3-3, a perspective view of a portion of the disposal system 3000 of FIG. 3-1 is shown. As shown, the garbage disposal 3010 may include a body 3012. For example, the body 3012 may be an exterior housing, casing, or the like that encloses the internal components (e.g., fluid, waste, etc.) of the garbage disposal 3010. The body 3012 of the garbage disposal 3010 may include at least one generator 3014 (e.g., motors, gearboxes, turbines, etc.). The at least one generator 3014 may be coupled with at least one grinding element 3016 (e.g., blade, serrated projection, etc.) to facilitate breaking down and disposing waste. The body 3012 of the garbage disposal 3010 may include at least one main chamber 3018. For example, the main chamber 3018 may be a portion within the body 3012 of the garbage disposal 3010 in which fluid and waste combine with the at least one grinding element 3016 (e.g., a rotating blade). The garbage disposal 3010 may include at least one outlet 3035 to expel fluid, food, and/or other waste from the garbage disposal 3010. The at least one outlet 3035 may be fluidly coupled to a sewer line.

The disposal system 3000 may be configured to receive multiple types of fluid and other substances to assist in disposing of waste. For example, the second fluid source 3020 may provide the garbage disposal 3010 with water (e.g., from a water delivery system, pipeline manifold, etc.) directly to the body 3012 through the at least one inlet 3030. The disposal system 3000 may include multiple fluid sources 3020 to provide the body 3012 of the garbage disposal 3010 with water from various sources (e.g., water delivery system, pipeline manifold, etc.), as another example. The disposal system 3000 may include a second fluid source 3020 to provide the body 3012 of the garbage disposal 3010 with "gray" water (e.g., recirculated, recycled, reused, unfiltered, etc.). The disposal system 3000 may include the fluid sources 3019, 3020 to provide the body 3012 of the garbage disposal 3010 with "gray" water (recirculated, reused, unfiltered, etc.), "fresh" water (e.g., from a water delivery system, pipelines manifold, etc.), or any combination thereof. According to an exemplary embodiment, the disposal system 3000 may include a first fluid source 3019 directed to the inlet 3030 of the garbage disposal and a second fluid source 3020 directed to the inlet 3030 of the garbage disposal 3010. In such an embodiment, the first fluid source 3019 may be configured to direct "fresh" water to the first inlet 3030 and the second fluid source 3020 may be configured to direct "gray" water to the second inlet 3030. In other embodiments, the garbage disposal 3010 may include more or fewer inlets 3030 to receive the fluid sources 3020.

The disposal system 3000 may include at least one component to assist in cleaning the garbage disposal 3010. For example, the disposal system 3000 may include a cleaning component 3060 (e.g., chemical, soap, fragrance, etc.) to clean the garbage disposal 3010 and reduce odor within the disposal system 3000. The cleaning component 3060 may be provided to the garbage disposal 3010 in various ways. According to an exemplary embodiment, the cleaning component 3060 may be provided to the garbage disposal 3010 through the one or more inlets 3030. For example, the cleaning component 3060 may be provided by a source external to the garbage disposal 3010 through an inlet 3030. The cleaning component 3060 may then be combined with liquid, air, or another component to activate (e.g., release chemicals, form bubbles, etc.) cleaning of the garbage disposal 3010. According to another exemplary embodiment, the cleaning component 3060 may be internally disposed within the garbage disposal 3010, as depicted in FIGS. 3-3 and 3-7. In other exemplary embodiments, the cleaning component 3060 may be provided to the garbage disposal 3010 in other similar ways. The disposal system 3000 may be configured to utilize the cleaning component 3060 based on the user's discretion. For example, the disposal system 3000 may be configured for the user to install the cleaning component 3060 (e.g., fill, refill, load, unload, etc.). Specifically, the disposal system 3000 may be configured such that the user can replace, refill, reload, or otherwise remove the cleaning component 3060 from the disposal system 3000 at any time.

Referring to FIG. 3-4, a schematic view of the disposal system 3000 is shown. According to an exemplary embodiment, the disposal system 3000 may be used for controlling and operating the garbage disposal 3010. For example, the disposal system 3000 in FIG. 3-4 is shown to include a controller 3040 communicably coupled to the disposal 3010 and one or more sensors 3050 (e.g., transducers, measurement devices, buttons, switches, user input devices, flow sensors, etc.). In some embodiments, the controller 3040 may be internal to a component of the disposal system 3000 and/or the sink system 3100. For example, the controller 3040 may be incorporated into a computing system for the disposal system 3000 and/or sink system 3100. The controller 3040 may be incorporated or a component of an application-specific integrated circuit (ASIC) for the disposal system 3000 and/or the sink system 3100. In some embodiments, the controller 3040 may be external to and communicably coupled (e.g., via various application programming interfaces (APIs)) to the disposal system 3000 and/or the sink system 3100. The controller 3040 may be configured to generate control signals for the disposal system 3000 based on the user's input to a control member 3070, as shown in FIGS. 3-5 and 3-6.

The sensors 3050 may be arranged to detect user input (e.g., gestures, interactions, etc.) directed to the control member 3070. For example, the user may interact with (e.g., touch, press, etc.) a portion of the control member 3070 to activate the disposal system 3000. In some embodiments, the sensors 3050 may transmit data corresponding to the interactions to the controller 3040. The controller 3040 may be configured to parse the data from the sensors 3050 to control the disposal system 3000. In other embodiments, the controller 3040 may detect the user input without use of the sensors 3050. In some embodiments, the sensors 3050 include one or more buttons, switches, or other user-operable components through which a user provides an input to activate or deactivate the disposal system 3000. The user input can include, for example, the user flipping a switch to activate or deactivate the disposal system 3000, pressing a button to initiate a pre-programmed disposal cycle, providing a non-touch input such as a gesture, or any other type of user input to interact with the disposal system 3000. In some embodiments, the sensors 3050 include wireless or wired communications interfaces configured to detect an electronic signal from a remote device (e.g., a smart phone, a tablet, a separate control panel, a home automation system, etc.) through which a user can provide input to the disposal system 3000. The sensors 3050 may translate the user input into input signals for the controller 3040. In some embodiments, the sensors 3050 can include sensing elements such as temperature sensors, flow rate sensors, pressure sensors, or any other type of transducer configured to provide input signals to the controller 3040. Various examples and further details are described in greater detail below.

As best shown in FIGS. 3-5 and 3-6 the disposal system 3000 may be configured to receive the user input to the control member 3070. For example, the user may press an element (e.g., location, button, switch, etc.) to activate the disposal system 3000. The sensors 3050 may be configured to generate data corresponding to the user inputs. The sensors 3050 may be configured to transmit, send, or otherwise provide the data to the controller 3040 for interpretation. The controller 3040 may be configured to parse the data from the sensors 3050 to generate one or more control signals for controlling the disposal system 3000. According to an exemplary embodiment, the controller 3040 may control operating the garbage disposal 3010 for a predetermined amount of time such that the disposal system 3000 can complete an "activation cycle" (e.g., activate for five seconds, for ten seconds, etc.) to dispose of waste. For example, the user may provide inputs to the control member 3070 to commence activation of the disposal system 3000 to operate (e.g., turn on) for a set amount of time. The user may then walk away while the disposal system 3000 continues to operate until the set amount of time has elapsed, at which time the controller 3040 automatically causes the disposal system 3000 to cease operation (e.g., turn off). For example, based on the user inputs, the controller 3040 may control directing a predetermined amount of fluid from the second fluid source 3020 to the garbage disposal 3010 and activating (e.g., turning on/off the generator 3014) the garbage disposal 3010 for a predetermined amount of time. It should be understood by those reviewing the present disclosure that the example provided of turning on/off the fluid source and the garbage disposal are only two functions, and that other functions may be controlled in other embodiments, and that the specifics of the control member may vary according to still other embodiments. The examples shown herein should be taken as examples and not as limiting.

According to an exemplary embodiment, the controller 3040 may be configured to control the valve 3018. The controller 3040 may be configured to control repositioning the valve 3018 between the first position, the second position, and the third position to direct a flow of fluid to the inlet 3030. For example, the sensors 3050 may be flow sensors configured to detect a flow of fluid from the second fluid source 3019. If the sensors 3050 do not detect a flow of fluid from the second fluid source 3020, the controller 3040 may send a command to reposition the valve 3018 into the first position. If the sensors 3050 detect a flow a flow of fluid from the second fluid source 3020, the controller 3040 may send a command to reposition the valve 3018 into either the second position or the third position based on a rate of the second flow of fluid.

According to an exemplary embodiment, the controller 3040 may be configured to control the cleaning component 3060. For example, the controller 3040 may be configured to control activation of directing the cleaning component 3060 to the garbage disposal 3010 through the one or more inlets 3030. As another example, the controller 3040 may be configured to control activation of the cleaning component 3060 disposed within the garbage disposal 3010. The controller 3040 may be configured to activate the cleaning component 3060 at various points within the "activation cycle" of the disposal system 3000. For example, the controller 3040 may be configured to activate the cleaning component 3060 every time the garbage disposal 3010 is activated. The controller 3040 may be configured to activate the cleaning component 3060 multiple times when the garbage disposal 3010 is activated, as another example. The controller 3040 may be configured to activate the cleaning component 3060 in discrete increments (e.g., every other activation, every three activations, every four activations, etc.) when the garbage disposal 3010 is activated, as yet another example. The controller 3040 may be configured to control the cleaning component 3060 at the user's discretion. For example, the user may "select" a specific input (e.g., potency, frequency, etc.) for the cleaning component 3060 through the control member 3070. The sensors 3050 may be configured to detect the user input and transmit the detection signals to the controller 3040. The controller 3040 may then be configured to activate the cleaning component 3060 based on the user input upon receiving the detection signals.

The cleaning component 3060 disposed within the garbage disposal 3010 may be activated in various ways. For example, the garbage disposal 3010 may include a cleaning activation element 3065, as best shown in FIGS. 3-3 and 3-7. The cleaning activation element 3065 may release air, water, or other fluids to make contact with the cleaning component 3060 such that the cleaning component 3060 may be activated (e.g., release chemicals, form bubbles, etc.) and disposed into the main chamber 3018 of the garbage disposal 3010. The cleaning activation element 3065 may house the cleaning component 3060 such that the cleaning component 3060 is separate from the main chamber 3018 of the garbage disposal 3010. The cleaning activation element 3065 may include at least one component to release the cleaning component 3060 into the main chamber 3018 of the garbage disposal 3010 when the cleaning component 3060 is activated, as another example.

As the user approaches disposal system 3000, the sensors 3050 may be configured to detect a presence of the user (e.g., via ultrasonic or "chirp" sensors, infrared sensors, radar sensors, LIDAR sensors, camera sensors, sound sensors, etc.). The sensors 3050 may be configured to generate detection signals corresponding to the presence of the user. The sensors 3050 may be configured to transmit, send, or otherwise provide the detection signals to the controller 3040. The controller 3040 may be configured to activate the disposal system 3000 (e.g., run the garbage disposal) upon receiving the detection signals. For example, the disposal system 3000 may be configured to activate and operate for a predetermined amount of time based on the user's presence. The disposal system 3000 may be configured to activate and operate for a predetermined amount of time based on a user audio input (e.g., voice command), as another example. The disposal system 3000 may include a component to promote a safe environment. For example, the sensors 3050 may be configured to detect an obstruction (e.g., utensil, appliance, overload, etc.) and transmit the detection signals to the controller 3040. The controller 3040 may then be configured to deactivate (e.g., automatically shut off) the garbage disposal 3010 upon receiving the detection signals. The disposal system 3000 may be configured to be deactivated based on the user input, as another example. For instance, the user may be able to selectively deactivate the disposal system (e.g., sensors) for a desired amount of time (e.g., a day, a week, etc.). The controller 3040 may then be configured to generate control signals based on the user input to deactivate any component of the disposal system 3000.

According to the exemplary embodiment in FIGS. 3-4 through 3-8, the disposal system 3000 may be activated by the control member 3070. In other embodiments, the disposal system 3000 may be activated in various other ways including, but not limited to, at least one of a controlling element located elsewhere (e.g., switch, button, etc.) and a wireless control element (e.g., wireless device, control panel, etc.), or an audio input (e.g., voice command).

The controller 3040 may be configured to monitor a quantity (e.g., volume, amount, level, etc.) of the cleaning component 3060 within the disposal system 3000. For example, the sensors 3050 may include at least one component to detect the quantity of the cleaning component 3060 within the disposal system. The sensors 3050 may be configured to transmit the detection signals to the controller 3040. The controller 3040 may then be configured to transmit the detected quantity back to the user. For example, the controller 3040 may be configured to display the quantity through a component (e.g., light, screen, etc.) of the control member 3070. The controller 3040 may be configured to transmit the quantity wirelessly to the user (e.g., wireless device, control panel, etc.).

Referring now to FIG. 3-8, depicted is a flowchart showing a method 3200 of controlling a garbage disposal system 3000. The method 3200 may be implemented by the components described above. As a brief overview, at step 3210, a controller 3040 detects the user input. At step 3220, the controller 3040 generates one or more control signals. At step, 3230, the controller 3040 generates the one or more control signals for a predetermined amount of time.

At step 3210, a controller 3040 detects the user interacting with a control member 3070. In some embodiments, the controller may detect the user input based on data from the at least one sensor 3050. The sensors 3050 may be internal to the control member 3070, external to the control member 3070, or any combination thereof. The sensors 3050 may generate sensor data corresponding to a position of a user's finger, hand, etc. relative to the control member 3070. In some embodiments, the sensors 3050 may be used both to generate data corresponding to user inputs as well as to generate data corresponding to a presence of the user at or near the control member 3070. The sensors 3050 may provide the data to the controller 3040 for detecting the user input. The user input may be selecting a representation of a button, pressing a button, etc.

The controller 3040 may receive the sensor data from the sensors 3050. The controller 3040 may parse the sensor data to detect, determine, or otherwise identify the user input.

At step 3220, the controller 3040 generates one or more control signals. In some embodiments, the controller 3040 generates one or more control signals for a disposal system 3000. The controller 3040 may generate the disposal system 3000 control signal(s) based on the user input (e.g., detected at step 3210). The controller 3040 may generate disposal system 3000 control signal(s) to activate fluid source(s) 3030, deactivate fluid source(s) 3030, activate cutting element(s) 3016, deactivate cutting element(s) 3016, active cleaning component(s) 3060, deactivate cleaning component(s) 3060, etc., based on detected user inputs. For example, the user may "press" an on/off symbol (e.g., to turn on a garbage disposal or faucet) to activate any combination of the components above. The controller 3040 may generate control signal(s) to activate the components responsive to detecting the user input to the control member 3070 of the on/off symbol.

At step 3230, the controller may generate the one or more control signals for a predetermined amount of time. In some embodiments, the controller 3040 may general disposal system 3000 control signal(s) to activate fluid source(s) 3030, deactivate fluid source(s) 3030, activate cutting element(s) 3016, deactivate cutting element(s) 3016, active cleaning component(s) 3060, deactivate cleaning component(s) 3060, etc., for a predetermined amount of time based on detected user inputs. For example, the user may "run" (e.g., activate, operate, etc.) the disposal system 3000 for a set amount of time based on the user inputs.

Integrated Produce Washer

Referring to FIG. 4-1, a perspective view of a washing system 4000 is shown, according to an exemplary embodiment. The washing system 4000 may be configured as a more efficient alternative to using a full-size dishwasher. Full-size dishwashers are often designed to handle large loads and the cleaning cycles are often over an hour long. The size and short cleaning times of washing system 4000 make it more desirable for use with smaller loads, or when an object needs to be washed more quickly than a dishwasher cycle. The washing system 4000 may also be configured as a produce (e.g., fruit, vegetables, etc.) washer. Hand-washing produce can leave produce still soiled or may damage delicate produce (e.g., berries, leaf vegetables, etc.). The washing system 4000 cleans produce gently and thoroughly without damaging them.

In some embodiments, the washing system 4000 may be an ultrasonic cleaner. The washing system 4000 may be disposed within a sink 4010 forming a compartment along a wall of the sink 4010. In some embodiments, the washing system 4000 may be an individual module that can be installed as a secondary unit, in addition to the sink 4010. In still some embodiments, the washing system 4000 may serve as a second basin for the sink 4010. In still some embodiments, the sink 4010 may be configured to have the washing system 4000 pre-installed, with only an outlet drain requiring installation. In still some embodiments, the washing system 4000 may be configured to be mounted in a kitchen independently from sink 4010.

Washing system 4000 includes a cleaning tub 4020. The cleaning tub 4020 includes a bottom and a plurality of contiguous sidewalls. For example, the cleaning tub 4020 may be configured to be a cavity. By way of example, the cleaning tub 4020 may include at least one of the bottom and the contiguous sidewalls. The cleaning tub 4020 facilitates cleaning soiled objects (e.g., produce, tableware, etc.) and contains the objects as well as any fluid used during the cleaning process.

In some embodiments, the cleaning tub 4020 may be made of a rust-resistant material (e.g., stainless steel). The cleaning tub 4020 facilities a cleaning process during which all visible contaminants (e.g., dirt, oil, etc.) are removed from soiled objected (e.g., produce, tableware, etc.) In some embodiments, the cleaning tub 4020 receives water from a fluid source (e.g., plumbing, water tank, etc.). In some embodiments, a fluid may be added to the tub by a user. In some embodiments, the cleaning tub 4020 receives a cleaning product (e.g., soap, produce cleaner, etc.) from a source. In some embodiments, the cleaning tub 4020 features ultrasonic cleaning capabilities. Ultrasonic cleaning may be configured to utilize ultrasonic waves, generally between 20-40 kHz, through a fluid medium to clean objects. The ultrasonic waves induce cavitation bubbles that remove contaminants (e.g., oil, bacteria, food waste, dirt, etc.) on solid surfaces (e.g., produce, dishes, utensils, glassware, etc.). Generally speaking, ultrasonic cleaning may use water as a medium, but a solvent can be added to enhance cleaning in some embodiments. An additional benefit of ultrasonic cleaning may be that the ultrasonic cleaning process would not damage a human hand if inserted into the fluid medium, thus increasing safety. This benefit extends to fragile and delicate objects (e.g., glass), thus making ultrasonic cleaning a viable solution to cleaning these objects.

Ultrasonic cleaning also features a relatively short cleaning time of generally under 15 minutes when compared to an average dishwasher cycle of over 1.5 hours. In some embodiments, a quick wash cycle may be included that can complete a cleaning cycle in under 10 minutes. In some embodiments, the cleaning tub 4020 may include a fluid spray cleaning system. The fluid spray cleaning system uses pressurized fluid to clean tub contents (e.g., produce, tableware, etc.). In some embodiments, the cleaning tub 4020 may include a heating component for heating or drying the contents of the tub (e.g., fluid, dishware, glassware, etc.). In some embodiments, the cleaning tub 4020 may include a self-washing cycle (e.g., ultrasonic, pressure, etc.) during which the cleaning tub 4020 cleans itself without any objects inside it. The self-washing cycle may include adding an additional cleaning product. In some embodiments, cleaning tub 4020 may include a combination of systems discussed above and may include other systems not discussed.

The washing system 4000 may include a basket 4030. The basket 4030 may be configured to be disposed within the cleaning tub 4020. In some embodiments, the basket 4030 may be configured to be an independent component, where the basket 4030 may be positioned outside of the cleaning tub 4020. The basket 4030 includes a bottom and contiguous walls defining a storage cavity. In some embodiments, the bottom and walls of the basket 4030 may be made of wire. A wire design allows for liquid to freely pass through the basket 4030, while keeping solid objects in place. In some embodiments, the basket 4030 includes spacers that prevents the storage cavity from contacting the bottom of the tub. The basket 4030 may be used with a variety of objects (e.g., tableware, glassware, etc.), such as produce 4040 depicted in FIG. 4-1. In some embodiments, the basket 4030 may include additional containers to segregate objects by size or type.

In some embodiments, the washing system 4000 may include a lid 4050. The lid 4050 may be configured to rest on a shelf, shown as ledge 4055, which in some embodiments, extends across the sink 4010. The lid 4050 may be shaped to cover the entirety of the top of cleaning tub 4020. In some embodiments, the lid 4050 may be sized to be long enough to rest across the sink 4010 on the ledge 4055. In some embodiments, the lid 4050 may be made of a material that may be dishwasher-safe (e.g., metal, ceramic, plastic, etc.).

The lid 4050 may be used to enclose the cavity defined by the cleaning tub 4020, by resting on the top portion of cleaning tub 4020. In some embodiments, such as depicted in FIG. 4-1, the lid 4050 may be used to cover at least a portion of the sink 4010. In some embodiments, the lid 4050 may be held in place on the cleaning tub 4020 or the sink 4010 by temporary fastening mechanism (e.g., magnets, slots, etc.). In still some embodiments, the lid 4050 may have ridges to direct water when used as a drying tray. In some embodiments, the lid 4050 may be smooth for use as a cutting board. In some embodiments, the lid 4050 may have an additional use not described.

According to an exemplary embodiment, the washing system 4000 may include a control system 4060. The control system 4060 may include a wireless communication device (e.g., Wi-Fi, Bluetooth, etc.), a power supply, a processor, and a memory. The power supply may plug into an outlet, receive either AC or DC current, or may be powered by a battery (e.g. alkaline, lithium, lithium ion, etc.). The processor may be configured to receive signals, process the signals, and then send signals to facilitate desired functionality. The memory may be a non-transitory memory that includes instructions. In some embodiments, the instructions are added to the memory during manufacturing and are inaccessible to a user. The control system 4060 receives user input (e.g., touch, voice, wireless signal, etc.), processes the input, and governs the functions of cleaning tub 4020. The control system 4060 may transit, signals back to the user.

In some embodiments, the control system 4060 may be configured to be located on the sink 4010, the cleaning tub 4020, or independently. In some embodiments, the control system 4060 may be sealed as to withstand standard kitchen substances (e.g., water, cleaning supplies, etc.).

In some embodiments, the control system 4060 may receive input from a user regarding a method for cleaning (e.g., ultrasonic, pressure, heat). In such an embodiment, the control system 4060 then operates the cleaning tub 4020 to complete the inputted operation. In some embodiments, the control system 4060 receives customization inputs from a user (e.g., load size, cleaning supplement preference, additional rinse cycle, etc.). In some embodiments, the control system 4060 receives signals from sensors (e.g., weight, temperature, etc.) and determines optimal settings. The control system 4060 may then configure the cleaning tub 4020 to match inputted customizations. In some embodiments, the control system 4060 may be configured to send signal(s) (e.g., audio, visual, etc.) to a user indicating status of the cleaning process (e.g., started, finished, maintenance required). In some embodiments, the control system 4060 may be configured to run on low power draw, such that a full-sized dishwasher may be run simultaneously with the washing system 4000.

Referring to FIG. 4-2, a top view of washing system 4000 is shown, according to a particular embodiment. As shown in FIG. 4-2, an example of a basket 4030 may be loaded with tableware 4070. Tableware 4070 serve as an example of how everyday tableware (e.g., utensils, dishes, bowls, etc.) may be cleaned using the washing system 4000. In some embodiments, the washing system 4000 may include the ultrasonic cleaning technology discussed above, the cleaning time of washing system 4000 may be shorter than using a traditional dishwasher. These benefits allow for washing system 4000 to be much more convenient than a dishwasher for everyday use when only a few objects require cleaning.

Referring now to FIG. 4-3, a top view of washing system 4000 is shown, according to a particular embodiment. As shown in FIG. 4-3, an example of a basket 4030 may be loaded with glassware 4080. Glassware 4080 serves as an example of how fragile items (e.g., glass, etc.) may be washed by washing system 4000. In some embodiments, such as when the washing system 4000 includes the ultrasonic cleaning technology discussed above, the washing system 4000 may be gentler than using a traditional dishwasher. In some embodiments, the cleaning tub 4020 may be recessed deeper than the sink 4010 allowing for taller items (e.g., champagne glasses) to be cleaned.

Referring to FIG. 4-4 is a perspective view of washing system 4000 is shown, according to an exemplary embodiment. Lid 4050 may be situated on cleaning tub 4020 with a basket 4030 filled with produce 4040. In this exemplary embodiment, lid 4050 features ridges that guide runoff 4090 into the sink 4010. In some embodiments, the depicted configuration may be used to dry objects in the basket 4030 after washing them in cleaning tub 4020. This configuration allows for the sink 4010 space used by washing system 4000 to be used efficiently.

Referring generally to FIGS. 4-5A and 4-5B, two exemplary uses of a basket 4030 is shown. The basket 4030 in FIG. 4-5A and the basket 4030 in FIG. 4-5B may include an organizer 4095, however they depict different configurations of the organizer. In some embodiments, the organizer may have a different shape or size than those depicted in FIGS. 4-5A and 4-5B.

Figures 2, 3, 4, 5:
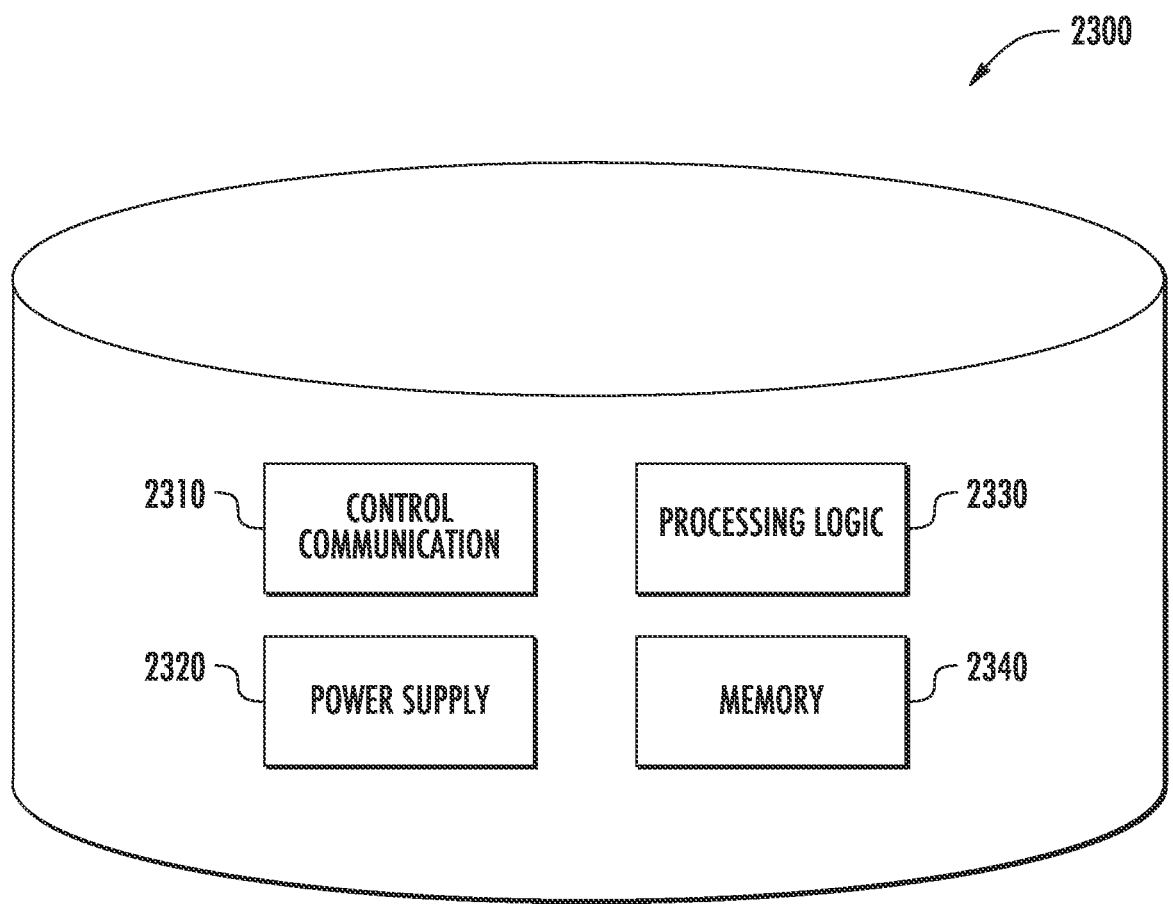

Referring now to FIG. 4-5A, an example of a basket 4030 with an organizer 4095 and loaded with produce 4040 is shown. In some embodiments, the organizer 4095 may be used to separate produce types or to hold produce that may be too small (e.g., berries, etc.) for the main compartment of the basket 4030. The basket 4030 also includes handles 4097, according to an exemplary embodiment. Handles 4097 allow for the basket 4030 to be removed from cleaning tub 4020 or transported. In some embodiments, the handles 4097 may be removed from basket 4030.

Referring to FIG. 4-5A depicts an example of a basket 4030 with an organizer 4095 and loaded with tableware 4070. In some embodiments, the organizer 4095 may be used to separate tableware types or to hold tableware that may be too small (e.g., utensils, caps, etc.) for the main compartment. The basket 4030 also includes dividers 4099, according to an exemplary embodiment. The dividers 4099 allow for more structure in basket 4030, leading to a more organized layout of objects requiring cleaning (e.g., tableware, glassware, etc.). In some embodiments, dividers 4099 may be removed from basket 4030.

Figures 1, 3:
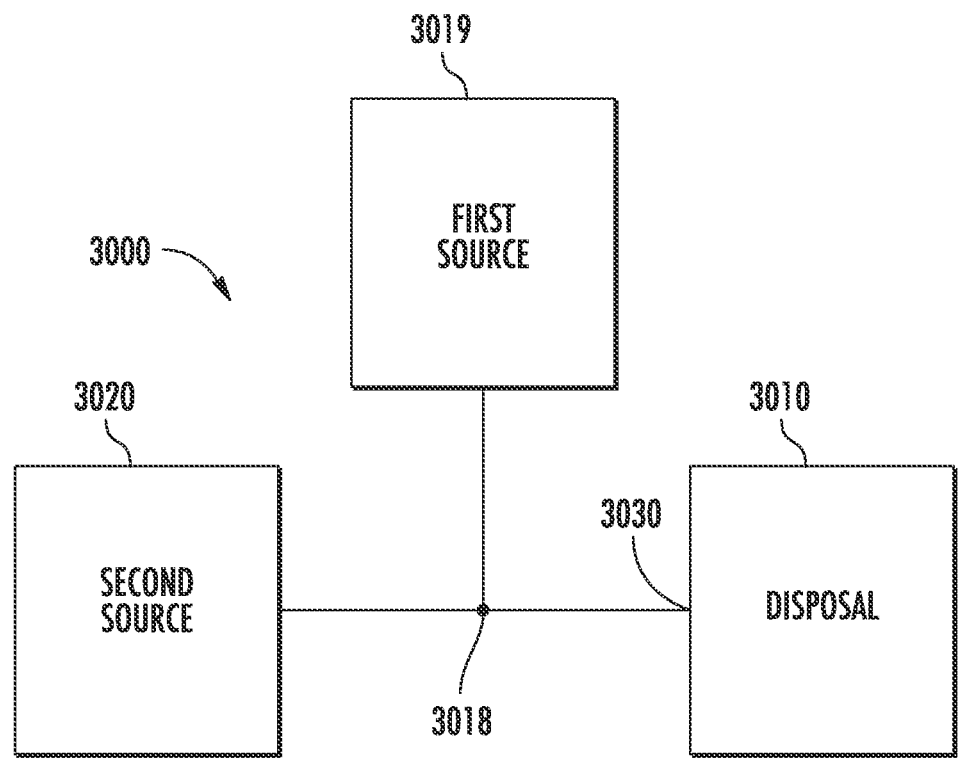
Figures 2, 3:
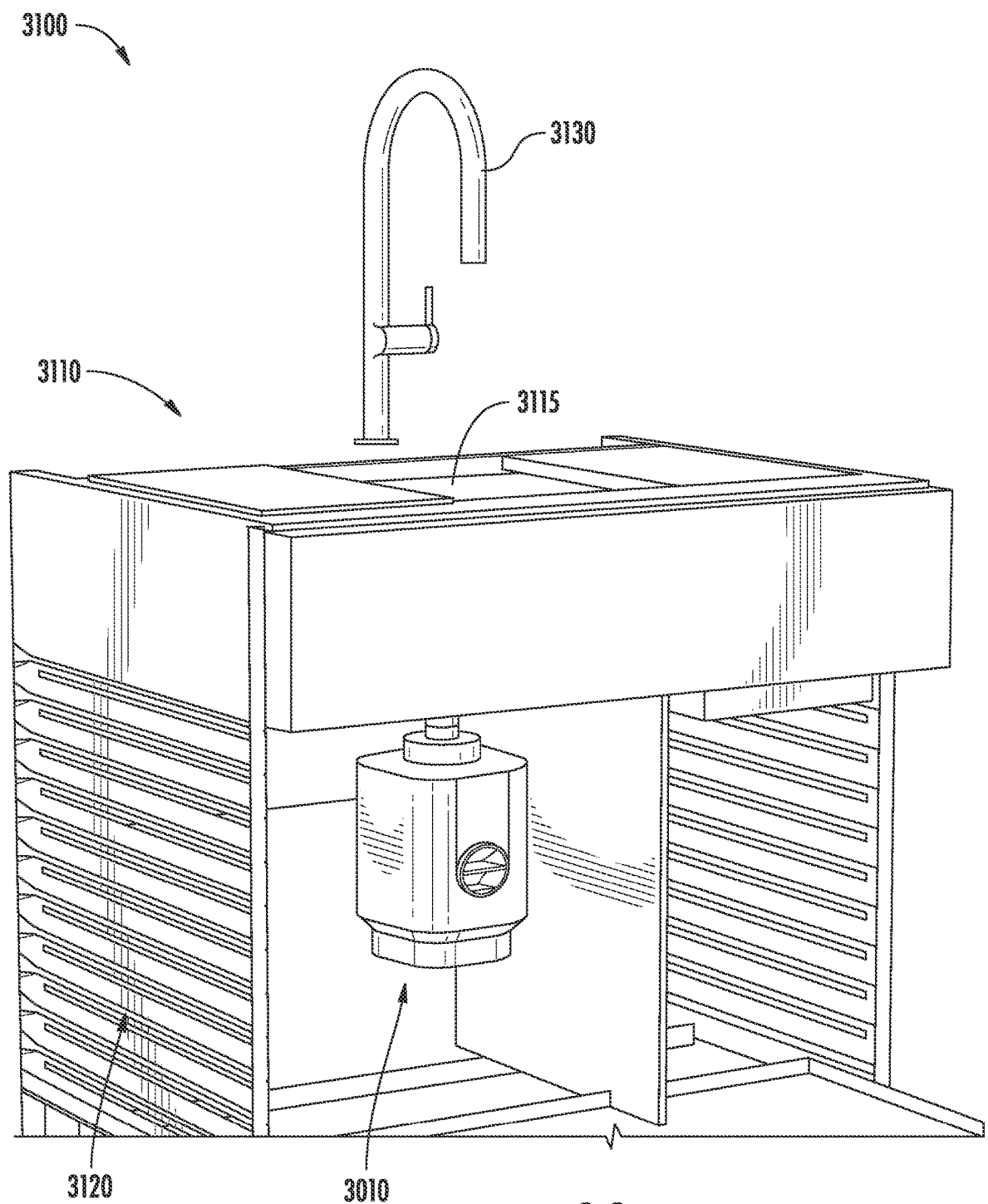
Figure 3:
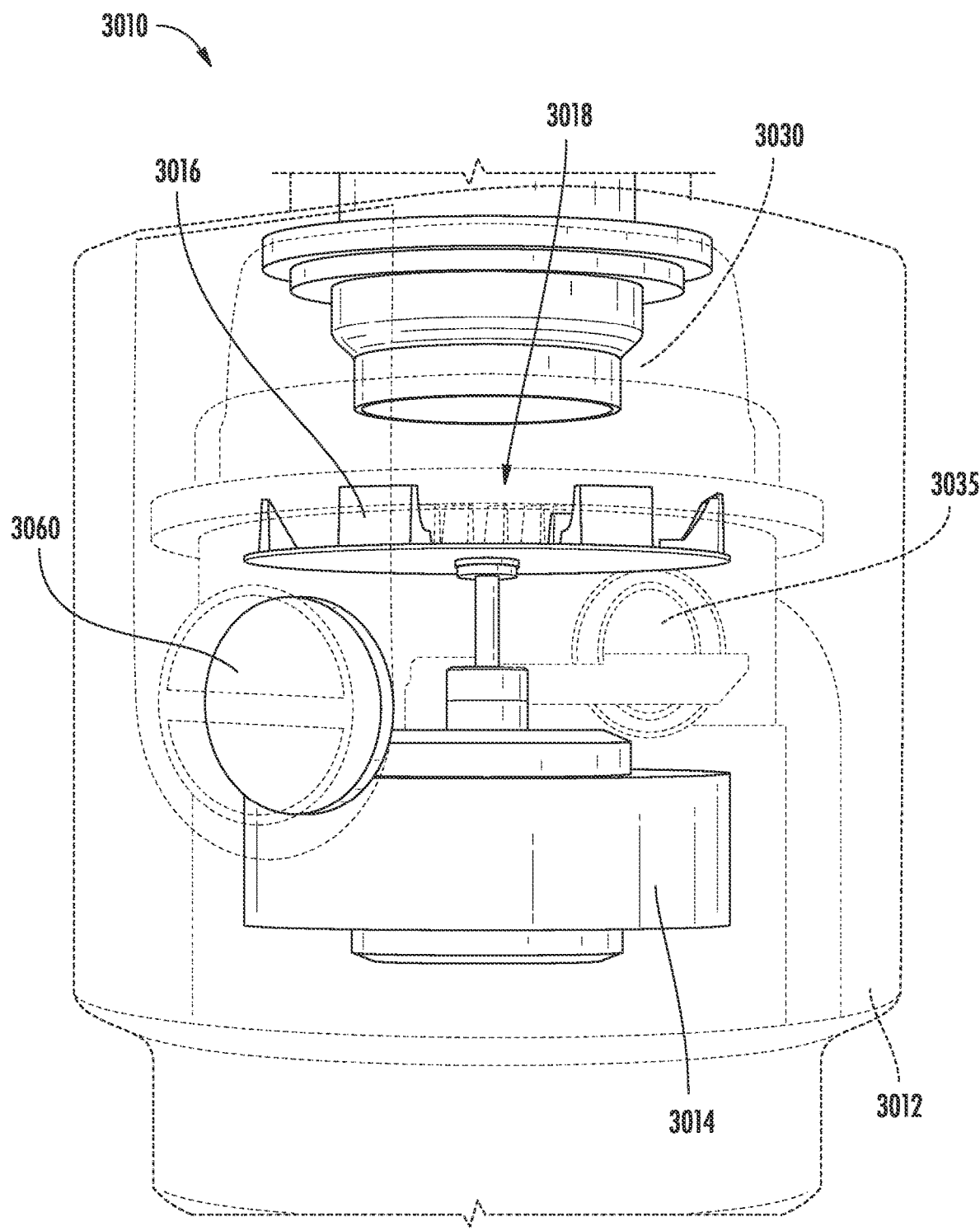
Figures 3, 4:
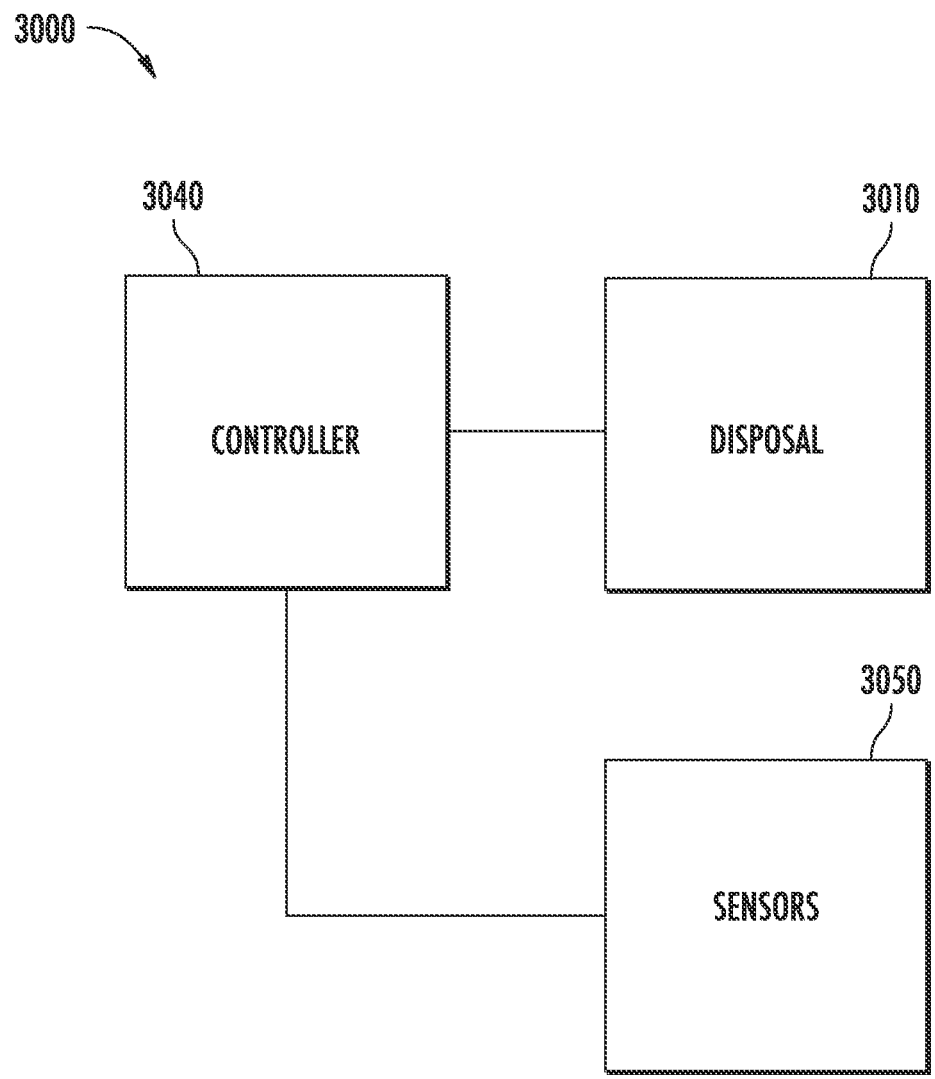
Figures 3, 4, 5:
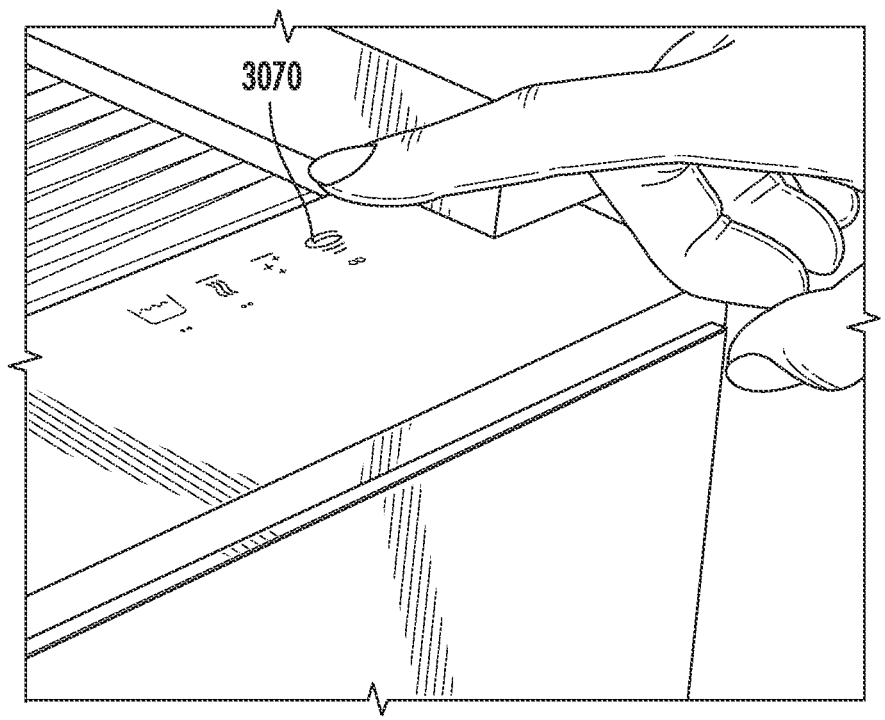
Figures 3, 4, 5, 6:
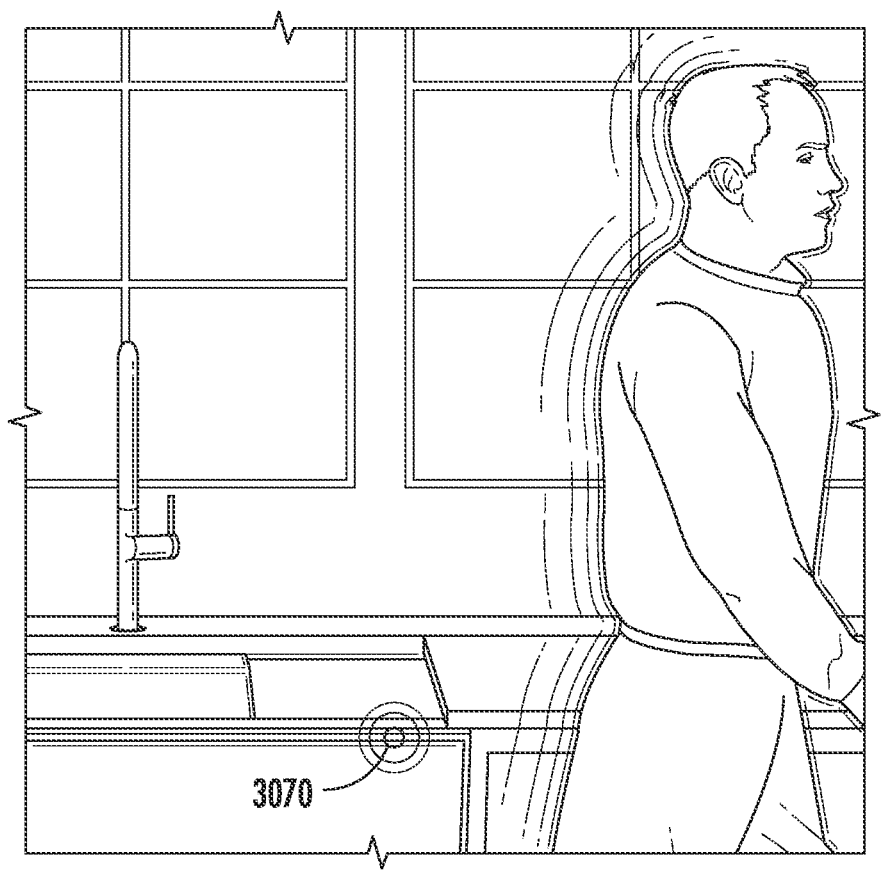

Referring now to FIG. 4-6, a close up of the control system 4060 is shown. In some embodiments, the control system 4060 wirelessly controls washing system 4000 functions. The control system 4060 includes a touch button 4100. In some embodiments, the touch button 4100 may be used to activate a predetermined wash cycle for the washing system 4000. In some embodiments, the touch button 4100 may be used to configure wash cycle settings. In some embodiments, the control system 4060 may include a status light 4110. The status light 4110 may be used to indicate an error or status of the wash cycle.

In FIG. 4-7, a block diagram for a washing method 4120 is shown according to an exemplary embodiment. The washing method 4120 facilitates use of the washing system 4000.

The washing method 4120 may include a loading method 4130. The loading method 4130 facilitates loading objects into the washing system 4000. In some embodiments, the objects that are loaded during the loading method 4130 may include produce (e.g., fruit, vegetables, etc.) or tableware (e.g., dishes, glasses, utensils, etc.). In some embodiments, the loading method 4130 may include loading objects into a basket or a rack. In some embodiments, the loading method 4130 may also include loading a cleaning aid (e.g., soap, solvent, produce cleaner) into a washing system.

The washing method 4120 may include an activating method 4140. The activating method 4140 facilitates activating the washing system 4000. The activating method 4140 starts the wash cycle within the washing system 4000. The activating method may be controlled by a computer system, as described above. In some embodiments, the activating method 4140 may include a button that activates the washing system 4000 when pressed. In some embodiments, the activating method 4140 may include using a mobile application to activate the washing system 4000. In some embodiments, the activating method 4140 may include choosing preferences (e.g., load size, type of wash cycle, etc.).

The washing method 4120 may include a filling method 4150. The filling method 4150 facilitates filling a washing system with a fluid (e.g., water). The filling method 4150 begins automatically after the activating method 4140. In some embodiments, the filling method 4150 may include the washing system 4000 being filled with a fluid (e.g. water, etc.) manually by a user. In some embodiments, the filling method 4150 may include the washing system 4000 filling automatically by means of an inlet receiving fluid from a fluid source. In some embodiments, the filling method 4150 may include the washing system 4000 filling with a cleaning aid (e.g., soap, solvent, produce cleaner) from a cleaning aid source.

The washing method 4120 may include a cleaning method 4160. Cleaning method 4160 includes removing soiling (e.g., oil, dirt, bacteria, etc.) from objects (e.g., produce, dishware, etc.). In some embodiments, the cleaning method 4160 may include ultrasonic cleaning. In some embodiments, the cleaning method 4160 may include cleaning by means of pressurized fluid (e.g., water). In some embodiments, the cleaning method 4160 may include a heating component that heats up the contents of the washing system 4000. In some embodiments, the cleaning method 4160 may include a sterilization step (e.g., ultraviolet radiation, steam, hot water sterilization, chemical sanitation, etc.).

The washing method 4120 may include a drainage method 4170. The drainage method 4170 facilitates draining a fluid from the washing system 4000. In some embodiments, the drainage method 4170 may include draining automatically after the wash cycle may be completed. In some embodiments, the drainage method 4170 may include opening a drain so that the fluid flows out. In some embodiments, the drainage method 4170 may include an outlet that pumps out the fluid from the washing system 4000.

The washing method 4120 may include a rinse method 4180. The rinse method 4180 may include rinsing the objects inside the washing system 4000. In some embodiments, the rinse method 4180 may rinse the inside of the washing system 4000 itself. In some embodiments, the rinse method 4180 may include water jets within the washing system 4000.

In some embodiments, multiple methods of washing method 4120 may happen simultaneously or in a different order.

Integrated Dishwasher

Referring generally to FIGS. 5-1 through 5-3, a sink system 5000 is shown according to an example embodiment. The sink system 5000 may include a sink module 5010, a faucet 5020, and a dishwasher module 5030. The faucet 5020 may be coupled to the sink system 5000 through a countertop 5025. The countertop 5025 may be configured to be disposed around at least a portion of the sink system 5000. By way of example, the countertop 5025 may be disposed around the entire sink system 5000 such to define a fully enclosed sink system 5000. The sink system 5000 may be configured to hold or flow material (e.g., fluid, waste, water, etc.). The material may be held in a basin, shown as sink basin 5027. The sink basin 5027 may be configured to be the main basin of the sink system 5000. By way of example, the sink system 5000 may facilitate the flow of water from the faucet 5020 to an outlet, shown as sink outlet 5040.

The dishwasher module 5030 may be configured to be positioned distal to the faucet 5020, within a first basin 5050. The first basin 5050 may be at least a portion of the sink module 5010 between the countertop 5025 and the faucet 5020. The first basin 5050 may be configured such to be separate from the sink basin 5027 by a partition 5055. The partition 5055 may be configured to be a wall of the sink system 5000 that extends along the height of at least one of the sink basin 5027 and the first basin 5050. In some embodiments, the first basin 5050 may be configured to be the entire sink module 5010. The dishwasher module 5030 may be further configured to run a cleaning process on kitchen tableware (e.g., glasses, plates, silverware, etc.). By way of example, the cleaning process run by the dishwasher module 5030 may be configured to be a gentle process, such to decrease the possibility of damaging the kitchen tableware. The dishwasher module 5030 may be further configured to be integrated into the sink system 5000. In some embodiments, the dishwasher module 5030 may be an individual module that can be installed as a secondary unit, in addition to the sink module 5010. As it can be appreciated, the dishwasher module 5030 may be configured to facilitate cleaning of the kitchen tableware, where it would otherwise be advantageous for a user to hand wash the kitchen tableware.

The dishwasher module 5030 may include a series of water inlets and outlets, shown as dishwasher inlet 5034 and dishwasher outlet 5036. The dishwasher inlet 5034 may be configured such to provide water into the dishwasher module 5030. To be more precise, the dishwasher inlet 5034 may include a cold water inlet flowing into the dishwasher module 5030. The cold water inlet may include an onboard heater that heats the cold water into hot water. In some embodiments, the dishwasher inlet 5034 may only provide at least one of a hot water and a cold water. The dishwasher outlet 5036 may be configured such to remove water from the dishwasher module 5030. In some embodiments, the dishwasher outlet 5036 may remove waster (e.g., food, etc.) from the dishwasher module 5030. The dishwasher outlet 5036 may be configured to be separate from the sink outlet 5040. In some embodiments, the dishwasher outlet 5036 may be the same as the sink outlet 5040.

The dishwasher module 5030 may further include a lid, shown as dishwasher lid 5060 (e.g., shown in FIG. 5-2). The dishwasher lid 5060 may be coupled to the dishwasher module 5030, proximate to the back of the sink system 5000. In some embodiments, the dishwasher lid 5060 may be coupled to various portions of the dishwasher module 5030 or the sink system 5000. The dishwasher lid 5060 may be configured to be selectively repositionable between an open position and a closed position. To be more precise, the open position may be further described as being a load position and the closed position may be further described as being a run position. When the dishwasher lid 5060 may be in the open position, the dishwasher module 5060 may be configured such to allow air to flow through the dishwasher module 5030. Air flow through the dishwasher module 5030 may prevent waste from releasing an odor as well as providing a drying effect to at least a portion of the water within the dishwasher module 5030. In some embodiments, the dishwasher lid 5060 may be positioned into an intermediate position, between the load position and the run position. In such an embodiment, the dishwasher lid 5060 may allow for steam to escape the dishwasher module 5030 such to provide a cooling effect. In some embodiments, the dishwasher lid 5060 may be positioned into a hidden position, where the dishwasher lid 5060 may be pivotable such that it may be recessed into a compartment. When the dishwasher lid 5060 may be in the run position, it may be configured to form a sealing surface. In such an embodiment, the dishwasher lid 5060 does not allow for material (e.g., liquid, waste, etc.) to flow out of the dishwasher module 5030 from the dishwasher lid 5060. In still some embodiments, the dishwasher lid 5060 may be configured to be include a seal (e.g., gasket, washer, foam material, rubber material, etc.) disposed along the perimeter of the dishwasher lid 5060, where the seal may be selectively coupled to the dishwasher lid 5060. In such an embodiment, the seal may interface with the dishwasher module 5030 to prevent material from leaking out of the dishwasher module 5030.

The dishwasher module 5030 may further include a basket, shown as dishwasher basket 5070, as best shown in FIG. 5-3. The dishwasher basket 5070 may be configured to be a rectangular, wire basket that may be disposed within the dishwasher module 5030. In some embodiments, the dishwasher basket 5070 may be configured to be any geometrical configuration (e.g., circular, etc.). The dishwasher basket 5070 may be configured to hold kitchen tableware. According to an exemplary embodiment, the dishwasher basket 5070 may hold kitchen tableware such as plates, bowls, and cups. In such an embodiment, the kitchen tableware requires a different cleaning process than that disclosed by ordinary dishwashers. By way of example, the dishwasher basket 5070 may be configured to hold at least a two person place setting. By way of another example, the dishwasher basket 5070 may be configured to hold assembled kitchen tableware (e.g., coffee mugs), where the assembled kitchen tableware may be separated into smaller and larger items. By way of another example, the dishwasher basket 5070 may hold delicate cups, such as wine glasses. By way of another example, the dishwasher basket 5070 may hold any combination of, but not limited to, the two person place setting, assembled kitchen tableware, or wine glasses.

The dishwasher module 5030 may further include a tray, shown as dishwasher tray 5080. The dishwasher tray 5080 may be configured to be a rectangular tray positioned at the front of the dishwasher basket 5070, distal to the faucet 5020. By way of example, the dishwasher tray 5080 may be repositioned along any portion of the dishwasher basket 5070. In some embodiments, the dishwasher tray 5080 may be coupled to the dishwasher module 5030, such that the dishwasher basket 5070 may be removed from the dishwasher module 5030 without removing the dishwasher tray 5080. The dishwasher tray 5080 may be configured to hold at least one of a soap mixture (e.g., dish soap, etc.) and a set of kitchen utensils (e.g., silverware, knives, etc.). By way of example, the soap mixture may be loaded into the dishwasher module 5030 at a different location than the dishwasher tray 5080.

The dishwasher module 5030 may be configured to run at least one of a plurality of cycles, where the cycles represent different stages of the cleaning process. By way of example, the dishwasher module 5030 may completely remove all dirt and waste from the kitchen tableware by only running a single cleaning process. In some embodiments, the dishwasher module 5030 may run additional cleaning processes to remove all the dirt and waste from the kitchen tableware. The plurality of cycles may at least be configured to include, but not limited to, a pre-wash cycle, a wash cycle, and a dry cycle. By way of example, the wash cycle may comprise a single wash cycle or can be described as comprising a series of wash cycles. Furthermore, the dry cycle may comprise a single dry cycle or can be described as comprising a series of dry cycles. In some embodiments, the cleaning process may be configured to be any combination of the plurality of cycles. For example, based on the kitchen tableware loaded into the dishwasher module 4030, the user may decide to just run the pre-wash and wash cycles, but skip the dry cycle.

The pre-wash cycle may be configured to be the duration between starting the cleaning process and starting the wash cycle. In some embodiments, the pre-wash cycle may last from 0 seconds to 1 minute. In still some embodiments, the pre-wash cycle may take longer than 1 minute. The wash cycle may be configured to be the duration between ending the pre-wash cycle and starting the dry cycle. In some embodiments, the wash cycle may last from 1 minute to 8 minutes. In still some embodiments, the wash cycle may take longer than 8 minutes. The dry cycle may be configured to be the duration between ending the wash cycle and finishing the cleaning process. In some embodiments, the dry cycle may last from 1 minute to 6 minutes. In some embodiments, the dry cycle may take longer than 6 minutes. By way of example, the cleaning process may last from 10 minutes to 15 minutes. In some embodiments, the cleaning process may take longer than 15 minutes. In still some embodiments, the cleaning process may take less than 10 minutes. Referring generally to traditional dishwashers, the cleaning process duration may take in excess of 60 minutes. It may be seen as advantageous for the dishwasher module 5030 to complete the cleaning process in much less time than traditional dishwashers.

Referring now to FIG. 5-4, a block diagram showing a method of controlling the dishwasher module 5030 is shown. To operate the dishwasher module 5030, the user may follow a plurality of steps. The plurality of steps may include loading dirty kitchen tableware 5310 (e.g., dirty with food waste, etc.) into the dishwasher module 5030. The user may then load in a cleaning agent 5320 (e.g., dish soap, etc.) into the dishwasher module 5030. In some embodiments, the dishwasher module 5030 may include an auto-dispense feature where the cleaning agent is automatically added into the dishwasher module 5030. By way of example, the user may load enough cleaning agent to complete the single cleaning process. In some embodiments, the user may load enough cleaning agent to complete multiple cleaning processes. The user may then select the appropriate cleaning process 5330 for the dishwasher module 5030. By way of example, the dishwasher module 5030 may include a plurality of different cleaning processes (e.g., normal, delicates, etc.) that are dependent upon the types of kitchen tableware loaded into the dishwasher module 5030. In some embodiments, the user may select a "Delicates" cleaning process when delicate kitchen tableware (e.g., wine glasses, etc.) are loaded into the dishwasher module 5030. In still some embodiments, the user may select a "Sanitize" cleaning process when clean kitchen tableware may be loaded into the dishwasher module 5030. The user may then start the cleaning process 5340 and wait the appropriate time for the cleaning process to complete. In some embodiments, the user may need to operate the dishwasher module 5030 at least an additional time to completely clean the kitchen tableware. By way of example, any of the plurality of steps may be initiated in any combination. After the cleaning process has run, the cleaning process may finish 5350. Additionally or alternatively, the user may monitor the cleaning process from an app 5360 until the cleaning process has finished 5370.

By way of example, the dishwasher module 5030 may further be described as a self-cleaning dishwasher module 5030. According to an exemplary embodiment, the user may clean the dishwasher module 5030 by operating the dishwasher module 5030 without any kitchen tableware loaded into the dishwasher module 5030. In some embodiments, the user may load the cleaning agent into the dishwasher module 5030 and run the cleaning process. In still some embodiments, the user may actuate a "self-clean" cycle that utilizes high-heat water (e.g., steam, hot water sterilization, chemical sanitation, etc.) to clean the dishwasher module 5030.

According to an exemplary embodiment, when the dishwasher module 5030 is in the cleaning process, the sink system 5000 (e.g., faucet 5020, etc.) may be operated normally. The dishwasher module 5030 does not affect operation of the sink system 5000.

Referring now to FIG. 5-5, a control module (e.g., remote control, control interface, etc.) is shown as a controller 5100. The controller 5100 may be configured to effect contactless control of the dishwasher module 5030. The controller 5100 includes a wireless communication device (e.g., control communication 5110), a power supply 5120, a processing logic 5130, and a memory 5140. Speaking generally, the controller 5100 may be able to communicate with the dishwasher module 5030. The controller 5100 may transmit, via the control communication 5110, an instruction to the dishwasher module 5030 to activate between an on and off position.

The power supply 5120 may be configured to power the controller 5100. The power supply 5120 may include disposable batteries (e.g., alkaline, lithium, zinc-air, etc.) or rechargeable batteries (lithium ion, nickel-cadmium, etc.). The controller 5100 may plug into an outlet and receive either AC or DC current. In some embodiments, the controller 5100 may be powered wirelessly by inductive charging. For example, the controller 5100 may be mounted to a wall, behind which a wireless charger (e.g., copper coil, magnetic loop antenna, etc.) may be positioned. The wireless charger may then interface with the power supply 5120, the power supply 5120 structured to wirelessly charge by the wireless charger positioned behind the wall.

The processing logic 5130 may be configured to send signals to, and receive signals from, via the control communication 5110. The processing logic 5130 may be operably coupled to the memory 5140, where instructions for how to respond to various signals may be stored. The memory 5140 may be a non-transitory memory that includes instructions. In some embodiments, the instructions are added to the memory 5140 during manufacturing and inaccessible to a user. For example, the memory 5140 may store instructions for how the dishwasher module 5030 may be to be controlled to actuate between the on and off positions. The memory 5140 may be structured such that a user may be unable to change how the dishwasher module 5030 responds to receiving the instruction from controller 5100.

According to an exemplary embodiment, the controller 5100 may be operably coupled to a wireless device (e.g., phone, module, etc.) such that the user may monitor the dishwasher module 5030. By way of example, the user may interface with an app, where the app may be operably coupled to the dishwasher module 5030. The app may monitor the dishwasher module 5030 to determine at least one of a cleaning process status, a cleaning process start/stop status, and a system status. The user may further monitor the app, while running the cleaning process, to change settings or cycle between an order of cleaning process cycles. For example, the user may use the app to add an additional wash cycle into the cleaning process if the kitchen tableware loaded into the dishwasher module 5030 requires more washing time. In some embodiments, the user may use the app to customize settings of the dishwasher module 5030. By way of example, the user may setup specific cycle times, water temperature, etc., such to make a customizable dishwasher module 5030. Further, the app may monitor the dishwasher module 5030 and send a notification to the user. For example, the app may monitor the dishwasher module 5030, when the dishwasher module 5030 is in the on position, and notify the user when the cleaning process has completed.

Apron-Front Sink with Integrated Drying Sanitizing Features

Figures 1A, 6:
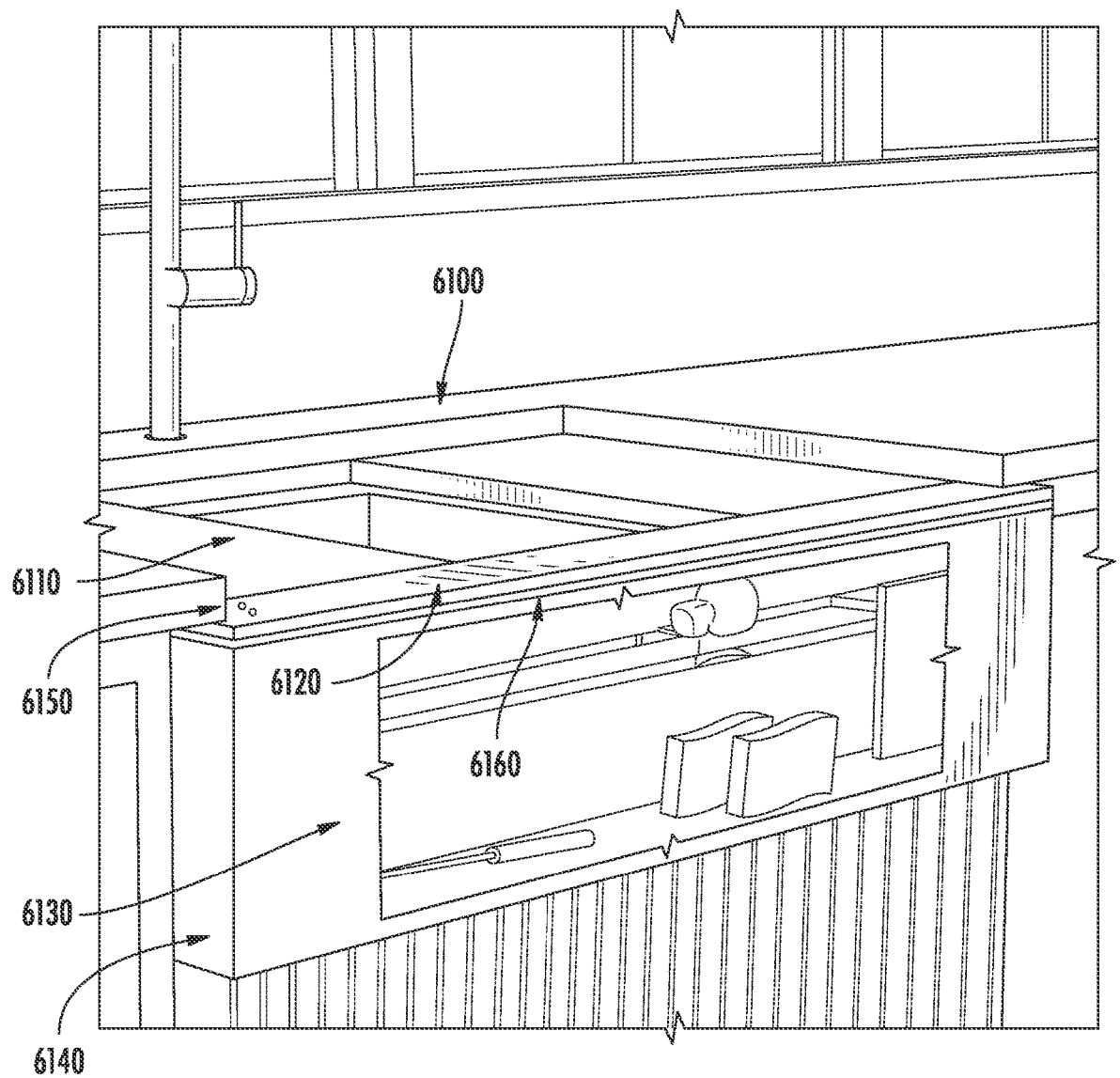
Figures 1B, 6:
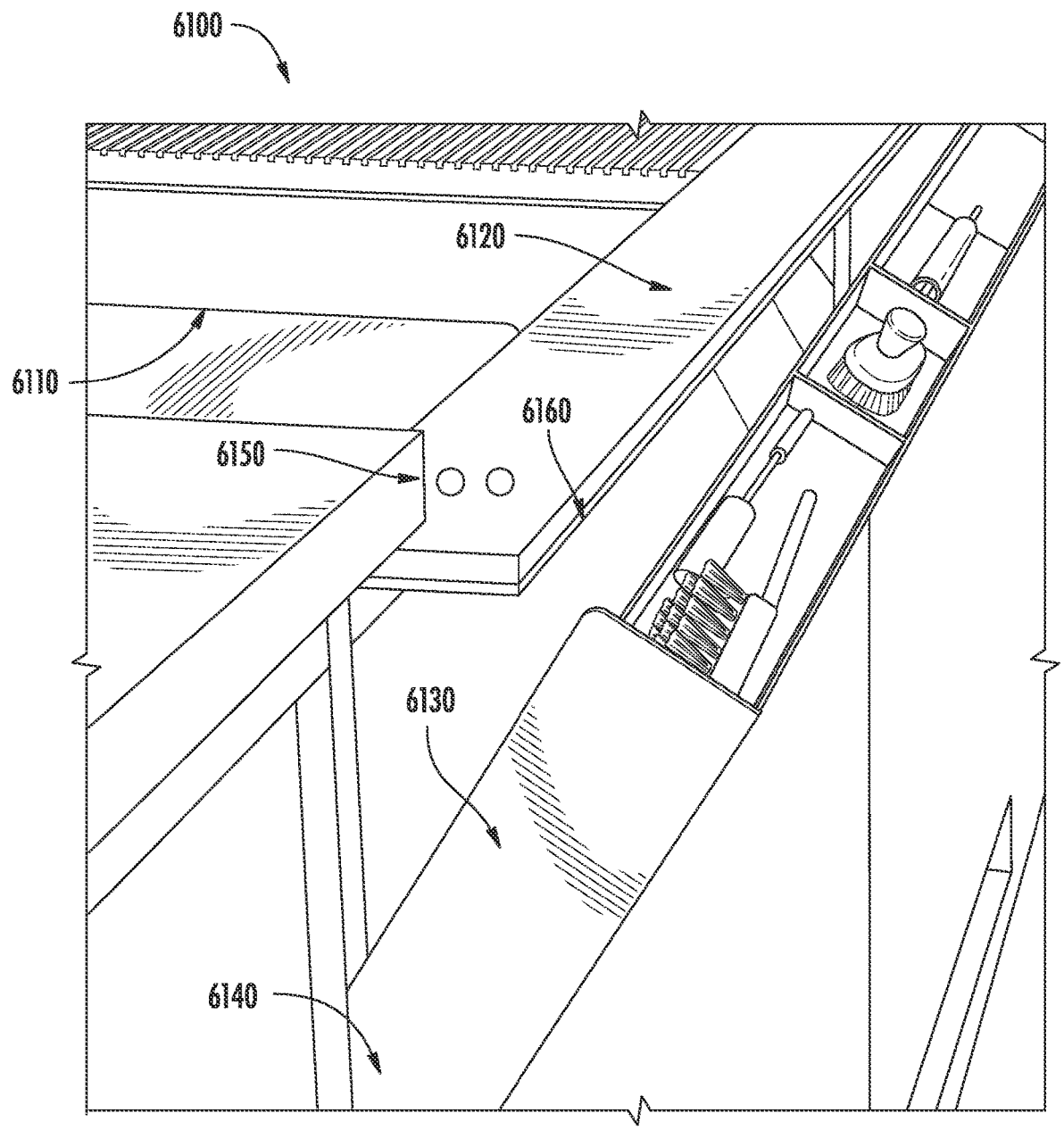
Figures 2, 6:
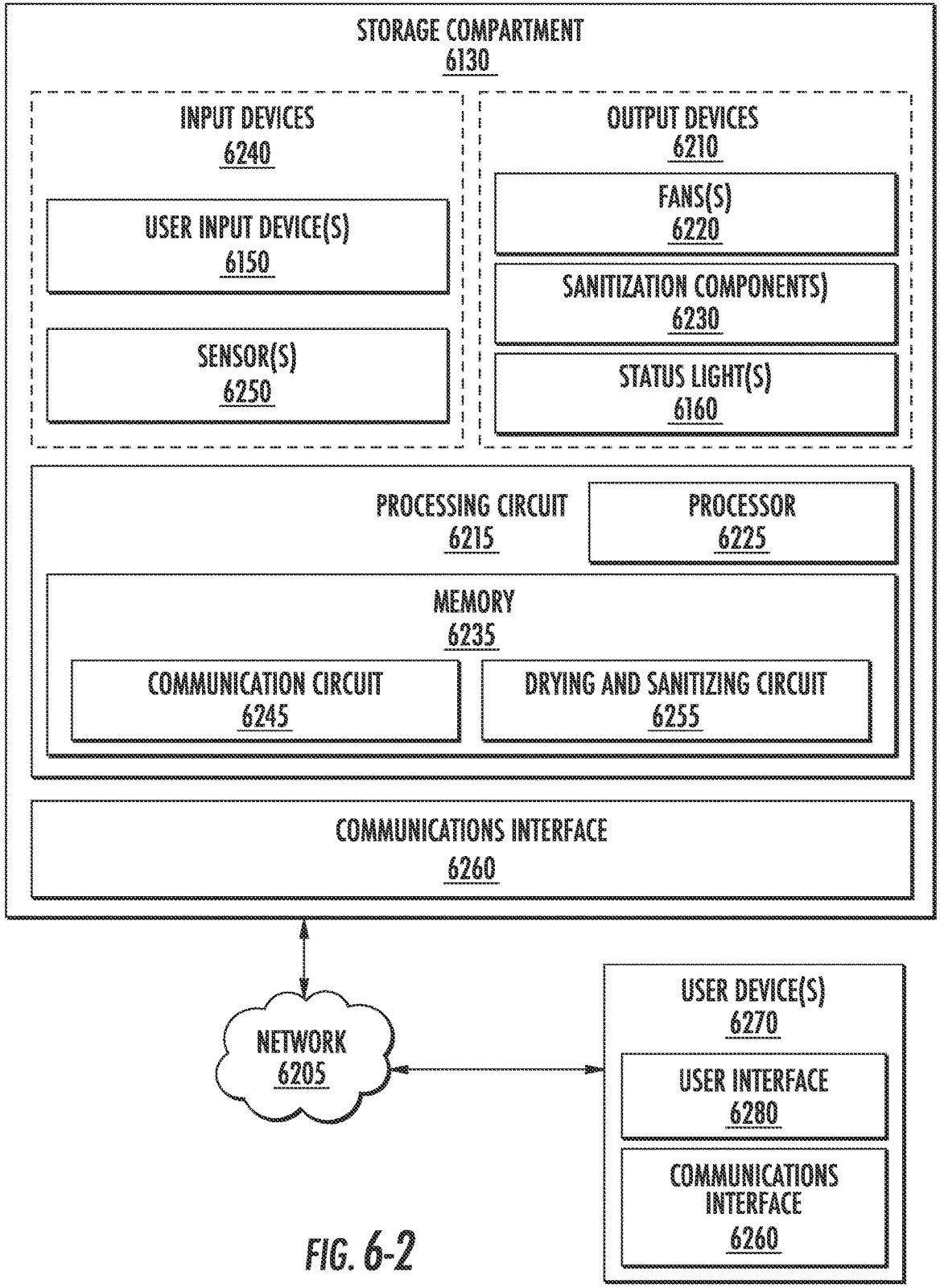

Referring generally to FIGS. 6-1A and 6-1B, a sink system 6100 is shown, according to an exemplary embodiment. Sink system 6100 may include one or more basins 6110 and an apron-front 6120. The one or more basins 6110 are defined by a floor and one or more sidewalls extending upwardly from the floor. The sink may have any number of basins. For example, the sink may have one or more basins. In some embodiments, the sink may have one or more basins separated by one or more dividers (e.g., separator, structure, hump, ridge, etc.), such as a saddle, although in other embodiments, the sink may have one or more separate basins without a divider. Alternatively, the sink may have a single basin divided into two or more reservoirs. The saddle may be of any height and may divide the sink into multiple equal or unequal sized basins or reservoirs. The sink may also include a flange or rim outwardly extending from a top edge or portion of the sidewalls.

The apron-front 6120 may be coupled to or integrally formed with the front wall of the basin via the same rim, or the like. The first and second ends of the apron-front 6120 may extend laterally beyond the outer periphery of the rim associated with each corresponding side wall. Extending the ends of the apron past the outer periphery of the rim may allow the ends of the apron to at least partially overlap a face of the cabinetry to conceal possible cut lines and/or openings in the face of the cabinetry.

The apron-front 6120 may include a storage compartment 6130 that may be coupled to the apron-front via a moveable joint 6140. In some embodiments, movable joint 6140 may be a hinge mechanism structured to allow the storage compartment to pivot between a closed position shown in FIG. 6-1A, and an open position shown in FIG. 6-1B. In some such embodiments, movable joint 6140 may be structured having features that slow the movement of storage compartment 6130 to prevent slamming. In such embodiments, movable joint 6140 may be a torque or friction hinge structured to provide resistance to a pivoting motion. In other embodiments, movable joint 6140 may be structured having features to assist movement of storage compartment 6140. In such embodiments, movable joint 6140 may be a hinge mechanism including one or more springs that provide tension to reduce the effort required to move the storage compartment from an open position to a closed position. In some embodiments, movable joint 6140 may be a removable joint structured to allow storage compartment 6130 to be removed from the apron-front for servicing and/or other tasks requiring removal of the storage compartment. For example, movable joint 6140 may be a hinge with a removable pin that when removed allows removal of the storage compartment from the apron front. A technician may remove the storage compartment to quickly access components of the storage compartment for servicing. In some embodiments, storage compartment 6130 may be configured such that when in the closed position, the apron-front appears seamless to a user, similar to a conventional apron-front sink. In an example, when in a closed position, storage compartment 6130 appears seamless within the apron front (e.g., unable to identify the storage compartment within the apron front) and together, the apron front and the storage compartment, appear to look like a conventional apron front. The storage compartment 6130 is described in greater detail below.

Still referring to FIGS. 6-1A and 6-1B, storage compartment 6130 may be configured to allow a user to control at least one of the operation of a drying and a sanitizing features via one or more buttons, shown as user input devices 6150. Operational status of the storage compartment 6130 may be displayed by one or more status light(s) 6160.

Referring to FIG. 6-2, a detailed block diagram of a storage system 6200 is shown, according to an exemplary embodiment. Storage system 6200 may be shown to include storage compartment 6130 communicatively and operatively coupled to one or more user device(s) 6270 via Network 6205. Network 6205 may be a wired or wireless network (e.g., Internet, intranet, VPN, etc.) configured to exchange data, values, instructions, messages, and the like between storage compartment 6130 and one or more user devices 6270. Accordingly, each of storage compartment 6130 and one or more user device(s) 6260 may include an appropriate wired or wireless communications interface (i.e., network adaptor) to facilitate this communication. For example, a user device 6270 may communicate with storage compartment 6130 via a telephone (e.g., cellular) network. As another example, user device 6270 may communicate with storage compartment 6130 via a short-range, wireless network (e.g., Wi-Fi, Bluetooth, etc.). It will be appreciated that these example network types are not intended to be limiting, and that network 6205 may be configured as any appropriate type of network. Additionally, in some embodiments, network 6205 may include multiple types of networks. For example, a first user device (e.g., laptop computer) 6270 and storage compartment 6130 may communicate via a short-range, wireless network, while a second user device (e.g., mobile phone) 6270 and storage compartment 6130 may communicate (e.g., simultaneously or nearly-simultaneously) via a telephone network.

Storage compartment 6130 may be shown to include multiple output devices 6210 (e.g., sanitizing system, etc.) for facilitating at least one of the drying and/or sanitizing operations. Output devices 6210 may include one or more fan(s) 6220 structured to provide ventilation to the storage compartment 6130 to dry stored items. In some embodiments, one or more fan(s) 6220 may be configured to operate at various speeds, which may be described herein as a percentage relative to the maximum operating speed. For example, one or more fan(s) 6220 may operate at 100% speed to quickly dry items during the day and may operate at 50% speed to quietly dry items at night. In other embodiments, one or more fan(s) 6220 may be configured to operate at a uniform speed. For example, one or more fan(s) 6220 may be configured to operate at a uniform speed, wherein the uniform speed may be a speed that has been preconfigured to generate an optimal amount of ventilation for the storage compartment.

Output devices 6210 may also include one or more sanitization component(s) 6230 structured to sanitize stored items. Sanitization components 6230 are generally configured to kill or deactivate harmful bacteria or viruses that may be present on the surface of stored kitchen accessories. In an exemplary embodiment, sanitization components 6230 may include ultra-violet (UV) light sources, such as UV-C LEDs, that may irradiate items during storage. Storage compartment 6130 may be configured with safety features including one or more safety sensors to protect a user from exposure to ultra-violet radiation, status indicators, auto-off or locking features, described in detail below.

Output devices 6210 may also include one or more status lights 6160 structured to display operational status of the storage compartment 6130. In an exemplary embodiment, each of a plurality of status lights 6160 having different colors may illuminate indicating a specific operation of storage compartment 6130. In such embodiments, storage compartment 6130 may be configured to illuminate a status light during operation of each of a set of predetermined output devices. For example, a red status light may illuminate during operation of one or more sanitization components 6230. In another example, a blue status light may illuminate during operation of one or fans 6220. In yet another example, a white status light may illuminate during operation of one or more sanitization components 6230 and one or more fans 6220. In such embodiments, a user may disable status lights 6160 using one or more user input devices 6150 or via a user device. In still some embodiments, the any color combination of status lights 6130 may be used to indicate specific operation.

Storage compartment 6130 may be shown to include one or more input devices 6240. Input devices 6240 may include at least one of the user input device(s) 6150 (e.g., buttons, touchpads, etc.). The user input device(s) 6150 may be structured to provide the user with various ways to control operations of storage compartment 6130. The user input devices 6150 may be located on an external surface of any component described herein. In an exemplary embodiment, user input devices 6150 may be buttons located on a top surface of apron front 6120 as shown in FIGS. 6-1A and 6-1B. In such embodiments, a user may control operation of one or more output devices 6210 by interacting with the user input devices 6150. In an example, a button located on a top surface of apron front 6120 and may be used to control operation of one or more fans. In this case the button may be configured to control operation of the one or more fans by initiating operation at a speed of 25% in response to pressing the button a first time, incrementally increasing the operating speed by 25% in response to pressing the button a second, third, and fourth time (e.g., second press increase speed to 50%, third press increase speed to 75%, fourth press increase speed to 100%), and stopping operation in response to pressing the button a fifth time. In another example, a user may press a button to enable or disable status lights 6160. In another example, a button located on a top surface of apron front 6120 may be used to control operation of one or more sanitation components. The button may be configured to start or stop operation of the one or more sanitation components so that a user may press the button a first time to start operation and a second time to stop operation. In yet another example, a plurality of buttons may be configured to initiate preconfigured drying and/or sanitizing processes, described in detail below. Preconfigured drying and/or sanitizing process (e.g., drying, sanitizing, drying and sanitizing, etc.) may include preset operating parameters for one or more output devices (e.g., initiate operation of fan at 100% for 2 hours, initiate operation of a UV-C LED at 100% for 30 minutes) to allow a user to manage drying and sanitizing functions of the storage compartment with limited interaction (i.e., fewer interactions with input devices). It will be appreciated, however, that user input devices 6150 are not limited to just these examples, and that any type of input device may provide any type of control for operation of storage compartment 6130.

Input devices 6240 may also include one or more sensors for measuring or detecting various parameters associated with the operation of storage compartment 6130. In an exemplary embodiment, sensors 6250 may include humidity sensors such as hygrometers or other similar sensor that can detect and provide humidity information including both moisture and air temperature to storage compartment 6130 to determine relative humidity. In such embodiments, relative humidity may be compared to a threshold (i.e., limit) to determine if a wet or damp kitchen accessory is stored within the storage compartment. Sensors 6250 may include sensor readings to actuate a fan between an on and off position without user activation. By way of example, the sensor readings may be actuated by opening and closing a door, such that the sensor readings are not continuous readings.

Additionally, sensors 6250 may include one or more safety sensors configured to detect whether storage compartment 6130 is in a closed position. In an exemplary embodiment, a safety sensor may include one or more switches, an optical sensor, or any other suitable sensor that can be used to determine if storage compartment 6130 may be in a closed position. Storage compartment 6130 may be configured with safety features that may disable operation of sanitization components 6230 such as UV-C LEDs after a determination that the storage compartment may not in a closed position. For example, operation of the UV-C LEDs may be disabled when the storage compartment may be moved to an open position. It will also be appreciated that sensors 6250 may include any number of additional sensors not described herein.

Still referring to FIG. 6-2, storage compartment 6130 is shown to include a processing circuit 6215 that includes a processor 6225 and memory 6235. Processor 6225 may be implemented as a general-purpose processor, an application specific integrated circuit (ASIC), one or more field programmable gate arrays (FPGAs), a digital signal processor (DSP), a group of processing components, or other suitable electronic processing components structured to control the operation of storage compartment 6130. Memory 6235 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 6235 may be or include volatile memory or non-volatile memory. Memory 6235 may include database components, object code components, script components, or any other type of information structure for supporting the various activities and information structures described in the present application. According to an exemplary embodiment, memory 6235 may be communicatively coupled to processor 6225 via processing circuit 6215 and includes computer code for executing (e.g., by processing circuit 6215 and/or processor 6225) one or more processes described herein.

Memory 6235 may be shown to include a drying and sanitizing circuit 6225. The drying and sanitizing circuit 6225 may be configured to manage operation of one or more output devices 6210 to facilitate drying and sanitizing of items stored within storage compartment 6130. Drying and sanitizing circuit 6225 may include executable instructions for conducting at least one of the preconfigured drying and/or sanitizing processes by one or more output devices 6210 (i.e., fast drying process, quiet drying process, drying and sanitizing process, etc.). These preconfigured processes may include certain operating parameters and durations of operation for one or more output devices 6210 (e.g., operate UV-C LEDs at 100% intensity for 1 hour). For example, drying and sanitizing circuit 6225 may include instructions for a preconfigured drying process that when executed, cause a fan to operate at 100% speed for two hours to quickly dry stored kitchen accessories. In another example, drying and sanitizing circuit 6225 may include instructions for a preconfigured drying process that when executed cause a fan to operate at 50% speed for three hours to quietly dry items (e.g., overnight drying). In yet another example, drying and sanitizing circuit 6225 may include instructions for a preconfigured drying and sanitizing process that when executed cause a fan to operate at 75% speed for two hours and simultaneously causes a UV-C light to operate at 100% intensity for thirty minutes. In some embodiments, drying and sanitizing circuit 6225 may execute instructions for conducting at least one of the preconfigured drying and/or sanitizing processes based on data from one or more input devices 6240 including user input devices 6150, described in detail below.

Drying and sanitizing circuit 6225 may receive data from one or more input devices 6240 including user input devices 6150 (e.g., buttons, touchpads etc.) and one or more sensors 6250 (e.g., humidity sensors, safety sensors, etc.) and may be structured to manage operation of one or more output devices based on the received data. In some embodiments, drying and sanitizing circuit 6225 may execute instructions to conduct at least one of a preconfigured drying and/or sanitizing process based on data received from a user input device 6150 (i.e., user presses a button). For example, drying and sanitizing circuit may initiate a preconfigured overnight drying and sanitizing process in response to a user pressing a button located on an external surface of the apron front. An overnight drying and sanitizing process may include operating parameters better suited for nighttime operation such as a decreased fan speed (e.g., operation of fan at 50% speed instead of at 100% speed) and an increased duration of fan operation (e.g., operate fan for 3 hours instead of 1 hour) to facilitate quieter drying. An overnight drying and sanitizing process may include operation of one or more fans at 50% speed for 3 hours and operation of UV-C LEDs for 1 hour at 100% intensity. In another example, drying and sanitizing circuit may initiate operation of the UV-C LEDs at 100% intensity in response to a user touching a touchpad a single time.

In an exemplary embodiment, drying and sanitizing circuit 6225 may automatically manage operation of one or more output devices based on data received by one or more humidity sensors. In such embodiments, drying and sanitizing circuit 6225 may constantly or at least regularly receive humidity data from one or more humidity sensors and determine the current relative humidity of storage compartment 6130 based on the received humidity data. Drying and sanitizing circuit 6225 may determine, based on the current relative humidity, whether a wet or damp kitchen accessory may be stored within storage compartment 6130 such as by comparing the current relative humidity to a predetermined threshold (i.e., limit). Drying and sanitizing circuit 6225 may execute instructions to initiate at least one of the preconfigured drying and/or sanitizing processes by one or more output devices 6210 based on a determination that a wet or damp kitchen accessory may be stored within storage compartment 6130. For example, drying and sanitizing circuit 6225 may identify a relative humidity of 75% in storage compartment 6130 based on the humidity data received. Drying and sanitizing circuit 6225 may determine the relative humidity may be above a preconfigured threshold of 65% and may execute instructions to initiate a drying and sanitizing operation.

In an exemplary embodiment, drying and sanitizing circuit 6225 may automatically manage operation of one or more output devices based on data received by one or more safety sensors. In such embodiments, drying and sanitizing circuit 6225 may constantly or at least regularly receive position data from one or more safety sensors and determine whether the current position of storage compartment 6130 may be in an open or a closed position based on the received position data. Drying and sanitizing circuit 6225 may execute instructions to disable operation of one or more UV-C lights based on a determination that the storage compartment 6130 may be in an open position to protect a user from exposure to ultra-violet radiation. For example, drying and sanitizing circuit 6225 may execute instructions causing a UV-C light to operate at 100% intensity for thirty minutes. A user may move storage compartment 6130 from a closed position to an open position which causes drying and sanitizing circuit 6225 to disable operation of the UV-C light. A user may subsequently move storage compartment 6130 from the open position to a closed position which causes drying and sanitizing circuit 6225 to cause the UV-C light to operate at 100% intensity.

In an exemplary embodiment, drying and sanitizing circuit 6225 may be structured to store one or more scheduled processes. In such an embodiment, a scheduled process may include instructions for executing a specific process at one or more specific times. For example, a user may configure a scheduled process to dry and sanitize items stored in the storage compartment at 7:30 pm each weeknight. Drying and sanitizing circuit 6225 may save the scheduled process as instructions to execute a preconfigured drying and sanitizing process at 7:30 pm each weeknight. In some embodiments, drying and sanitizing circuit 6255 may receive scheduled process instructions from one or more user devices 6270, described in more detail below.

Memory 6235 may be also shown to include a communication circuit 6245. Communication circuit 6235 may be configured to coordinate the operations of storage compartment 6130 with one or more user devices 6270. In some embodiments, communication circuit 6245 may also receive data from one or more input devices 6240 including one or more sensors 6250 and from drying and sanitizing circuit 6255. Communication circuit 6245 may also be configured to generate a user interface 6280 to provide to a user device 6270.

User interface 6280 may be structured to provide a user with various ways to interact with storage compartment 6130. In an exemplary embodiment, the user may control any operation of any of the one or more output devices 6210 via a user interface 6280 provided to a user device 6270. In such embodiments, the user may also instruct drying and sanitizing circuit 6255 to conduct one or more preconfigured drying and/or sanitizing processes. For example, via a user interface 6280 generated by the communication circuit 6245 and provided on a user device 6270, the user may initiate operation of one or more fans 6220 at 100%, change the fan speed to 80% (i.e., user determined fan may be too loud at 100% speed), and may also initiate operation of a UV-C light at 80% intensity. In another example via a user interface 6280 generated by the communication circuit 6245 and provided on a user device 6270, a user may initiate operation of a preconfigured drying and sanitizing process that when executed causes the drying and sanitizing circuit to start operation of one or more fans at 100% speed for 2 hours and to start operation of a UV-C light at 100% for 30 minutes.

Additionally, user interface 6280 may provide information regarding drying and sanitizing operation of storage compartment 6130. User interface 6280 may display data provided by the communication circuit which may include data received from one or more sensors 6250 and/or data received from drying and sanitizing circuit 6255. For example, via a user interface 6280 generated by the communication circuit 6245 and provided on the user device 6270, the user may observe what output devices are in operation (e.g., fan may be operating at 50% speed, UV-C light may be operating at 100% intensity), what process are scheduled (e.g., drying and sanitizing process scheduled for 10:00 pm tonight), the current relative humidity of the storage compartment, the progress of a drying and/or sanitizing process being conducted (e.g., drying and sanitizing process may be 67% complete), and so on.

Further, the user interface 6280 may include options allowing the user to configure scheduled processes. Scheduled processes may include one or more preconfigured drying and/or sanitizing processes and may be configured to be executed at any time (i.e., scheduled). Scheduled processes may also include custom processes comprising one or more user selected output devices operating with specific user selected operating parameters. In an exemplary embodiment, user interface 6280 provides options to schedule at least one of a preconfigured drying and/or sanitizing processes at one or more specific times. In such embodiments, user interface 6280 may also provide options for a user to schedule custom processes at one or more specific times by selecting one or more output devices and the corresponding operating parameters for the one or more devices. For example a user may schedule a preconfigured drying and sanitizing process each weeknight at 8:00 μm. In another example, a user may schedule a custom process to execute at 10:00 pm every weeknight which causes one or more fans to operate at 33% speed for three hours and causes the UV-C LEDs to operate at 100% intensity for thirty minutes.

User devices 6270 can include, but are not limited to, mobile phones, electronic tablets, laptops, desktop computers, workstations, smart home assistants and other types of electronic devices. More generally, user devices 6270 may include any electronic device that allows a user to interact with storage compartment 6130 (e.g., through a user interface). Accordingly, each of user devices 6270 can include an input device (e.g., a keyboard) and an output device (e.g., a screen). In one example, a user device may be a mobile phone with a user interface that provides various ways to interact with the storage compartment such as providing user selectable options for changing operating parameters of one or more output devices (i.e. option initiate operation of fan at 100% speed, option to turn off UV-C light, etc.). In another example, user device 6270 may be a tablet that provides a user interface 6280 including user selectable options that allow the user to configure scheduled drying and sanitizing processes.

Figures 3A, 6:
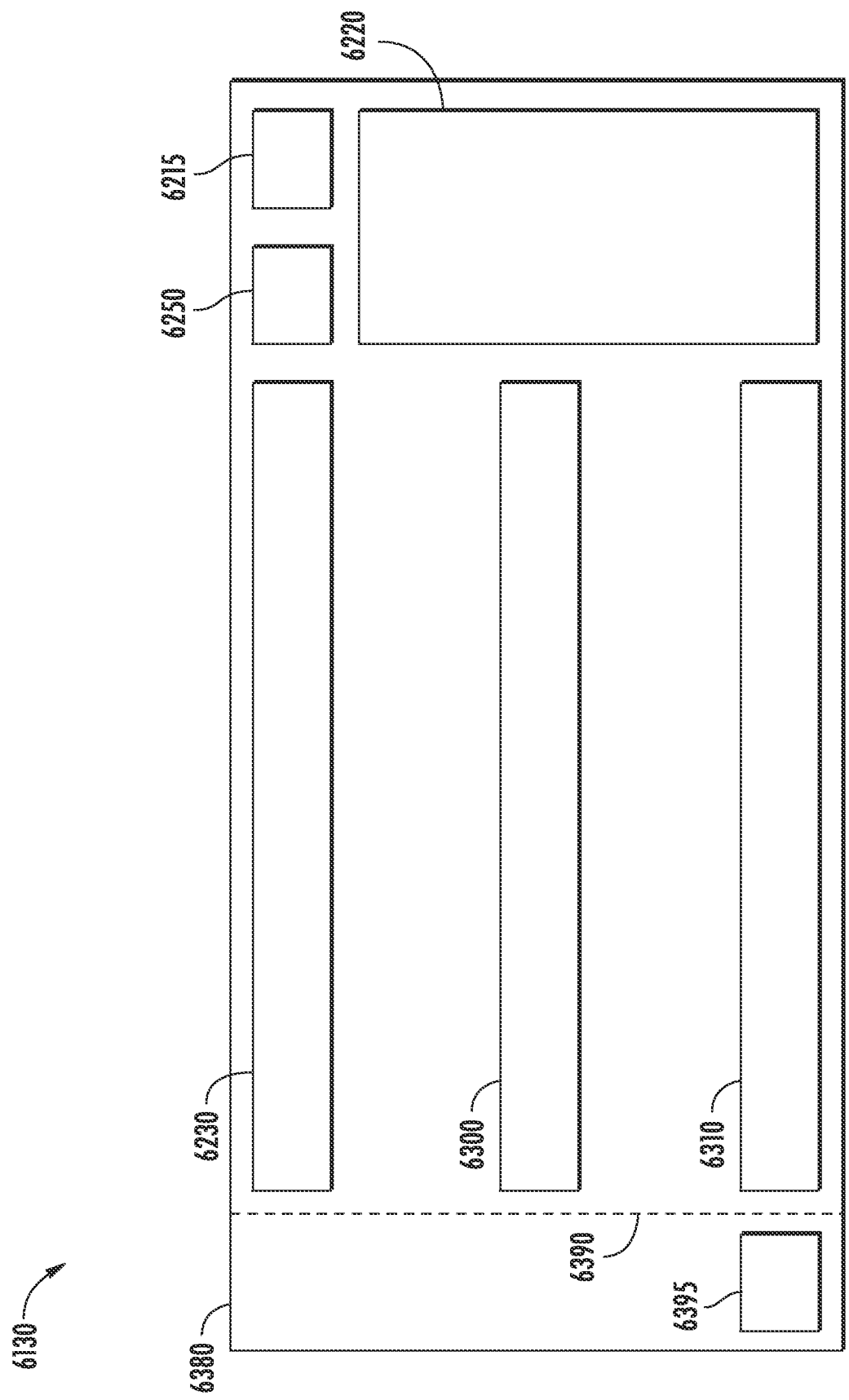
Figures 3B, 6:
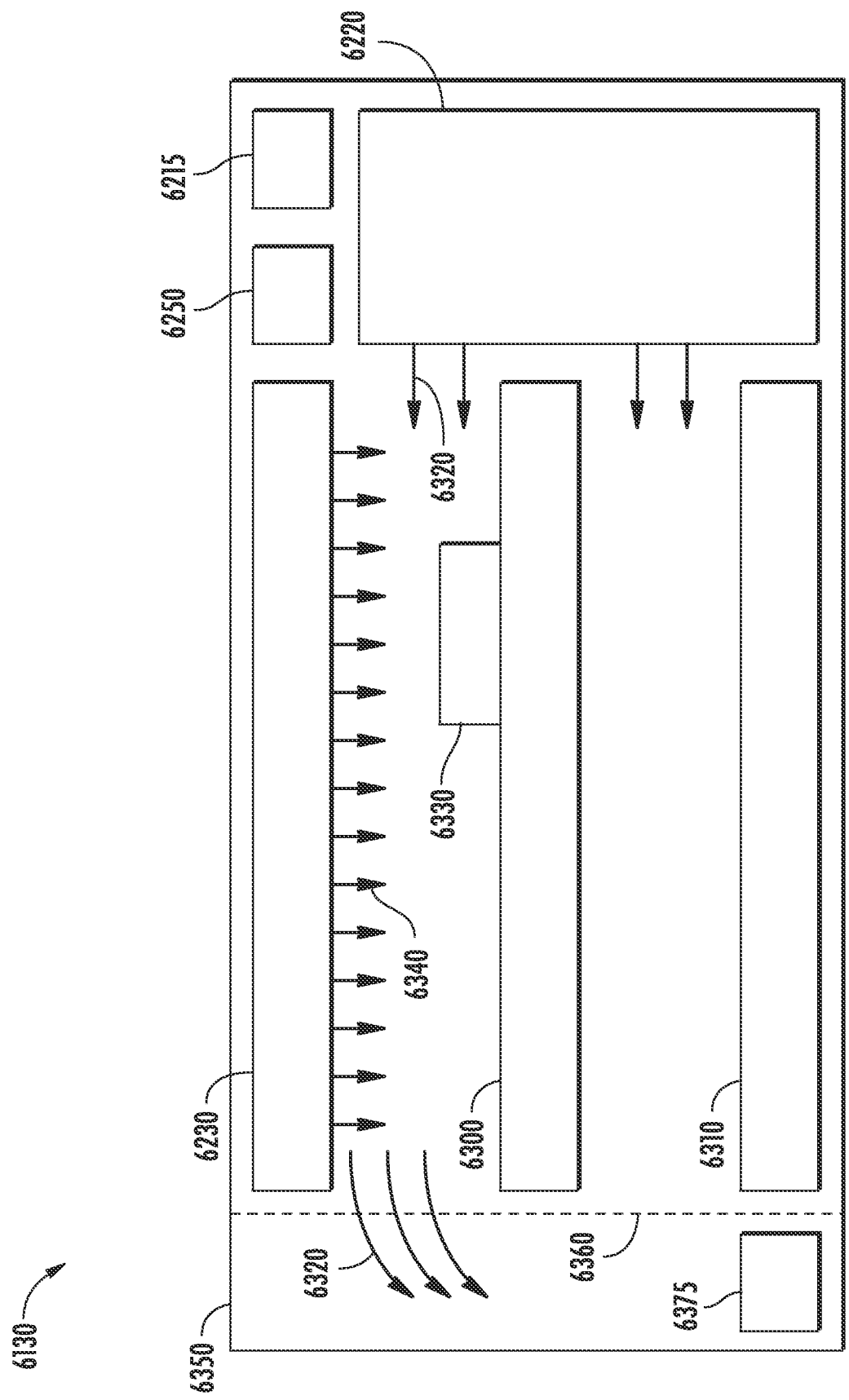
Figures 4, 6:
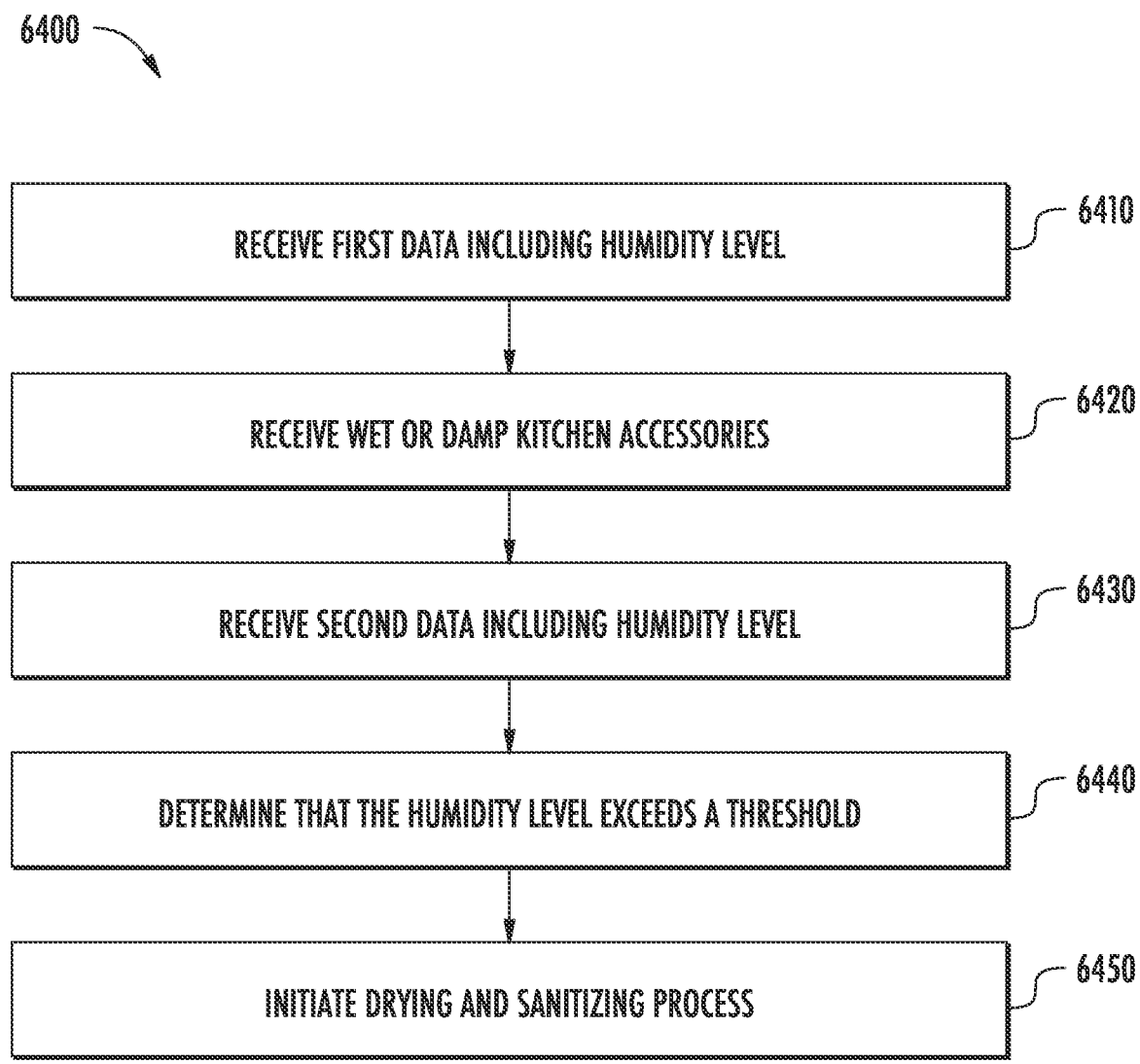
Figures 1, 7:
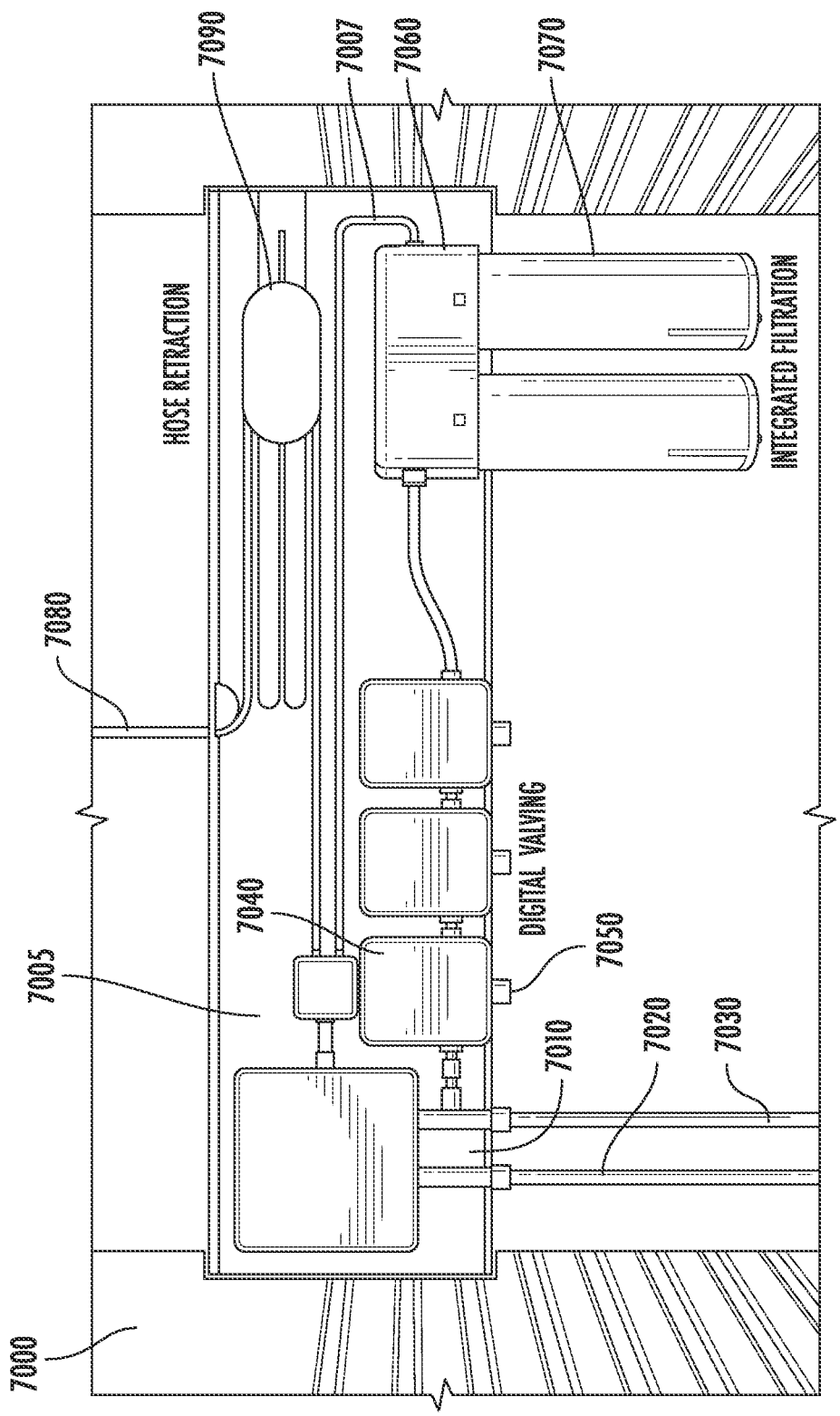
Figures 2, 7:
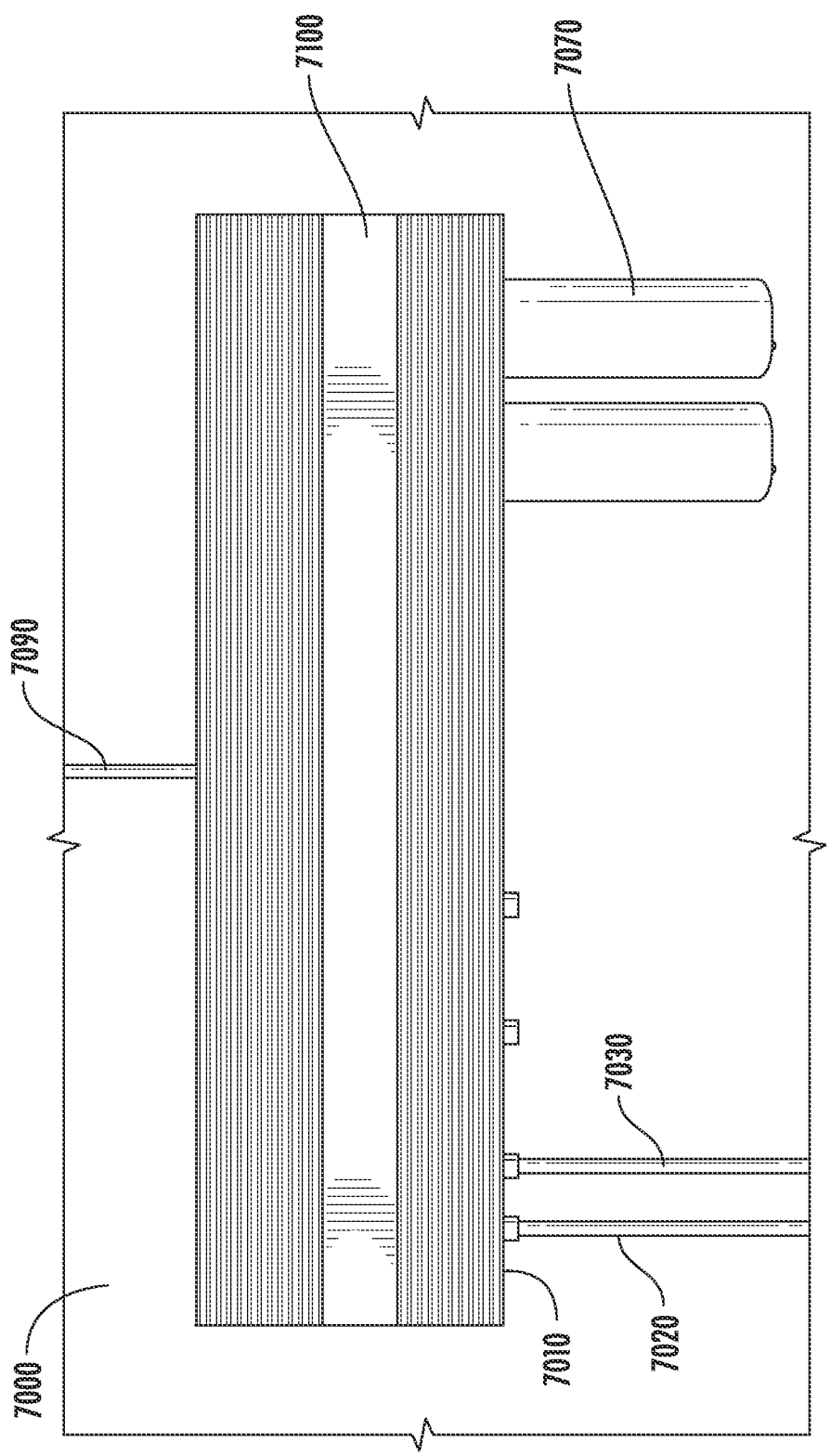
Figures 3B, 7:
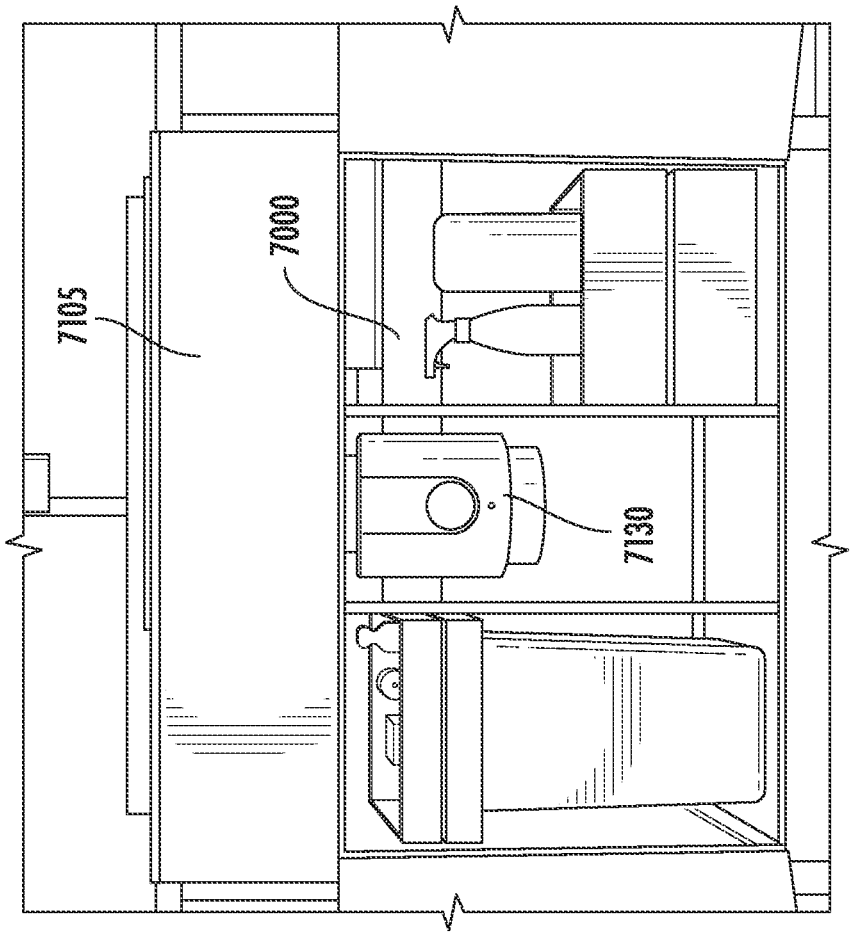
Figures 3A, 7:
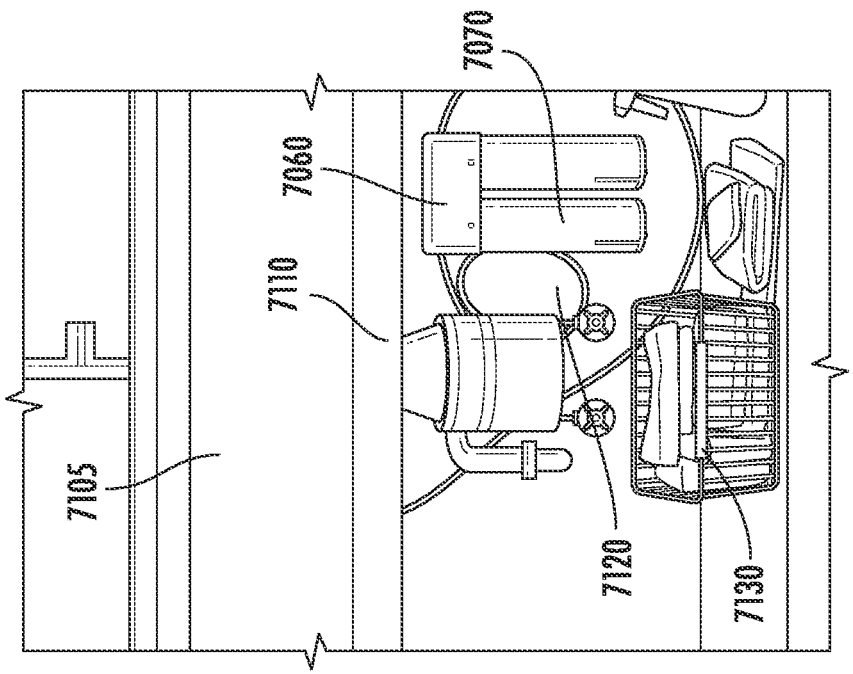
Figures 4, 7:
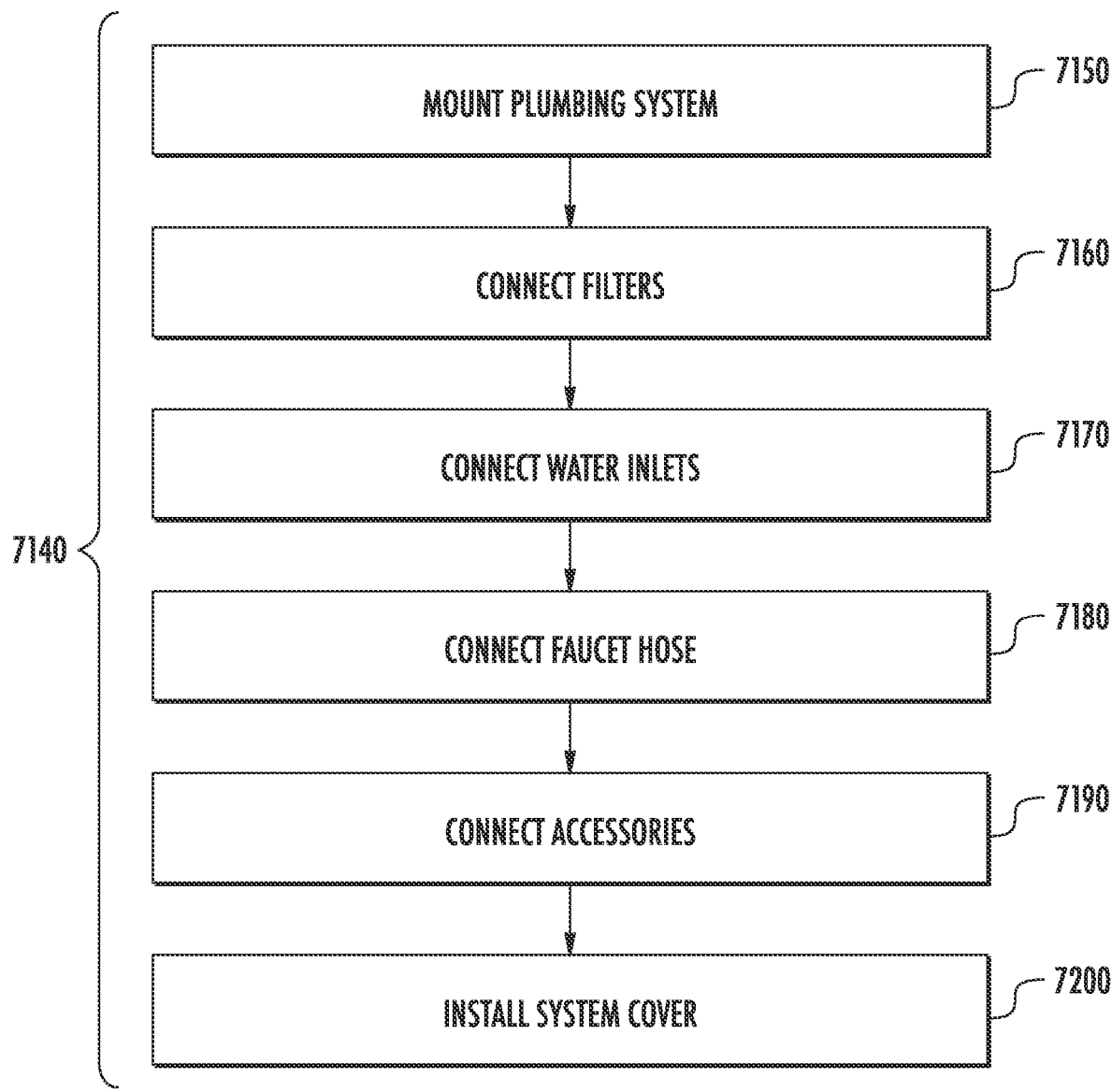

Referring to FIGS. 6-3A and 6-3B, schematic diagrams detailing an internal structure and operation of storage compartment 6130 are shown, according to an exemplary embodiment. Storage compartment 6130 may be shown to include a rack 6300, a tray 6310, a fan 6220, an exhaust 6350, a deflector 6360, one or more filters 6370, a sanitization component 6230, a sensor 6250, and a processing circuit 6215.

Rack 6300 may be configured to receive one or more kitchen accessories 6330 (e.g., sponges, brushes, scrubbers, etc.) and may be further configured to have an open bottom (e.g., a wire rack) to provide ventilation and drainage for items stored thereon. Tray 6310 may be positioned underneath rack 6300 to capture moisture drained from the stored kitchen accessories 6330 and may be structured to be removable from storage compartment 6130 for cleaning. As shown in FIG. 6-3B, fan 6220 may be structured to create a flow of air 6320 directed towards rack 6300 to dry stored kitchen accessories 6330. Fan 6220 may be structured to pull air from outside of storage compartment 6130. Exhaust 6350 may be positioned to direct the flow of air 6320 out of the bottom of storage compartment 6310 as shown in FIG. 6-3B. Exhaust 6350 may be further structured with a deflector 6360 shown in FIGS. 6-3A and 6-3B. Deflector 6360 may be structured to deflect draining water, from stored kitchen accessories, away from exhaust 6350. Exhaust 6350 may include one or more filters 6370 to filter the flow of air 6320 before it moves out of storage compartment 6130. Filters 6370 may be structured to be removable from exhaust 6350 for cleaning. Sanitization component 6230 may be a UV-C LED light and may be positioned, as shown in FIGS. 6-3A and 6-3B, above rack 6300 to emit ultra-violet rays 6340 directed onto kitchen accessories 6330 stored thereon.

As mentioned above, storage compartment 6130 includes a processing circuit 6215 structured to manage drying and sanitizing functions. In an exemplary embodiment, processing circuit 6215 may be shown positioned within storage compartment 6130 and may also include communications interface 6260. In such embodiments, sensors 6250 may include a humidity sensor and a safety sensor. As shown, the humidity sensor and safety sensor may be embodied as a single detector.

Referring now to FIG. 6-4, a flow diagram illustrating a process 6400 for identifying, drying, and sanitizing, wet or damp stored items is shown, according to an exemplary embodiment. In such embodiments, process 6400 may be implemented by storage compartment 6130. Process 6400 may advantageously, provide management of drying and sanitizing processes of storage compartment 6130 with minimal manual interference. In one example, process 6400 may automatically identify wet or damp kitchen accessories stored within storage compartment 6130 and initiate a drying and sanitizing process. In this regard, process 6400 may ensure that all damp or wet kitchen accessories deposited in storage compartment 6130 are dried and sanitized.

At step 6410, the storage compartment receives first data including humidity information. As discussed in detail above, storage compartment 6130 may identify the current relative humidity based on humidity data provided by one or more internal sensors. It will be appreciated that additional information may also be included as part of the first data, in addition to the humidity information.

At step 6420, the storage compartment receives a wet or damp kitchen accessory. A user may deposit one or more wet or damp kitchen accessories into the storage compartment. In this case, the user only interacts with the storage compartment by depositing one or more wet or damp items.

At step 6430, the storage compartment receives second data including updated humidity information. Storage compartment 6130 may identify the current relative humidity based on humidity data provided by one or more internal sensors. In many regards, steps 6430 may be significantly similar to step 6410, described above, however the second data may include updated humidity data. In some embodiments, the second data may be transmitted at a regular interval, such as every few seconds, every hour, once per day, etc.

At step 6440, the current relative humidity may be compared to a threshold value, to determine if the storage compartment contains a wet or damp kitchen accessory. In an exemplary embodiment, a processing circuit of the storage compartment may store a predefined threshold value defining a relative humidity associated with the storage compartment containing a wet or damp kitchen accessory in the storage compartment. The processing circuit may compare the current relative humidity to the threshold to determine that the storage compartment contains one or more wet or damp kitchen accessories.

At step 6450, the storage component initiates a drying and sanitizing process to dry the one or more wet or damp kitchen accessories. In particular, the processing circuit of the storage compartment initiates operation of one or more output devices to facilitate drying and sanitizing functions of the storage compartment. In an exemplary embodiment, the processing circuit of the storage component may execute stored instructions for initiating operation of output devices according to preconfigured parameters which may include preconfigured operating parameters and durations of operation.

Compact Under-Sink Valve Mounting

Figures 3, 4, 5, 6, 7, 8:
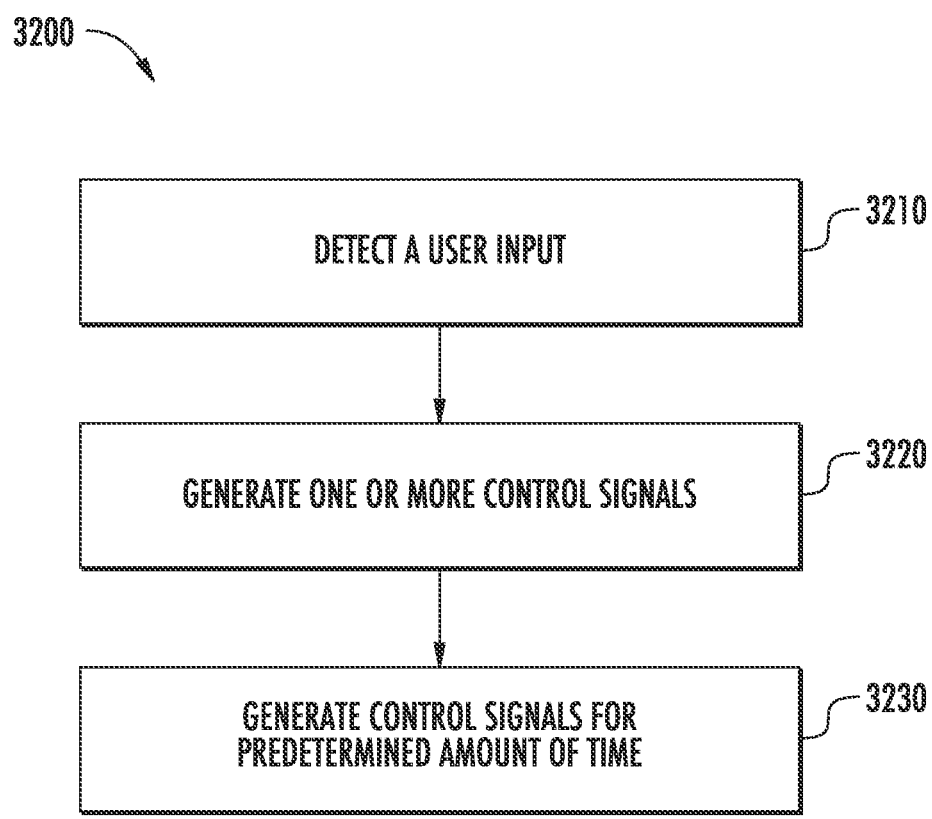
Figures 1, 4:
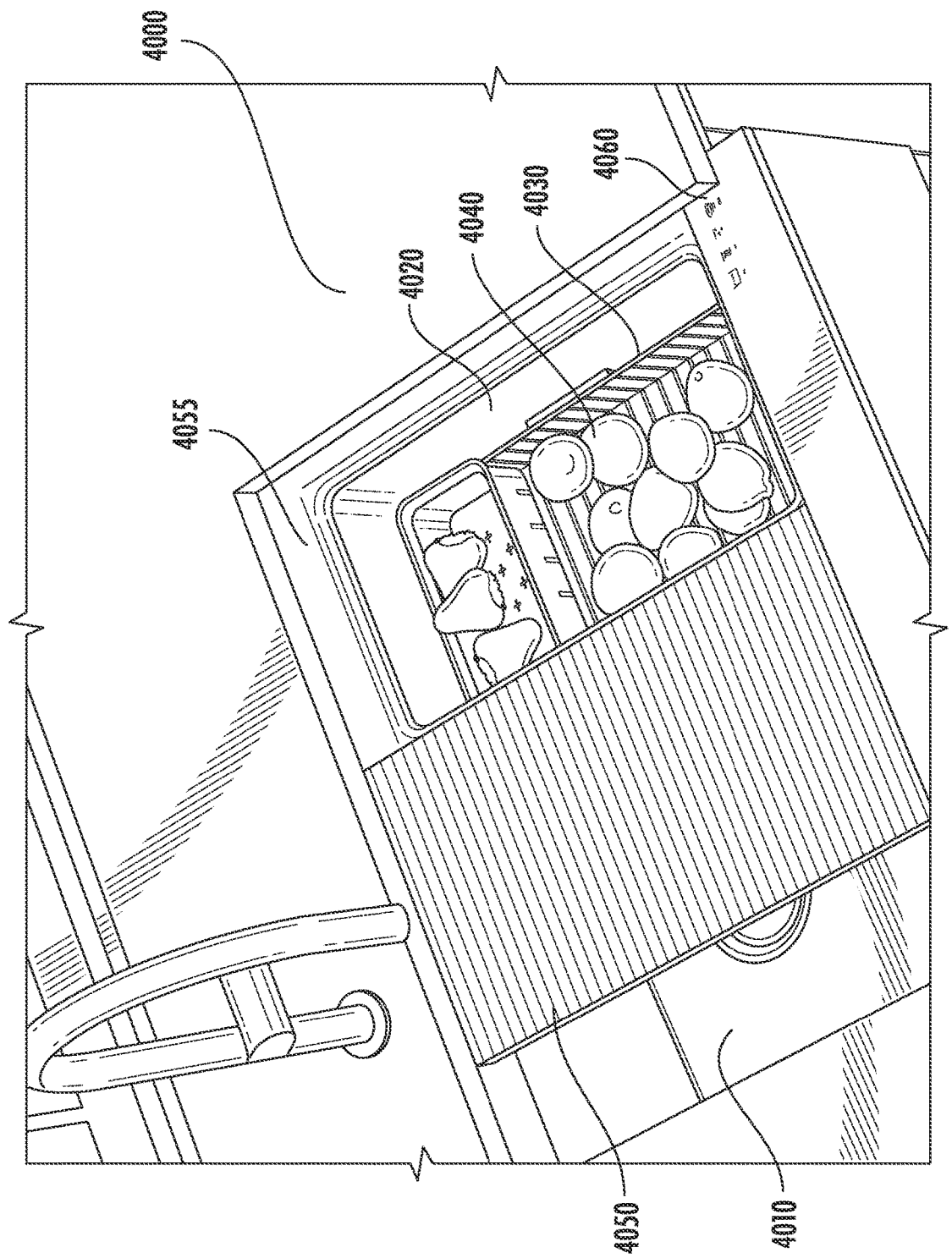
Figures 2, 4:
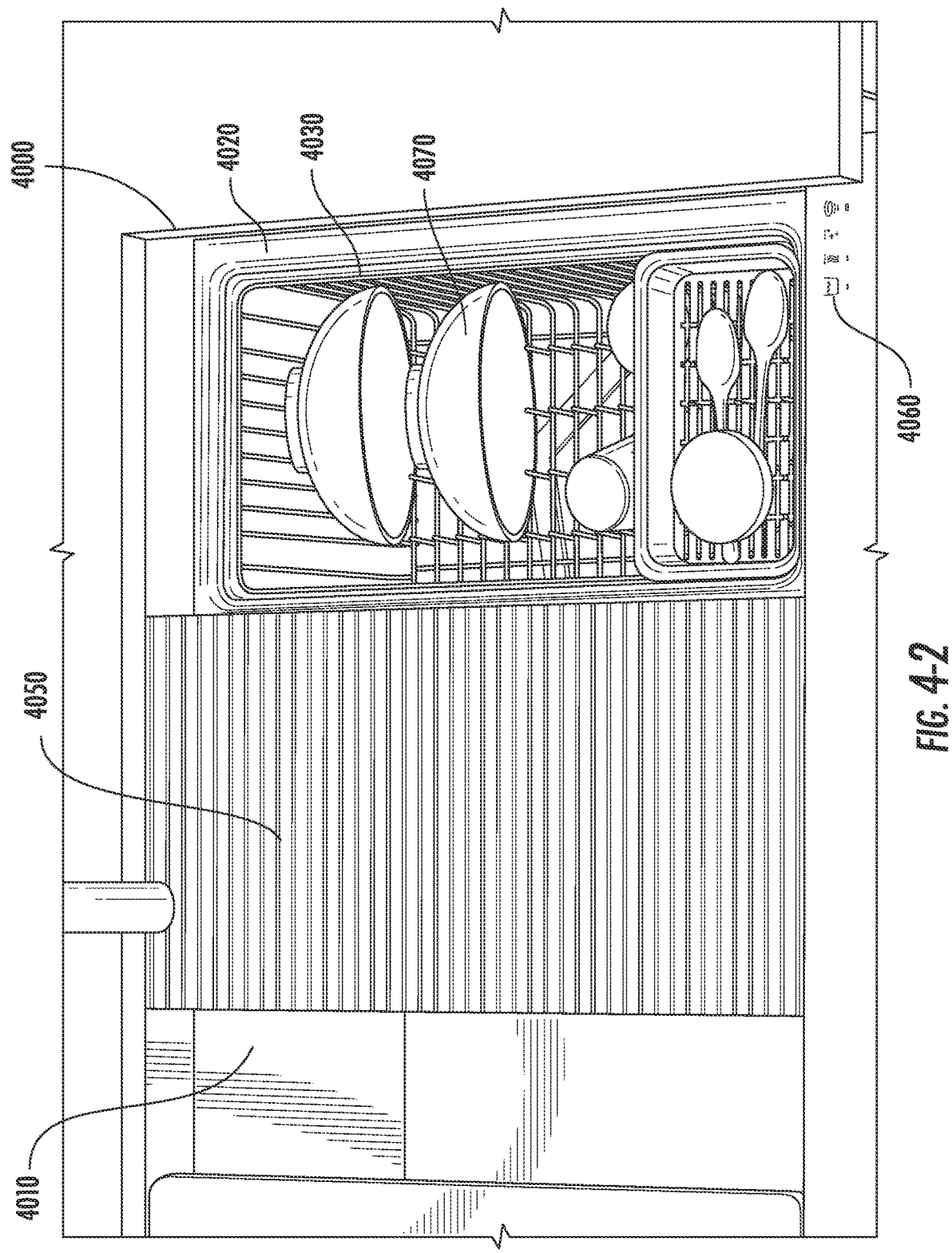
Figures 3, 4:
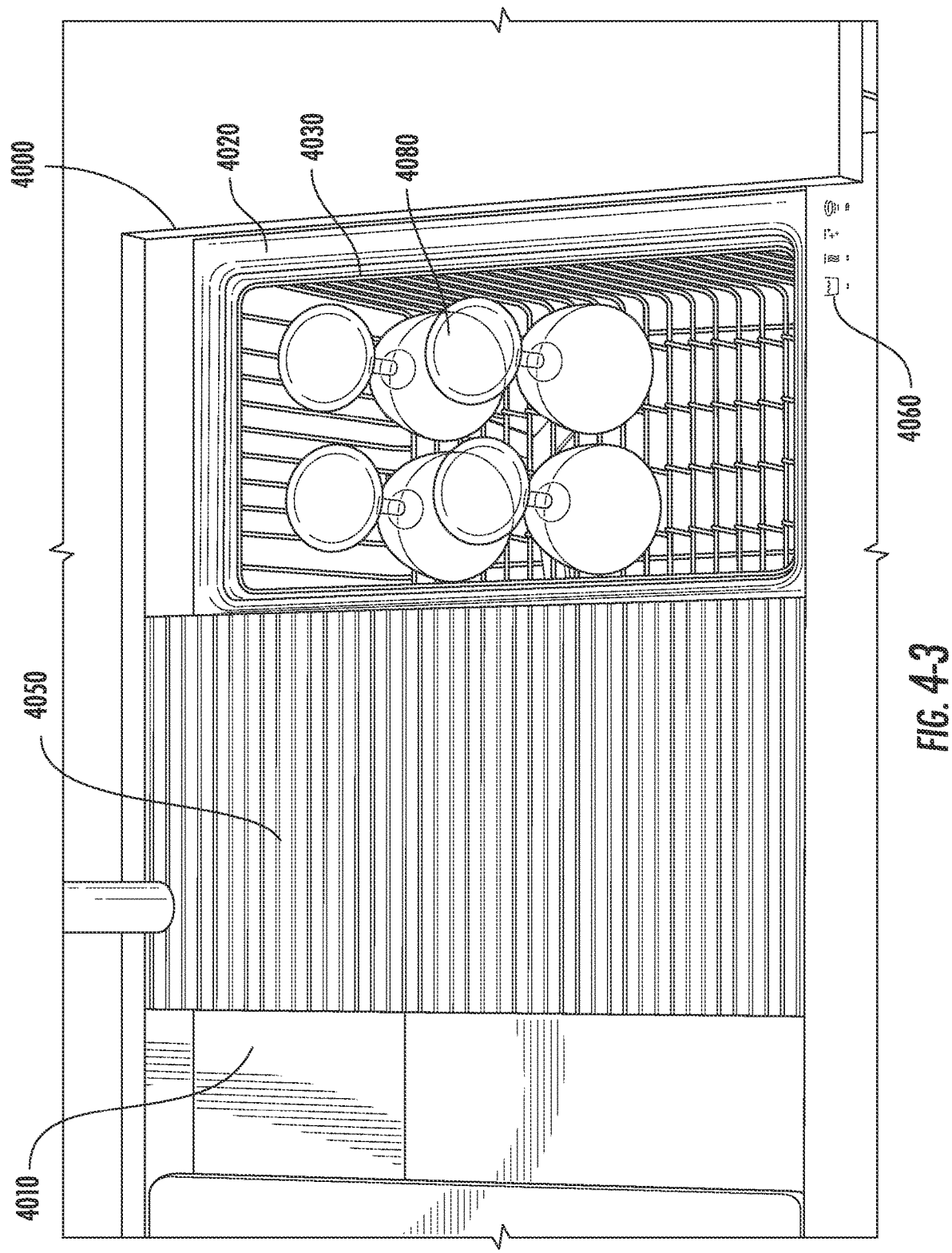
Figure 44:
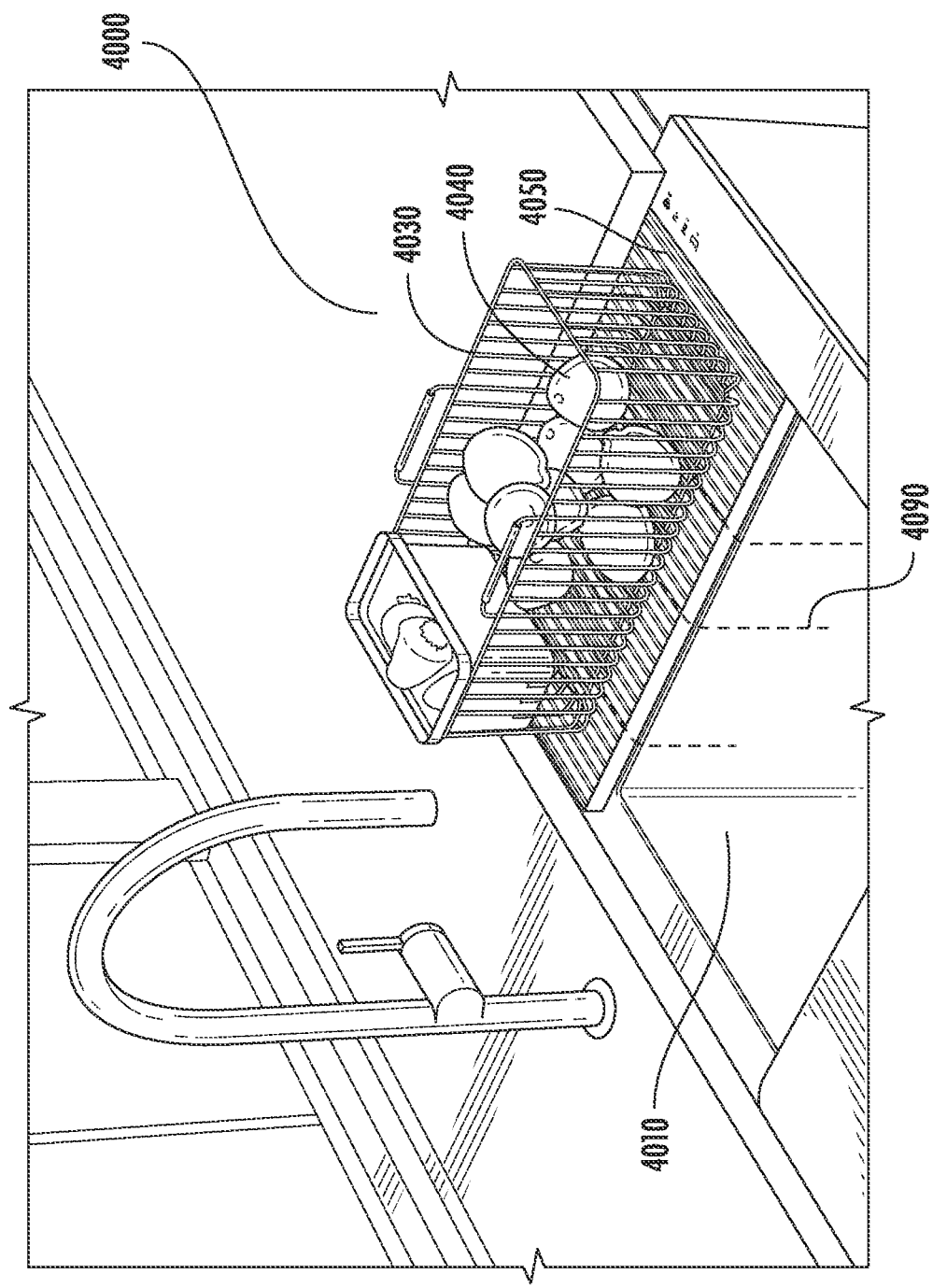
Figures 4, 5, 6:
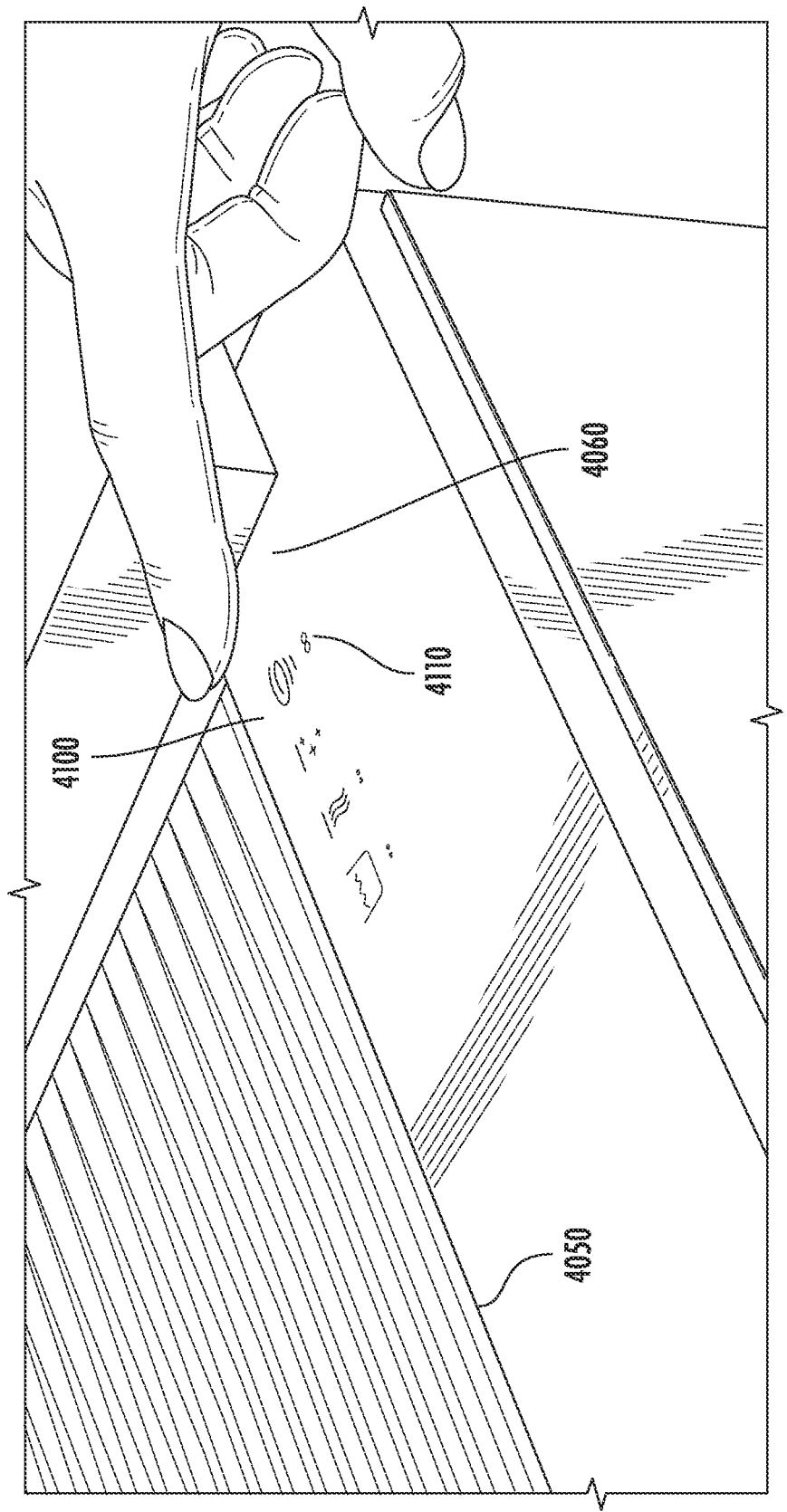
Figures 4, 5, 6, 7:
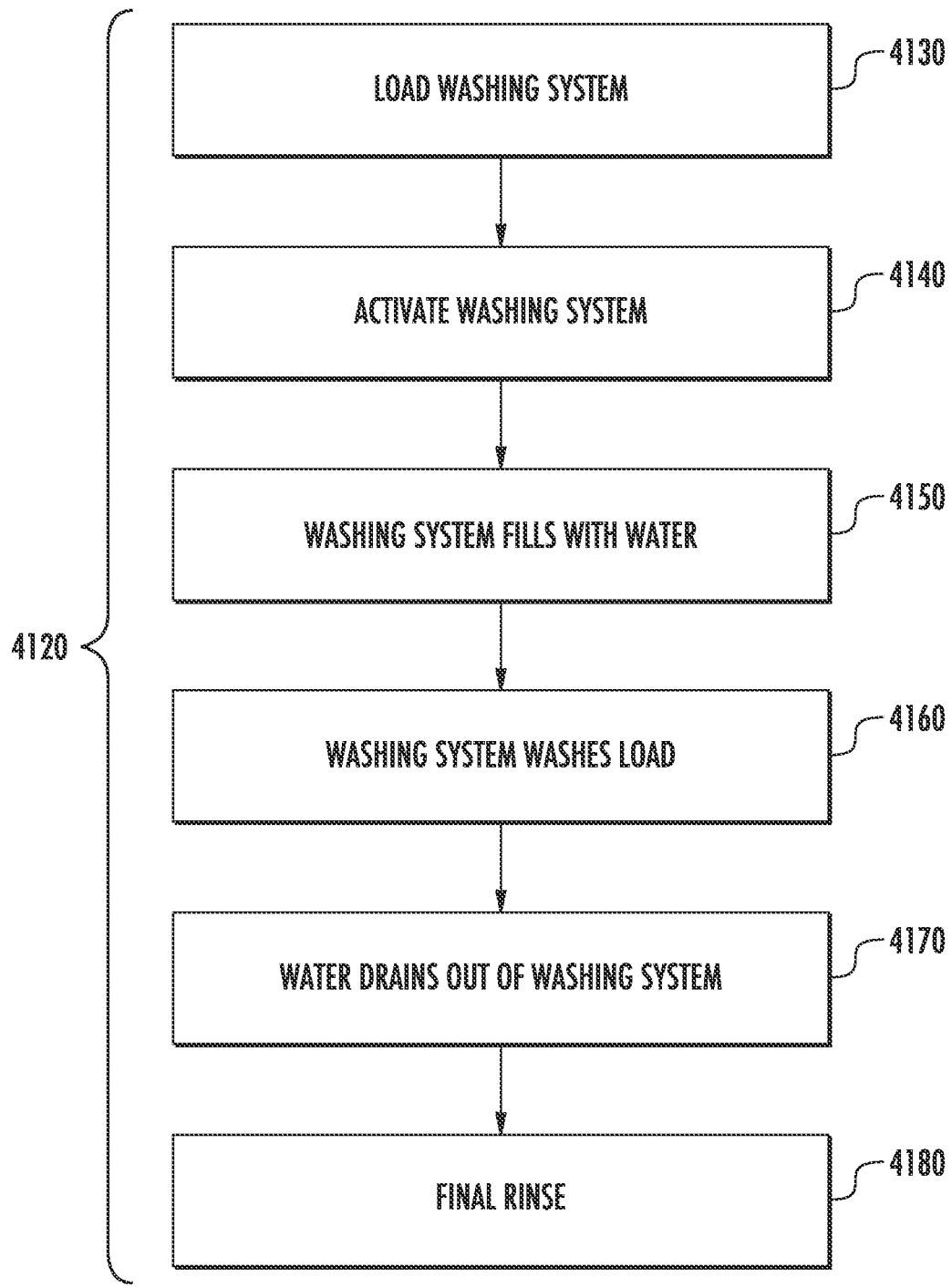
Figures 1, 5:
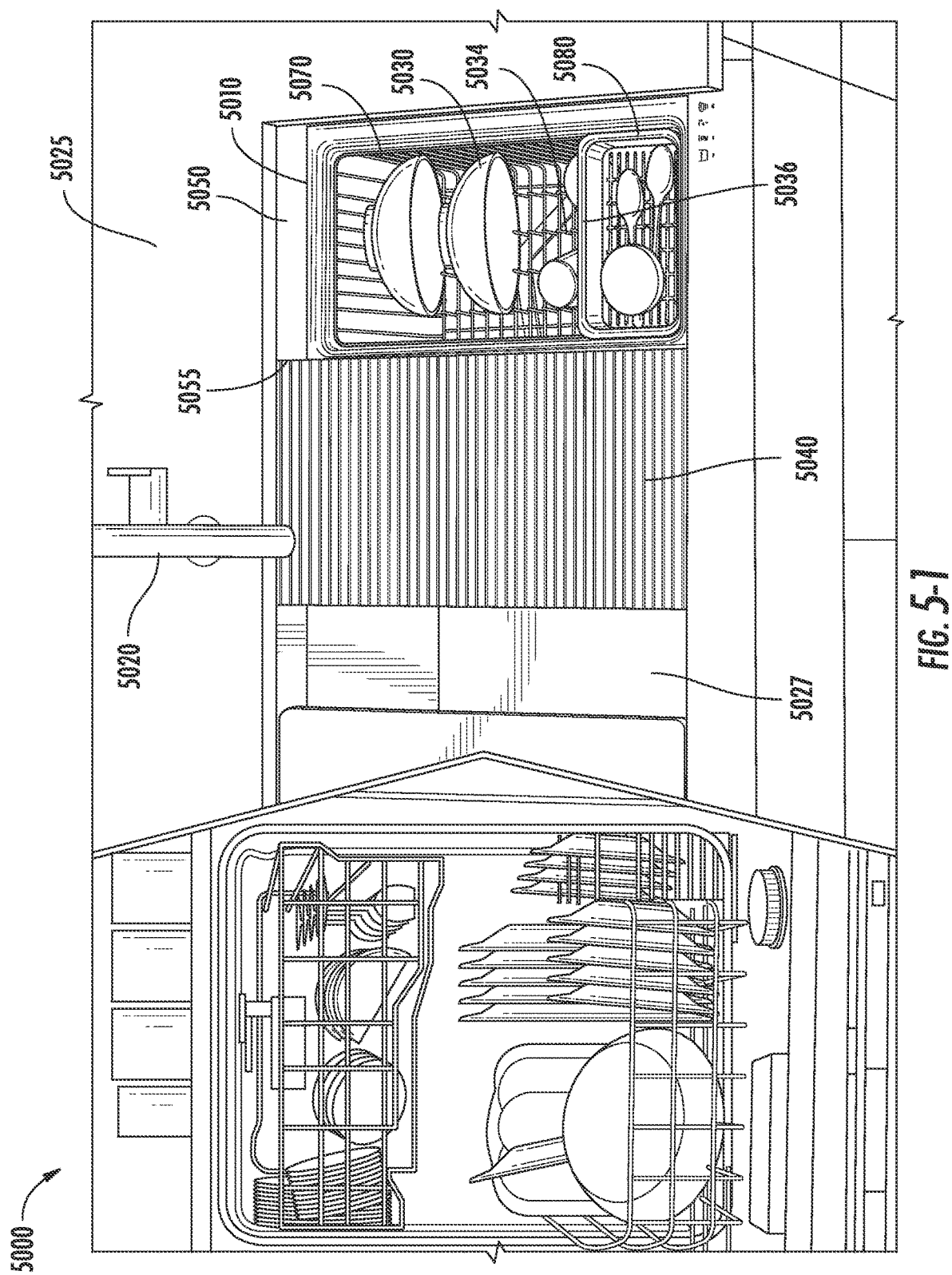
Figures 2, 5:
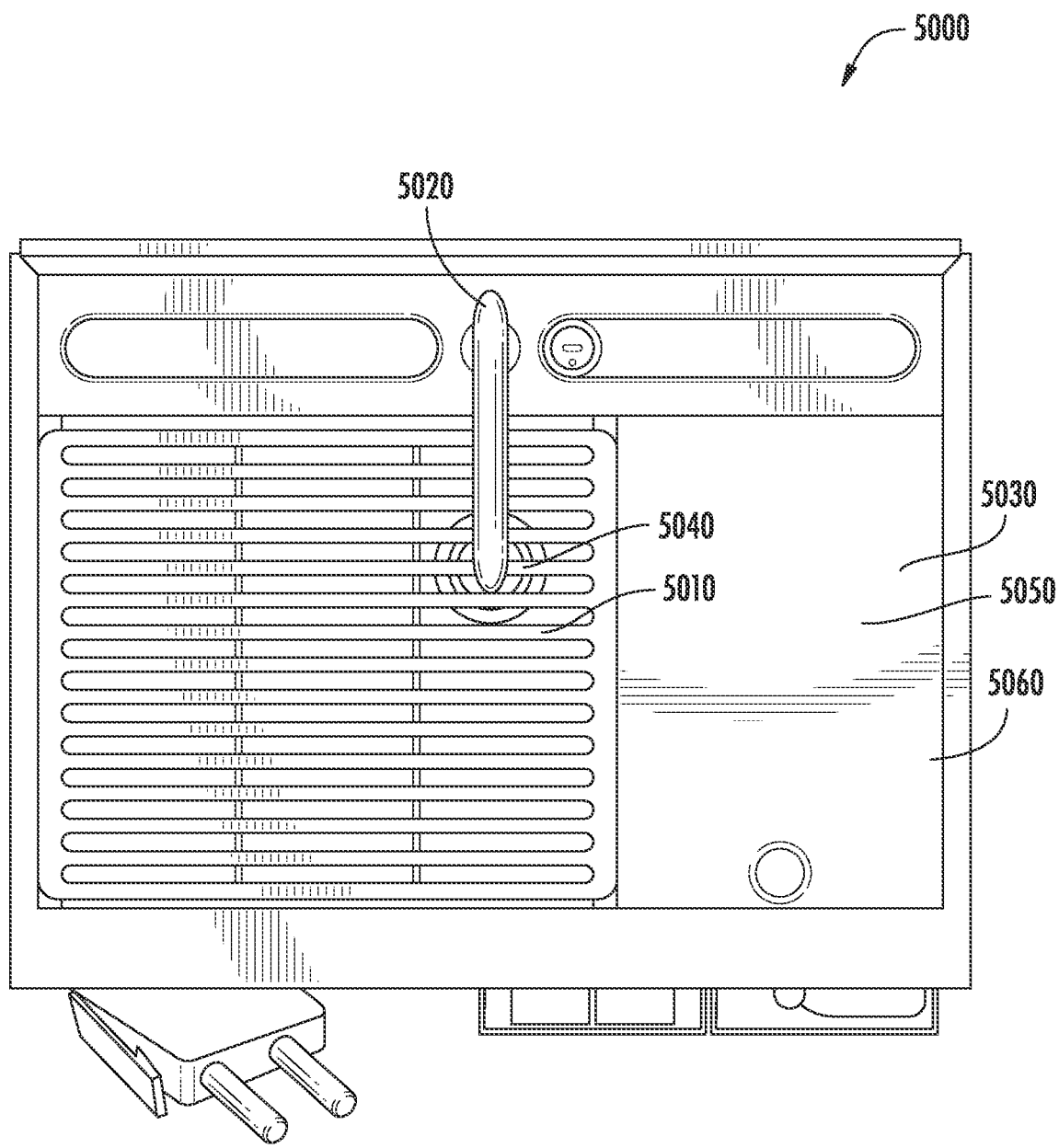
Figures 3, 5:
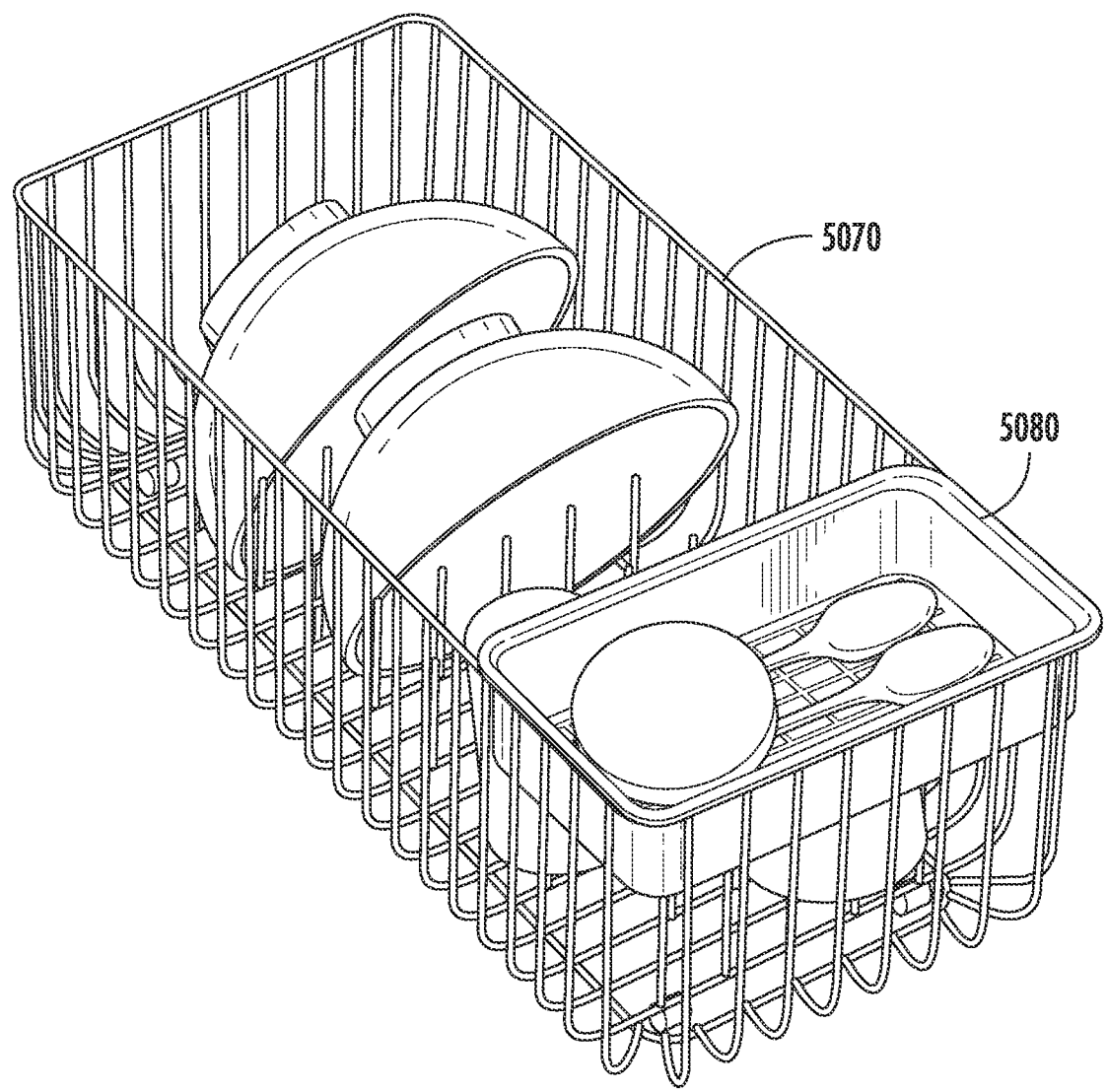
Figures 4, 5:
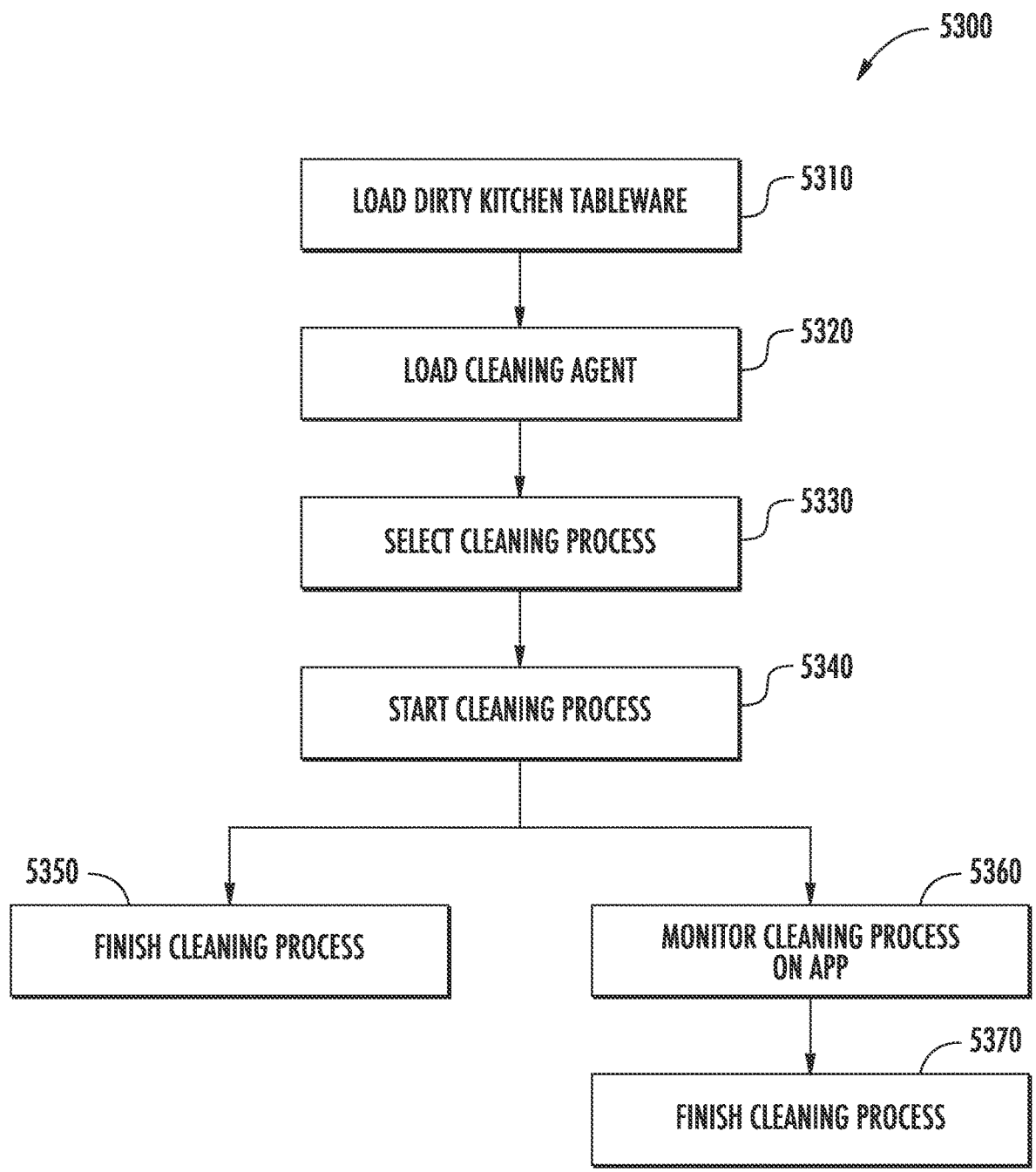
Figure 5:
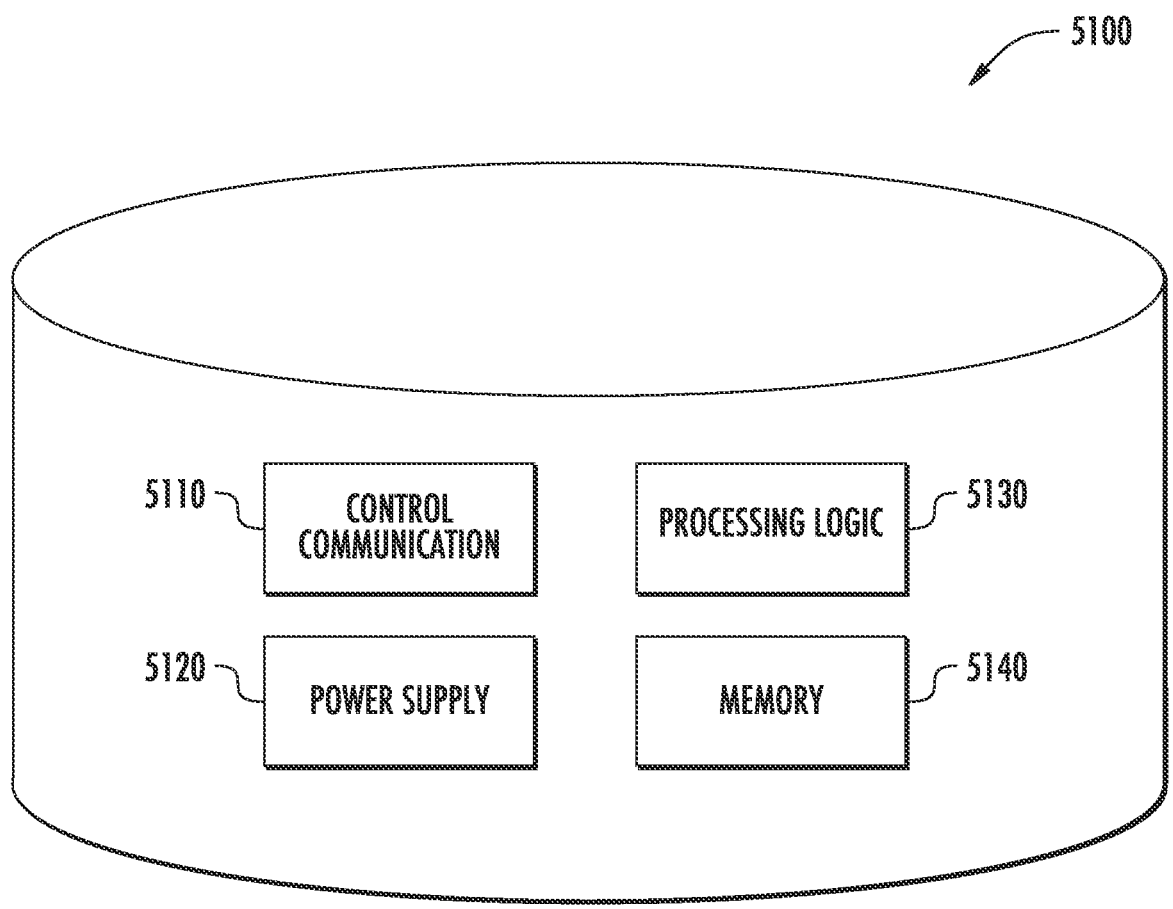

Referring to FIG. 7-1, a front view of a water delivery system 7000 is shown, according to an exemplary embodiment. In some embodiments, the water delivery system 7000 may be mounted under a sink. In some embodiments, the water delivery system 7000 may include a central computer comprising a processor and a memory. The central computer may be adapted to read in signals (e.g., push button, mobile device input, etc.) input by a user, process them, and facilitate the desired function. For example, a user may push a button indicating a desire for filtered water, and the central computer would process the signal and facilitate the water delivery system 7000 to deliver filtered water to the user. The central computer may also be adapted to read in signals from the components of the water delivery system 7000, process them, and send out a signal (e.g., mobile device notification, light indicator, audio cue) to a user. For example, if a filter in the water delivery system 7000 requires a replacement, the central computer would read in a signal from the filtering system, process the signal, and notify the user of the needed maintenance. In some embodiments, the water delivery system 7000 may include wireless (e.g., Bluetooth, Wi-Fi, etc.) connectivity to control functionality (e.g., temperature, flow rate, metered water, filtration, etc.) and/or system status (e.g., errors, maintenance required, filter status, etc.).

The water delivery system 7000 may include a mounting plate 7005. The mounting plate 7005 may be sized to fit all the components of the water delivery system 7000 and may be manufactured from a rigid material (e.g., metal, wood, plastic). The water delivery system 7000 may include internal conduits 7007 (e.g., pipes, hoses, etc.) that connect the internal components. The water delivery system 7000 and its components are coupled to the mounting plate 7005 in such a way as to allow for unobstructed access for service and maintenance (e.g., repair, replacement, etc.). In some embodiments, the mounting plate 7005 may include a power source (e.g., battery, etc.) or may couple with a wall outlet, such to provide power to the water delivery system 7000. In still some embodiments, the mounting plate 7005 may be coupled to both a wall outlet and a secondary power source (e.g., batter, etc.), such to provide power to the water delivery system 7000 during power outages.

The water delivery system 7000 may include inlets 7010. The inlets 7010 are fixedly coupled to the mounting plate 7005. The inlets 7010 are configured to accept conduits carrying a fluid (e.g., water). In some embodiments, the inlets 7010 may be configured to be coupled to various pipe sizes (e.g., ⅛", ¼", etc.) and various conduit types (e.g., polyvinyl chloride, copper, etc.). A cold water conduit 7020 and a hot water conduit 7030 fixedly couple to the inlets 7010. The cold water conduit 7020 and the hot water conduit 7030 direct water from a source (e.g., tank, plumbing) to the water delivery system 7000.

The water delivery system 7000 may include digital valves 7040. The digital valves 7040 are fixedly coupled to the mounting plate 7005. In some embodiments, the water delivery system 7000 may include any number of digital valves 7040 (e.g., 1, 2, 3, 4, etc.). The digital valves are connected to the inlets 7010 by the internal conduits 7007.

The digital valves 7040 are valves that may be actuated electronically between an "open" position (i.e., fluid may flow through) and a "closed" position (i.e., not fluid may flow through). To actuate a digital valve, a microprocessor reads in an actuation signal, processes the signal, and drives the mechanical components of the valve to the desired position. This allows for the digital valves 7040 to be more precise than traditional analog valves. In some embodiments, the digital valves 7040 are controlled by a computer system in the water delivery system 7000, as described above. In some embodiments, the digital valves 7040 may include wireless (e.g., Bluetooth, Wi-Fi, etc.) connectivity to control functionality (e.g., actuation, etc.) and relay status (e.g., maintenance required, current position, etc.).

In some embodiments, the digital valves 7040 may detect problems (e.g., leaks, floods, etc.), may close all open valves when a problem may be detected, and may notify the water delivery system 7000 of the problem. To detect the problems, the digital valves 7040 may include sensors (e.g., moisture, pressure, etc.) that may send signals to a computer system in the water delivery system 7000, as described above. The computer system may read in the sensor signals and determine when a problem has occurred. If a problem may be detected, the computer system may send signals to the digital valves 7040 to close all open valves.

In some embodiments, the water delivery system 7000 may include a manual shut off switch (e.g., push-button, toggle switch, etc.) that may close all open the digital valves 7040 when activated. The water delivery system 7000 may be configured such that access to the shut off switch may be unobstructed. In some embodiments, the digital valves 7040 may be coupled digitally (e.g., wiring, Bluetooth, Wi-Fi, etc.) to the other components of the water delivery system 7000. In some embodiments, the manual shut off switch may include other functionalities.

The digital valves 7040 include digital valve outlets 7050. In some embodiments, the digital valves 7040 may include any number (e.g., 1, 2, 3, 4, etc.) of digital valve outlets 7050. When the digital valves 7040 are in their "open" positions, the digital valve outlets 7050 facilitate fluid flow to accessory systems. In some embodiments, the digital valve outlets 7050 may be configured to couple to various pipe sizes (e.g., ⅛", ¼", etc.) and various conduit types (e.g., polyvinyl chloride, copper). In some embodiments, the digital valve outlets 7050 may be used to connect to sink accessories (e.g., pot-filler, beverage faucet, direct injection, etc.). In some embodiments, the digital valves 7040 may be configured to bias in the "closed" position when the digital valve outlets 7050 are left unconnected.

Water delivery system 7000 may include filtration system 7060. The filtration system 7060 may be fixedly coupled (e.g., adhesive, fasteners, etc.) to the mounting plate 7005. The filtration system 7060 may be activated by a signal (e.g., wireless, electric, etc.) from the water delivery system 7000 to filter fluid delivered to the filtration system 7060 by internal conduits 7007. In some embodiments, the water delivery system 7000 may bypass the filtration system 7060 to allow unfiltered water to pass through system.

In some embodiments, the filtration system 7060 can include a digital valve for controlling fluid flow. The digital valve may include wireless (e.g., Bluetooth, Wi-Fi, etc.) connectivity to control functionality (e.g., actuation, etc.) and relay status (e.g., maintenance required, current position, etc.). In some embodiments, the filtration system 7060 may be operably coupled (e.g., wiring, Bluetooth, Wi-Fi, etc.) to the other components of water delivery system 7000. In some embodiments, the filtration system 7060 will indicate by means of a notification (e.g., indicator light, audio, etc.) the status (e.g., filter condition, etc.) of the filtration system 7060.

The filtration system 7060 may include filters 7070. The filtration system 7060 facilitates the intake of a fluid (e.g., unfiltered water), passes the fluid through filter(s) (e.g., activated carbon, reverse osmosis, hollow fiber membrane, etc.), such as the filters 7070, and returns a filtered fluid (e.g., filtered water). In some embodiments, the filtration system 7060 may include any number (e.g., 1, 2, 3, etc.) of filters 7070. The filters 7070 are selectively coupled (i.e., may be removed) with the filtration system 7060. In some embodiments, the filters 7070 relay their status to the filtration system 7060.

The water delivery system 7000 may include a faucet conduit 7080. The faucet conduit 7080 couples (e.g., allows fluid to flow between) with internal conduits 7007. In some embodiments, an adapter may need to be installed to couple faucet conduit 7080 with internal conduits 7007. The faucet conduit 7080 directs fluid (e.g., unfiltered water, filtered water, etc.) from the water delivery system 7000. The faucet conduit 7080 may connect to a sink faucet. In some embodiments, the faucet conduit 7080 may route to a sink system with a pull-out hose.

The faucet conduit 7080 may route through a hose retraction system 7090. The hose retraction system 7090 may define a cavity on the mounting plate 7005. In some embodiments, within the cavity, the hose retraction system 7090 may include a spring that may couple (e.g., fixedly) to the faucet conduit 7080. The hose retraction system 7090 may organize the faucet conduit into a coil within the cavity. In some embodiments, the hose retraction system 7090 may use a spring and pulley system to pull the hose tight without forming a coil. In still some embodiments, such as when the water delivery system 7000 may be mounted under a sink, the hose retraction system 7090 prevents the faucet conduit 7080 from catching or twisting.

Referring to FIG. 7-2 a front view of the water delivery system 7000 is shown with cover 7100 attached. The cover 7100 may be selectively coupled (e.g., may be removed) to the mounting plate 7005, such that the cover 7100 may be removed to access the components of the water delivery system 7000. The cover 7100 may be configured to cover the components of water delivery system 7000 while allowing access to certain components of the water delivery system 7000, such as the inlets 7010, filters 7070, and faucet conduit 7080. In some embodiments, the cover 7100 may be configured to allow access to a shutoff switch, as described above. In some embodiments, the cover 7100 may be made from a rigid material (e.g., metal, plastic, etc.). In still some embodiments, the cover 7100 may be treated or coated with a material that may prevent the cover 7100 from being damaged by moisture.

Referring generally to FIGS. 7-3A and 7-3B, the benefits organizational and mounting benefits of using a valve mounting system, such as water delivery system 7000, over a standard under-sink system are depicted.

FIG. 7-3A shows a sink 7105 with a standard mounting system 7110, according to a particular embodiment. Standard mounting system 7110 may include exposed conduits 7120. The exposed conduits 7120 may snag or catch on under-sink accessories 7130. When exposed conduits 7120 snag or catch, there may be a danger that the conduit may be damaged (e.g., split, break, etc.), which may result in fluid (e.g. unfiltered water, filtered water, etc.) leaking from the standard mounting system 7110. Such damage to exposed conduits 7120 may further damage the under-sink accessories 7130 or may introduce moisture into the under-sink space resulting in damage (e.g., water damage, mold, etc.). In some embodiments, using standard mounting system 7110 may obstruct access to under-sink components, such as the filtration system 7060. Such an obstruction may hinder maintenance and service, such as replacing filters 7070.

FIG. 7-3B shows a sink 7105 with the water delivery system 7000 installed, according to a particular embodiment. The water delivery system 7000 discretely routes all internal conduits 7007 away from sight and away from any under-sink accessories 7130. This allows for the space under the sink 7105 to be used safely (e.g., without a possibility of damage). The water delivery system 7000 may include a traditional plumbing system that may be installed on-site, where the plumbing system may be configured to comply with local code requirements. In some embodiments, a tradesman would be able to install the water delivery system 7000 quicker than standard mounting system 7110.

In some embodiments, the sink 7105 may include a control module (e.g., remote control, control interface, etc.) for controlling water delivery system 7000. The control module may be configured to accept signals from and send signals to a user. For example, a user may press an element (e.g., push-button, switch, etc.) to activate the filtration system 7060 of the water delivery system 7000. The control module would then activate the digital valves 7040 responsible for running the filtered water system. In some embodiments the control module may be configured with other system in a kitchen. This would allow for a user to control multiple appliances simultaneously from one control device (e.g., mobile device, control interface, etc.)

Referring to FIG. 7-4, an installation method 7140 for installing a system, such as water delivery system 7000, by a tradesperson is shown. The installation method 7140 facilitates installing a pre-plumbed valve system under a sink and affixing all components. The benefit of installing a pre-plumbed valve system may be that certain components have already been pre-plumbed as compared to a standard installation method where each component needs to be individually connected. The installation method 7140 may include a tradesperson receiving a pre-plumbed valve system, mounting the pre-plumbed valve system under a sink, connecting all conduits and accessories, then covering the system. The installation method 7140 results in a function sink system. The installation method 7140 may be more efficient than a standard installation method for installing sink plumbing, as the installation method 7140 includes a pre-plumbed valve system.

The installation method 7140 may include a mounting method 7150. Mounting method 7150 may include mounting (e.g., fixedly coupling) a pre-plumbed valve system on a back wall under a kitchen sink. The pre-plumbed valve system may be mounted to the back wall using mechanical (e.g., screws, brackets, slots) means, chemical (e.g., adhesive) means, or any combination thereof. Mounting the pre-plumbed valve system allows for the system to be flush against the back wall and take up less space than a standard system.

The installation method 7140 may include a filter connection method 7160. The filter connection method 7160 may include connecting fluid filters to the pre-plumbed valve system. The fluid filters may be connected to the pre-plumbed valve system by a selectively coupled system (e.g., screw, tab, etc.). This allows for the filters to be removed when they require replacement. In some embodiments, the fluids filters may be already pre-installed in the pre-plumbed valve system.

The installation method 7140 may include an inlet connection method 7170. The inlet connection method 7170 may include connecting water conduits to the pre-plumbed valve system. The water conduits delivers water from a source (e.g., tank, centralized supply) to the pre-plumbed valve system. In some embodiments, the inlet on the pre-plumbed valve system may be configured to fit various sizes (e.g., ⅛", ¼", etc.) and types (e.g., polyvinyl chloride, copper, etc.) of conduit. The inlet connection method 7170 must be completed while no water may be running through the water conduits. Once the water conduits are connected to the pre-plumbed valve system, water flow may be introduced. Once water may be flowing through the conduits, the connection may be tested for any issues (e.g., leaks, damage, etc.).

The installation method 7140 may include a hose connection method 7180. The hose connection method 7180 may include coupling a sink faucet hose to the pre-plumbed valve system. Coupling the sink faucet hose may include connecting the sink faucet hose to a conduit or outlet valve on the pre-plumbed valve system. In some embodiments, the hose connection method 7180 may include routing the hose through a hose retraction system. Once connected, the connection may be tested for any issues (e.g., leaks, damage, etc.) by running water through it.

The installation method 7140 may include an accessory connection method 7190. The accessory connection method 7190 may include connecting accessories which may require water to the pre-plumbed valve system. In some embodiments, an adapter may need to be installed to configure the pre-plumbed valve system to fit accessories having conduits of various sizes (e.g., ⅛", ¼", etc.) and types (e.g., polyvinyl chloride, copper, etc.) of conduit. In some embodiments, the accessory connection method 7190 may include syncing the electronics suite of an accessory to the electronics suite of the pre-plumbed valve system.

The installation method 7104 may include a cover installation method 7200. The cover installation method 7200 may include mounting a cover over the pre-plumbed valve system selectively (e.g., screws, tabs, etc.). Once installed, the cover may be removed to access the components of the pre-plumbed valve system.

In some embodiments, the methods of installation method 7104 may be completed simultaneously or in any order.

As can be appreciated, any of the sink systems described above (e.g., Cabinet Door Sensor System, Garbage Disposal System with Direct Water Injection, Sink with Integrated Produce Washer, Sink with Integrated Dishwasher, Apron-Front Sink with Integrated Drying/Sanitizing Features, and Compact Under-Sink Valve Mounting) or components thereof can be used in any combination with one another. For example, all of the sink systems described above can be utilized together in a single sink system. Additionally or alternatively, a user can customize a sink system to use any combination of the sink systems described above or any combination of the components of the sink systems described above.

The sink system may include any combination of sink system described above (e.g., Cabinet Door Sensor System, Garbage Disposal System with Direct Water Injection, Sink with Integrated Produce Washer, Sink with Integrated Dishwasher, Apron-Front Sink with Integrated Drying/Sanitizing Features, and Compact Under-Sink Valve Mounting). The sink system may be installed and/or organized to fit into a cabinet space and/or counter space. For example, in one embodiment, the sink system may be a pre-assembled cabinet module. In such an embodiment, the cabinet module may include any combination of the sink systems described above, where the cabinet module is inserted as would a traditional cabinet. In yet another example, in another embodiment, the sink system may be a pre-assembled cabinet panel. In such an embodiment, the individual cabinet panel may include any combination of the sink systems described above, where the cabinet panels may be slidably coupled within the cabinet module. In yet another example, in another embodiment, the sink system may be a pre-assembled sink module. In such an embodiment, the sink module may be pre-assembled with any combinations of the sink systems described above, where the sink module is dropped in to a counter. As can be appreciated, any of the installation and/or organization described above may be utilized to assemble the sink system.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the sensor system 2100 of the exemplary embodiment described with respect to FIG. 2-1 may be incorporated with the sink module 2010. As another example, the sensor system 2100 of the exemplary embodiment described with respect to FIG. 2-1 may be incorporated into the dishwasher module 5030 descried with respect to FIG. 5-1. Although only two examples of an element from one embodiment that can be incorporated or utilized in another embodiment has been described above, it should be appreciated that other elements of the various embodiments may be incorporated or utilized with any of the other embodiments disclosed herein.

What is claimed is:

1. A sink system, comprising:
    a sink basin;
    a disposal system comprising a first inlet fluidly coupled to the sink basin, a second inlet fluidly coupled to a second fluid source, and a garbage disposal configured to receive a first flow of fluid from the sink basin via the first inlet and receive a second flow of fluid from a second fluid source via the second inlet,
    wherein the sink basin delivers a flow of used water to the disposal system and the second fluid source delivers a flow of clean water to the disposal system;
    a controller configured to activate the second fluid source and the garbage disposal for a predetermined amount of time in response to a user input, and deactivate the second fluid source and the garbage disposal after the predetermined amount of time has elapsed, such that the garbage disposal is operable without the first flow of fluid from the sink basin.

2. The sink system of claim 1, wherein the garbage disposal comprises at least one grinding element configured to dispose of waste material positioned within the garbage disposal, the grinding element operable via a generator.

3. The sink system of claim 1, wherein the disposal system comprises a valve coupled to the controller and operable to control the flow of clean water to the disposal system from the second fluid source,
    wherein the controller is configured to operate the valve between an open position and a closed position.

4. The sink system of claim 1, wherein the disposal system further comprises:
    a cleaning unit selectively coupled to the garbage disposal, the cleaning unit configured to clean an internal portion of the garbage disposal,
    wherein the controller is configured to send a command to actuate the cleaning unit in response to receiving the input signals from one or more sensors.

5. The sink system of claim 1, wherein the disposal system comprises a valve operable to control the flow of clean water to the disposal system from the second fluid source; and wherein the sink system further comprises:
    one or more sensors operably coupled to the controller, the one or more sensors configured to provide input signals to the controller;
    wherein the controller repositions the valve to receive the second flow of fluid in response to the one or more sensors detecting that the first fluid source is in an off position.

6. The sink system of claim 1, wherein the disposal system further comprises:
    a cleaning unit selectively coupled to the garbage disposal, the cleaning unit configured to clean an internal portion of the garbage disposal,
    wherein the controller provides a status of the cleaning unit to a user, and wherein the user provides a user input to selectively activate the cleaning unit.

7. The sink system of claim 4,
    wherein the controller is configured to determine an amount of a cleaning agent to be dispensed into the garbage disposal from the cleaning unit in based on the predetermined amount of time.

* * * * *